US010823709B2

(12) United States Patent
Hafenrichter et al.

(10) Patent No.: US 10,823,709 B2
(45) Date of Patent: Nov. 3, 2020

(54) METHODS AND APPARATUS FOR REALIGNING AND RE-ADHERING A HANGING CRAWLER VEHICLE ON A NON-LEVEL SURFACE

(71) Applicant: The Boeing Company, Chicago, IL (US)

(72) Inventors: Joseph L. Hafenrichter, Auburn, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 237 days.

(21) Appl. No.: 16/028,838

(22) Filed: Jul. 6, 2018

(65) Prior Publication Data

US 2020/0011840 A1  Jan. 9, 2020

(51) Int. Cl.
*B62D 57/024* (2006.01)
*G01N 29/265* (2006.01)
*B60K 7/00* (2006.01)
*B60B 19/00* (2006.01)

(52) U.S. Cl.
CPC ......... *G01N 29/265* (2013.01); *B62D 57/024* (2013.01); *B60B 19/003* (2013.01); *B60K 7/0007* (2013.01); *G01N 2291/0289* (2013.01); *G01N 2291/106* (2013.01); *G01N 2291/2693* (2013.01)

(58) Field of Classification Search
CPC .................. G01N 29/04; G01N 29/265; G01N 2291/0289; G01N 2291/2693; G01N 2291/106; B62D 57/00; B62D 57/024; B62D 63/02; B60B 19/003; B60K 7/0007

USPC .......................................................... 73/619
See application file for complete search history.

(56) References Cited

U.S. PATENT DOCUMENTS

| 3,240,278 | A | * | 3/1966 | Witwer .................. E21B 7/021 |
| | | | | 173/185 |
| 3,789,947 | A | | 2/1974 | Blumrich |
| 4,146,967 | A | | 4/1979 | Rohner et al. |
| 5,031,458 | A | | 7/1991 | Young et al. |
| 5,623,107 | A | | 4/1997 | Patterson, Sr. et al. |
| 5,698,787 | A | | 12/1997 | Parzuchowski et al. |

(Continued)

FOREIGN PATENT DOCUMENTS

| JP | 2013001126 | * | 1/2013 |
| WO | 2011107087 A2 | | 9/2011 |

*Primary Examiner* — Jacques M Saint Surin
(74) *Attorney, Agent, or Firm* — Ostrager Chang Flaherty & Broitman P.C.

(57) ABSTRACT

Apparatus and methods for realigning and re-adhering a hanging tool-equipped crawler vehicle with respect to a non-level surface of a target object. When the cable-suspended crawler vehicle with suction devices is adhered to a non-level surface of a target object, it is possible for the crawler vehicle to detach from the surface and be left hanging from the end of the cable in a state. While hanging from the end of the cable in a misaligned state and not in contact with the target object, the crawler vehicle is unable to carry out a planned maintenance operation. Before the maintenance operation is resumed, the crawler vehicle is realigned with the surface of the target object using a turret, a rotating arm or a cam-shaped roll bar provided as equipment on the crawler vehicle and then re-adhered to the surface by activation of the suction devices.

20 Claims, 29 Drawing Sheets

(56) References Cited

U.S. PATENT DOCUMENTS

| | | |
|---|---|---|
| 6,167,760 B1 | 1/2001 | Brunty et al. |
| 6,220,099 B1 | 4/2001 | Marti et al. |
| 6,378,387 B1 | 4/2002 | Froom |
| 6,829,959 B2 | 12/2004 | Gifford et al. |
| 7,083,383 B2 | 8/2006 | Loftus et al. |
| 7,231,826 B2 | 6/2007 | Bossi et al. |
| 7,240,556 B2 | 7/2007 | Georgeson et al. |
| 7,315,609 B2 | 1/2008 | Safai et al. |
| 7,337,673 B2 | 3/2008 | Kennedy et al. |
| 7,562,593 B2 | 7/2009 | Engelbart et al. |
| 7,626,383 B1 | 12/2009 | Sun et al. |
| 7,640,811 B2 | 1/2010 | Kennedy et al. |
| 7,643,893 B2 | 1/2010 | Troy et al. |
| 7,716,989 B2 | 5/2010 | Kollgaard |
| 8,060,270 B2 | 11/2011 | Vian et al. |
| 8,199,194 B2 | 6/2012 | Troy et al. |
| 8,347,746 B2 | 1/2013 | Hafenrichter et al. |
| 8,483,356 B2 | 7/2013 | Bendahan |
| 8,607,904 B2 * | 12/2013 | Fukumoto ............... B62D 55/02 180/9.34 |
| 8,738,226 B2 | 5/2014 | Troy et al. |
| 8,743,196 B2 | 6/2014 | Fritz et al. |
| 8,807,257 B1 | 8/2014 | Hansen et al. |
| 8,874,371 B2 | 10/2014 | Troy et al. |
| 8,892,252 B1 | 11/2014 | Troy et al. |
| 9,156,321 B2 | 10/2015 | Troy et al. |
| 9,302,787 B2 | 4/2016 | Hafenrichter et al. |
| 9,481,082 B1 | 11/2016 | Hafenrichter et al. |
| 9,574,549 B2 | 2/2017 | Lee et al. |
| 9,643,313 B2 | 5/2017 | Hafenrichter et al. |
| 2002/0036108 A1 | 3/2002 | Jeswine et al. |
| 2003/0147493 A1 | 8/2003 | Bueno et al. |
| 2006/0043303 A1 | 3/2006 | Safai et al. |
| 2006/0055396 A1 | 3/2006 | Georgeson et al. |
| 2007/0096727 A1 | 5/2007 | Rempt et al. |
| 2009/0038398 A1 | 2/2009 | Lavoie et al. |
| 2010/0011864 A1 | 1/2010 | Hanan et al. |
| 2010/0132137 A1 | 6/2010 | Eggleston et al. |
| 2011/0178727 A1 | 7/2011 | Hafenrichter et al. |
| 2012/0060611 A1 | 3/2012 | Thommen-Stamenkov et al. |
| 2012/0153032 A1 | 6/2012 | Svanebjerg et al. |
| 2012/0217071 A1 * | 8/2012 | Fukumoto ............... B62D 55/02 180/9.34 |
| 2013/0024067 A1 * | 1/2013 | Troy ........................ B64F 5/30 701/36 |
| 2013/0261876 A1 | 10/2013 | Froom et al. |
| 2013/0289766 A1 | 10/2013 | Hafenrichter et al. |
| 2013/0298682 A1 | 11/2013 | Motzer et al. |
| 2013/0304251 A1 | 11/2013 | Garvey et al. |
| 2016/0363543 A1 * | 12/2016 | Georgeson ............. G01S 13/88 |
| 2018/0120196 A1 * | 5/2018 | Georgeson .......... G01M 5/0008 |

* cited by examiner

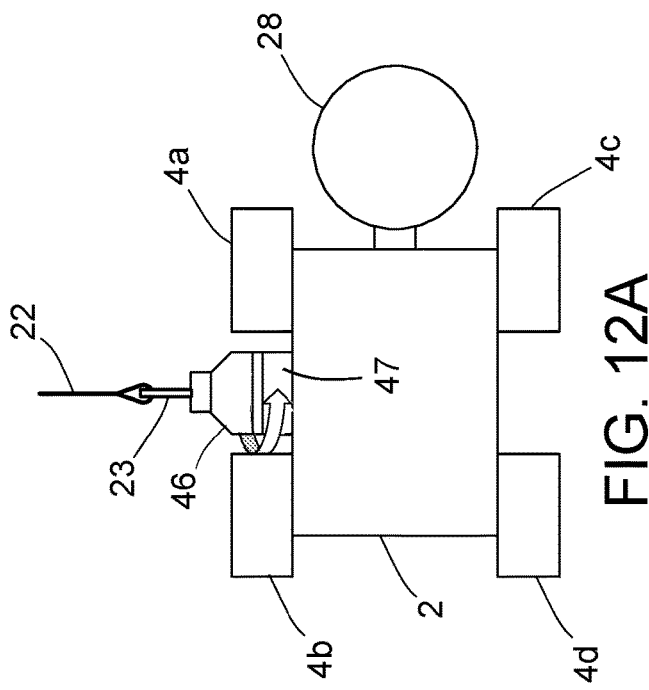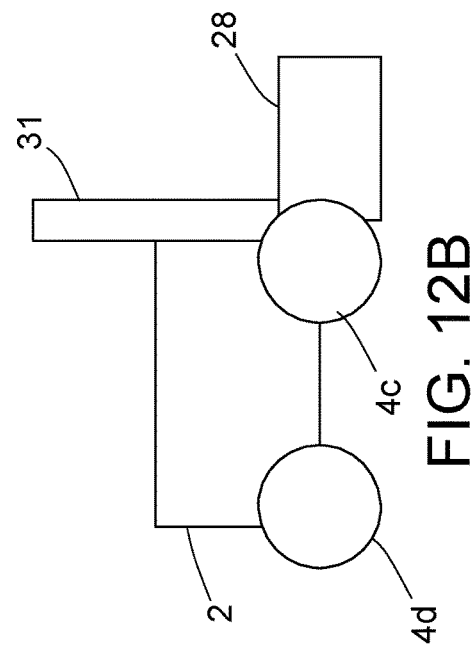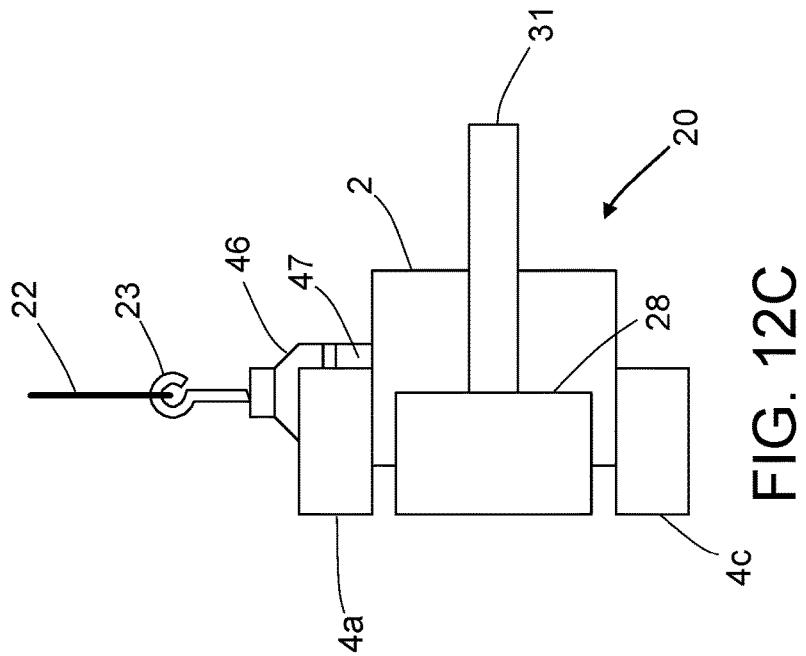

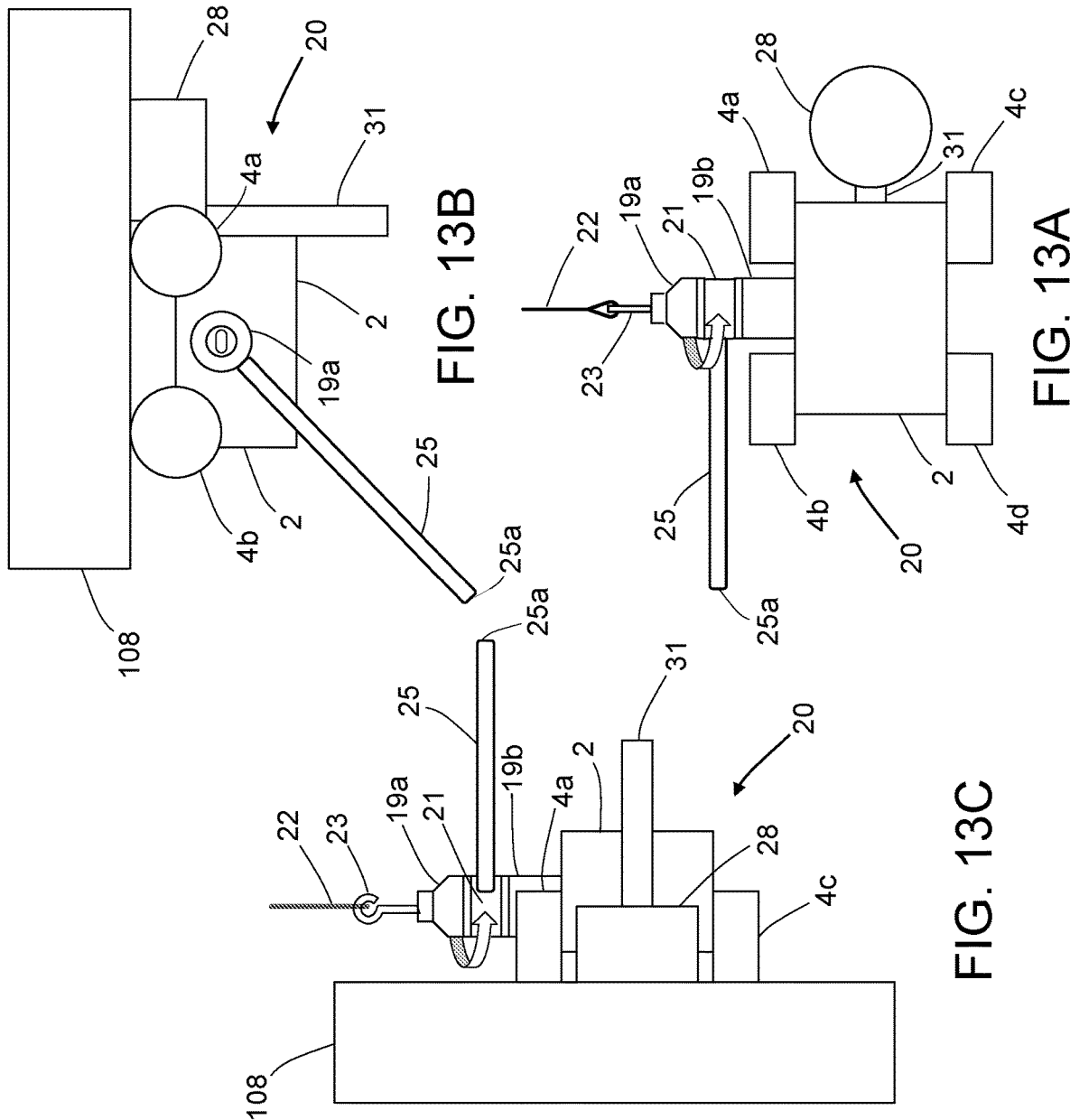

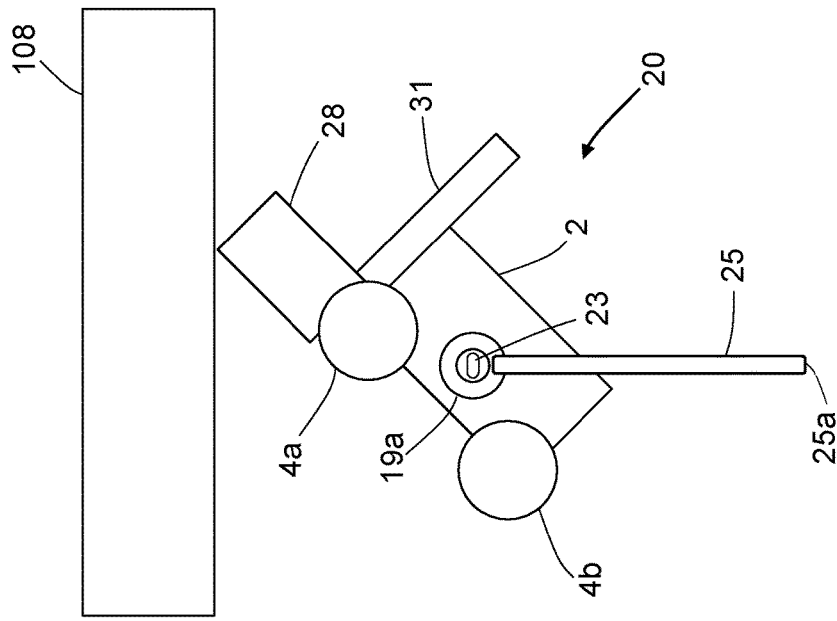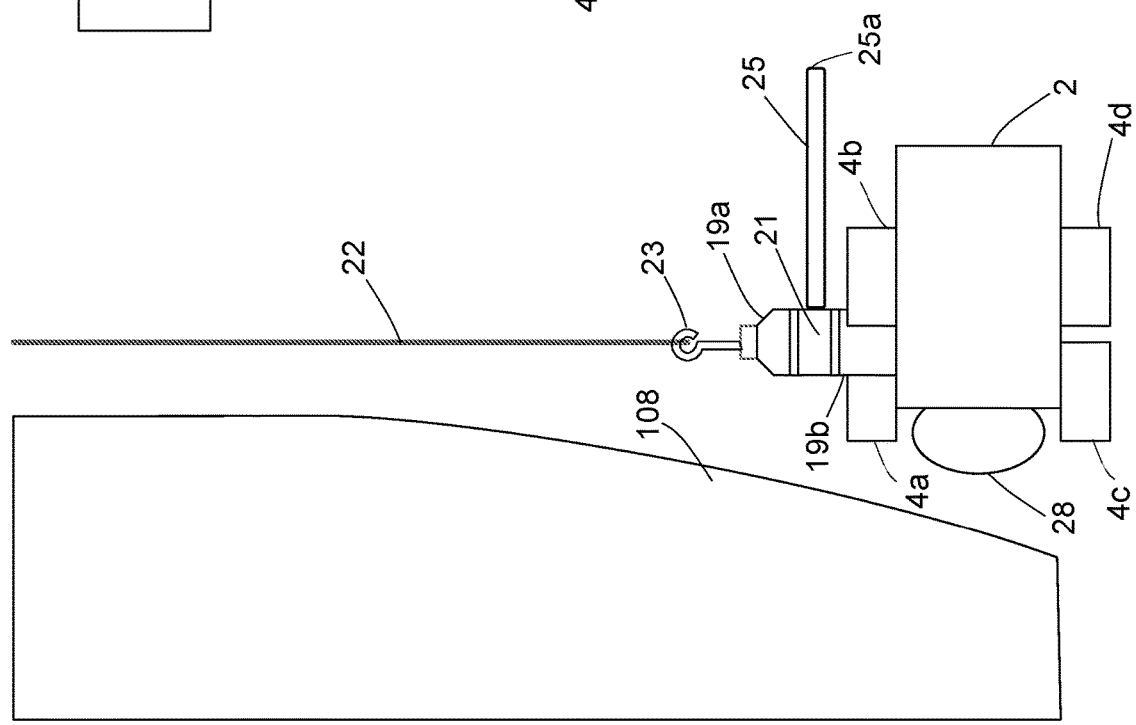

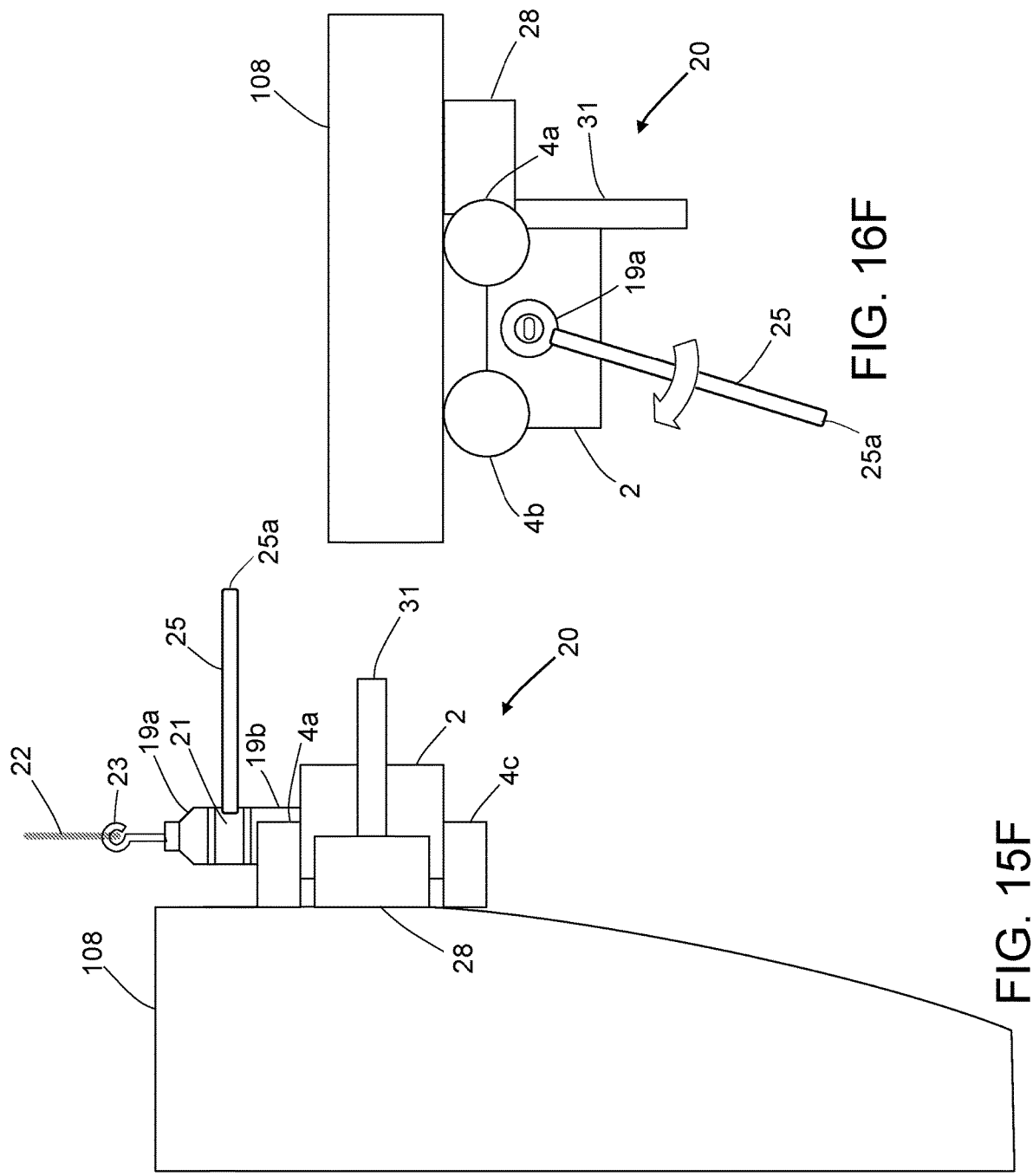

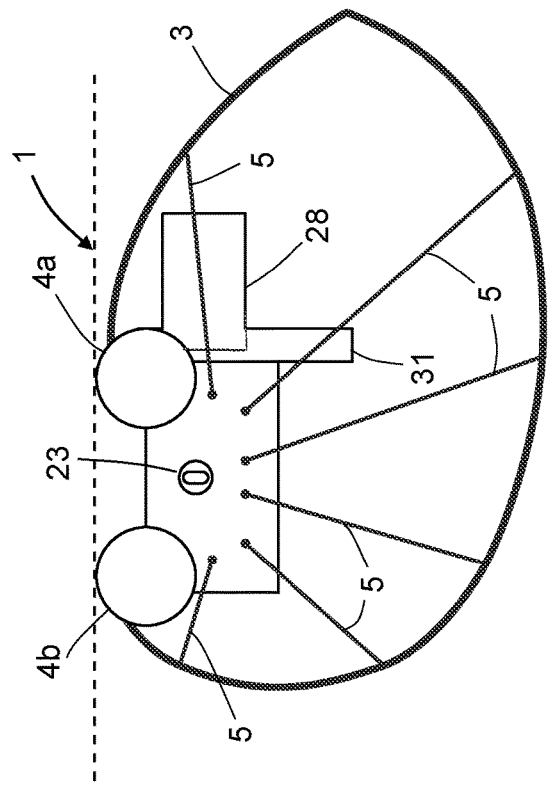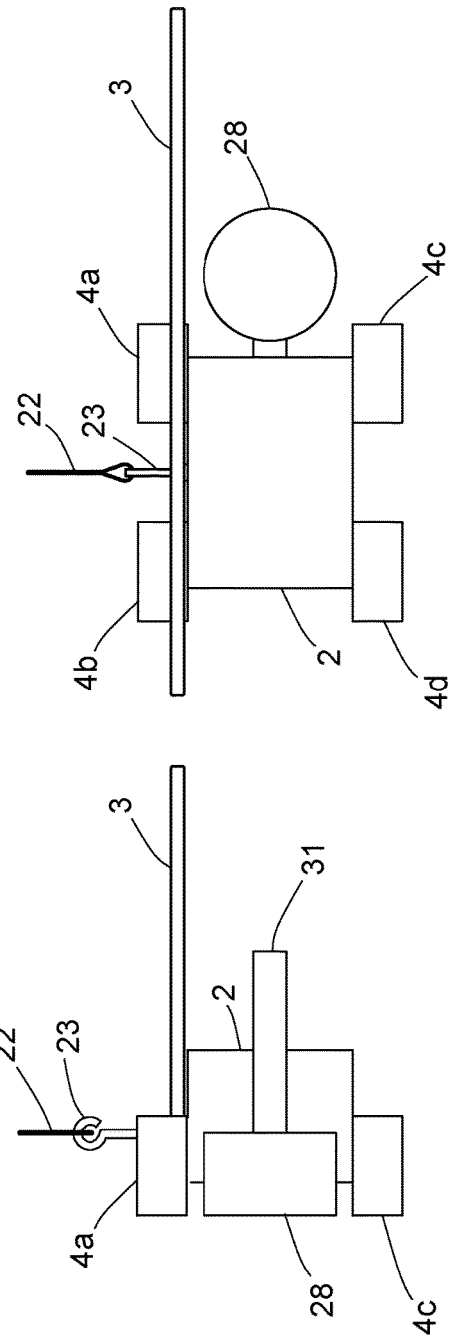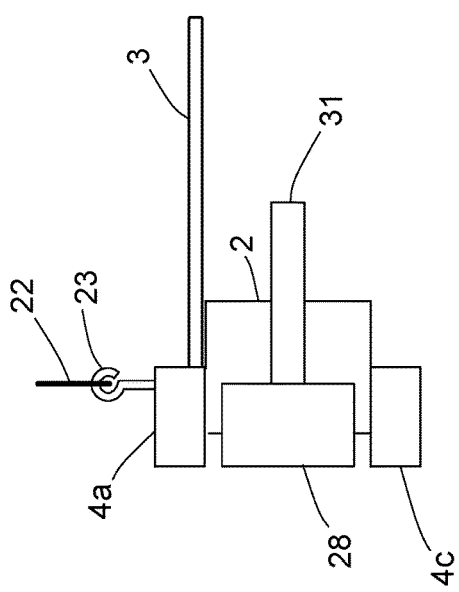

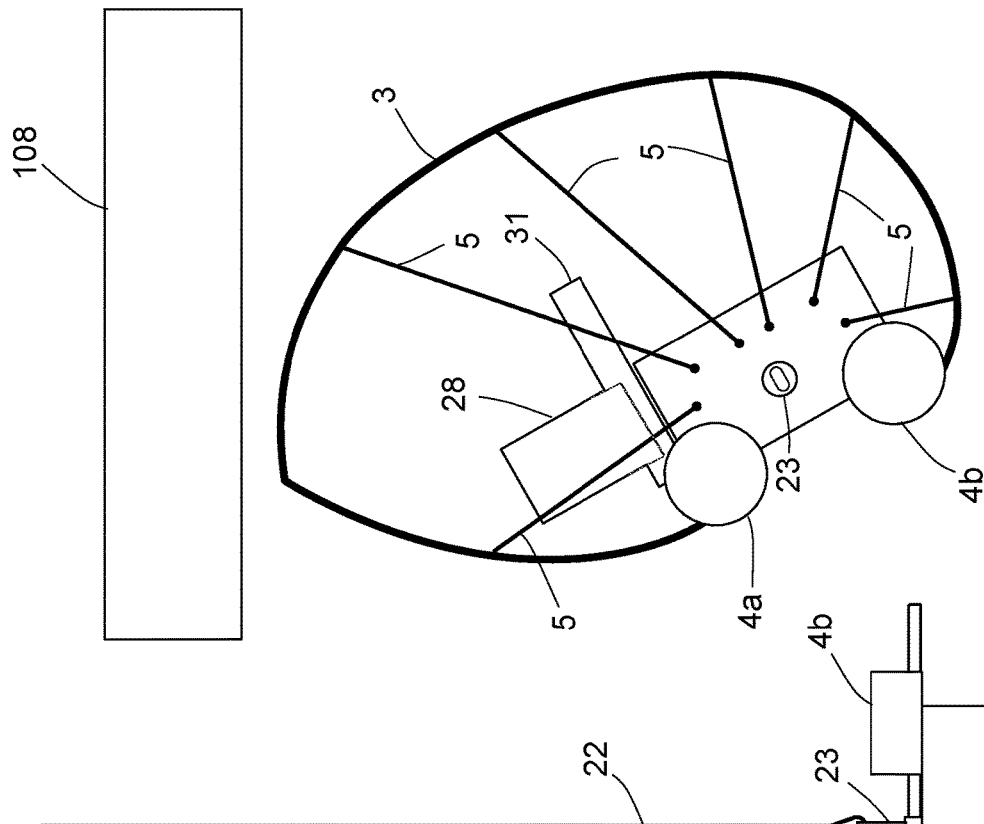
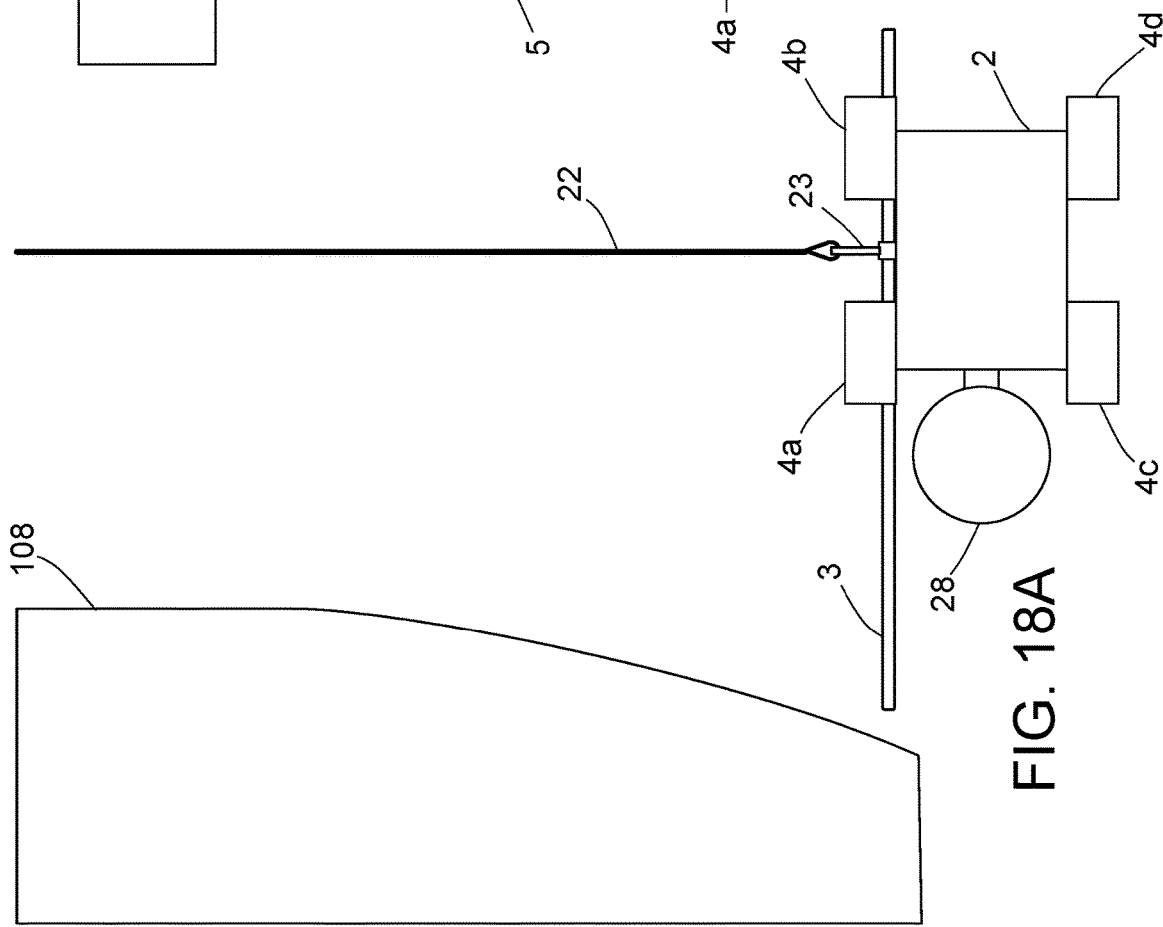
FIG. 19A
FIG. 18A

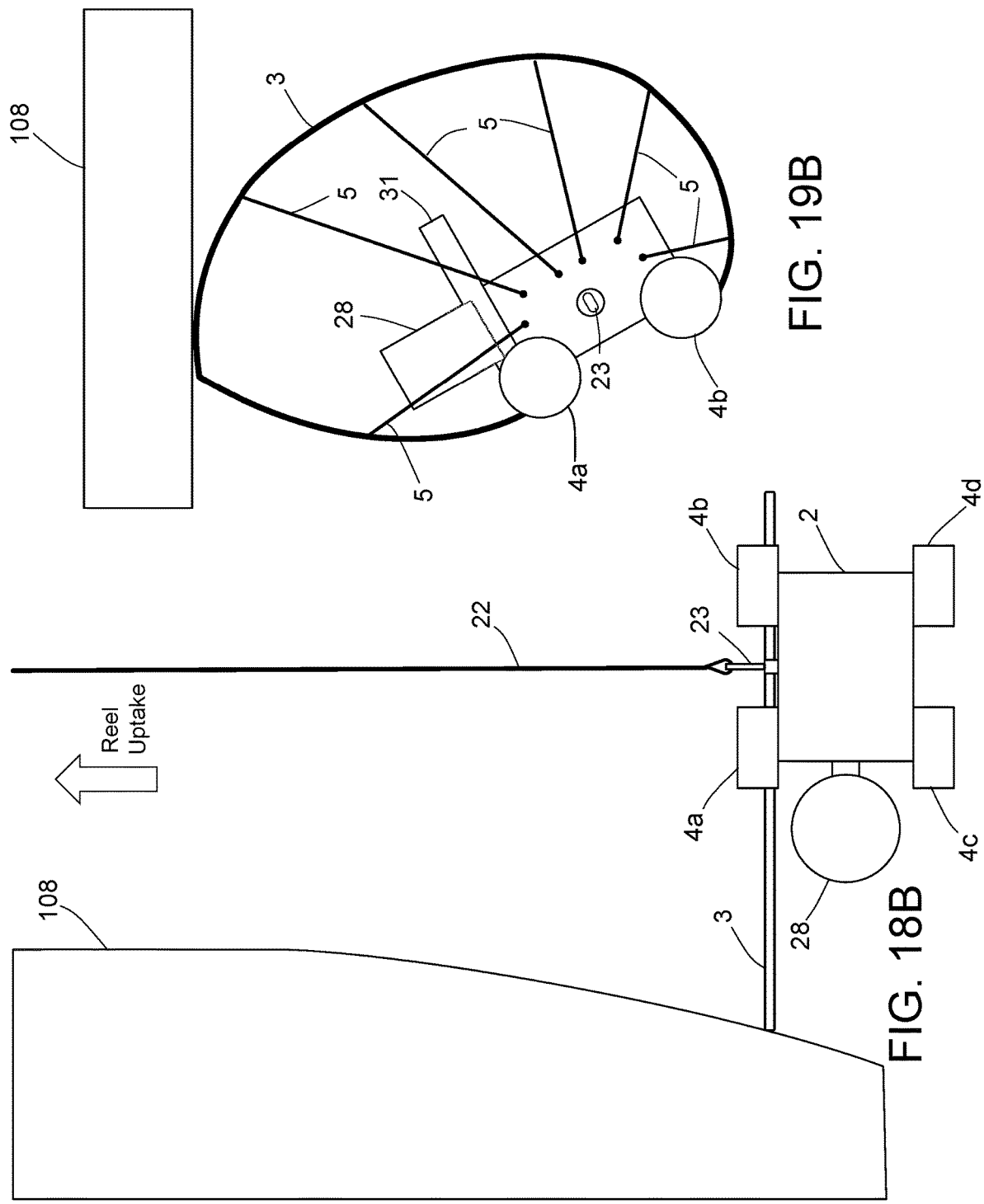

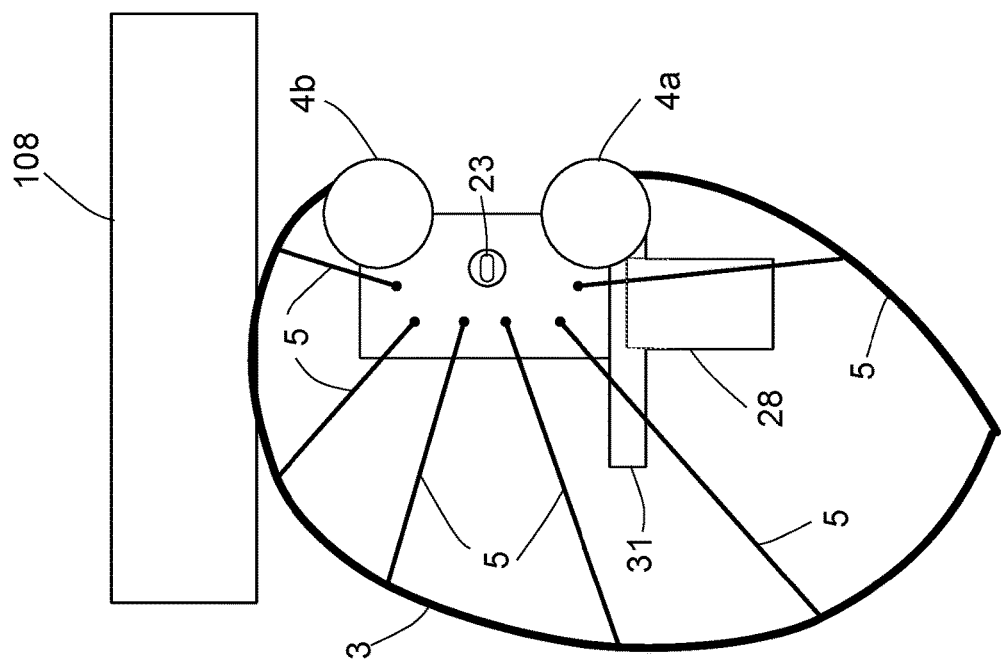
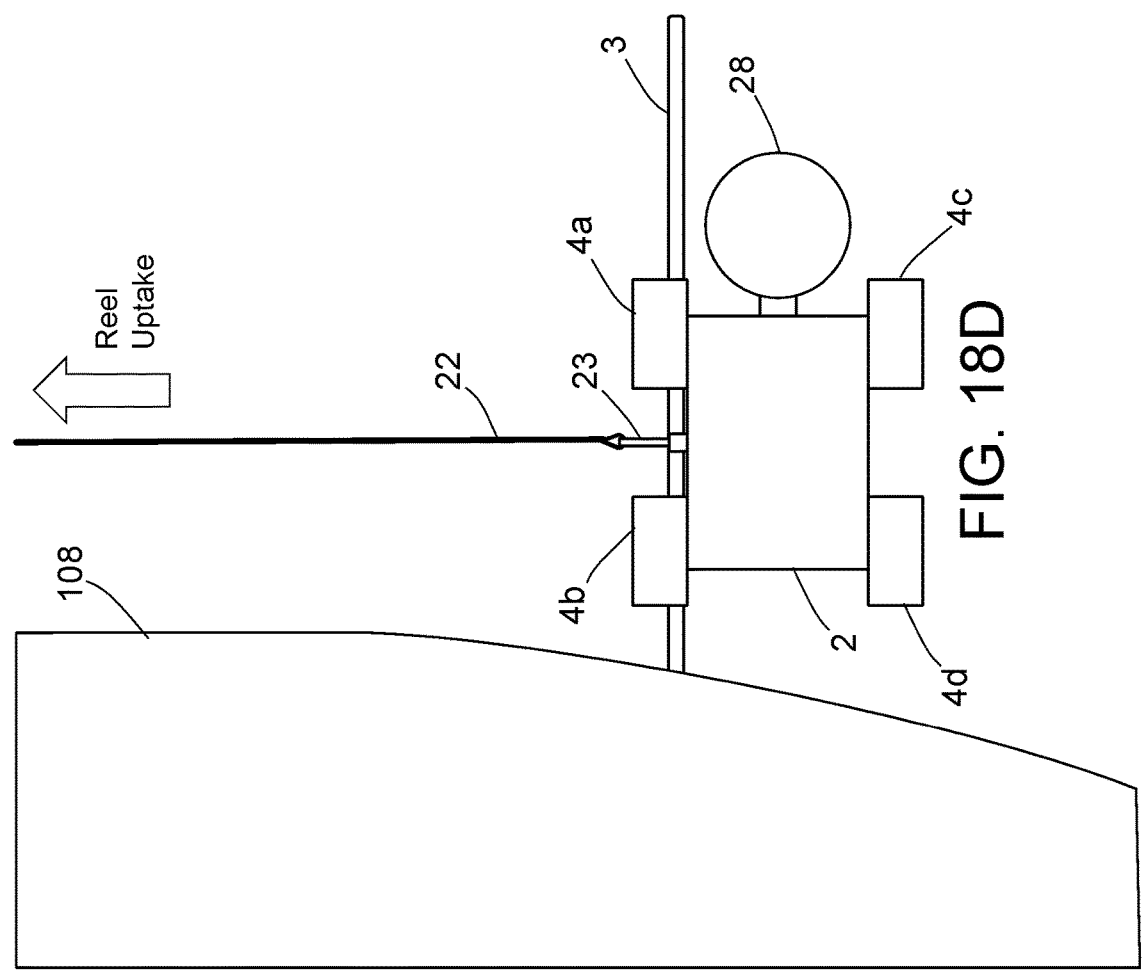

METHODS AND APPARATUS FOR REALIGNING AND RE-ADHERING A HANGING CRAWLER VEHICLE ON A NON-LEVEL SURFACE

BACKGROUND

This disclosure generally relates to automated systems for carrying maintenance tools across surfaces, such maintenance tools including (but not limited to) sensors used in non-destructive inspection (NDI). In particular, this disclosure relates to tool-carrying crawler vehicles that are capable of operating on non-level surfaces of large structures such as wind turbine blades, storage tanks and aircraft fuselages.

It is known to manually inspect and clean large structures such as wind turbine blades, storage tanks and aircraft fuselages by hoisting a person to a position adjacent to the structure. However, manual inspection and cleaning can be time-consuming and difficult operations. To mitigate the drawbacks of manual inspection and cleaning, various solutions involving automated apparatus (e.g., crawling vehicles) configured to travel along a non-level surface of a large structure have been proposed.

For example, solutions have been proposed in which a crawling vehicle is attached to the end of a cable and in contact with and adhered to the surface of the structure being maintained by means of vacuum. The other end of the cable is securely attached to the structure. The cable prevents the crawler vehicle from falling to the ground in the event that the suction devices cease to operate or produce insufficient suction force. If the vacuum fails or the crawling vehicle inadvertently traverses off the edge of the surface of the structure, the crawling vehicle will be left hanging in space from the end of the cable. The suspended crawler vehicle may be manually repositioned back on the surface if the crawler vehicle is easily accessible to personnel, such as in the case of a small storage tank. But in most cases, a crawler vehicle is used because human accessibility is very difficult. Manual reattachment would be time-consuming and difficult, and potentially unsafe. At times, the entire operation would need to be shut down.

This disclosure uses the term "adherence" in a sense that may be deemed not an "ordinary" meaning to be found in a non-technical dictionary. Some vacuum-adhering surface crawling vehicles (hereinafter "crawler vehicle") are capable of performing maintenance functions while traveling along an airfoil-shaped body. The vacuum adherence functionality is provided by one or more vacuum adherence devices. Rolling elements are provided to assist in aligning the crawler vehicle with the airfoil-shaped body, which rolling elements are preferably capable of omnidirectional movement. The omnidirectional rolling elements (e.g., ball-and-socket bearings) work in conjunction with the vacuum adherence devices (e.g., one or more floating flexible vacuum plates and/or one or more floating suction cups) to enable the crawler to adhere to but still move freely over the surface of the airfoil-shaped body. Chassis position and angularity are maintained by vacuum adherence devices which float on the surfaces of the airfoil-shaped body during a maintenance operation. Each vacuum adherence device is designed to float due to the presence of an air cushion between a seal and the surface of the airfoil-shaped body when the vacuum adherence device is partially evacuated. This air cushion enables lateral displacement of the crawler relative to the airfoil-shaped body because contact friction between the seal and body surface is avoided. The resulting total suction force is strong enough to adhere the crawler to the airfoil-shaped body, but not so strong as to inhibit lateral displacement. Thus, the term "adherence" as used herein means a floating adherence that allows the crawler vehicle to move laterally over a surface of a wind turbine blade.

SUMMARY

The subject matter disclosed in some detail below is directed to apparatus and methods for realigning and re-adhering a hanging maintenance tool-equipped crawler vehicle with respect to a non-level surface of a target object. For examples, the technology disclosed herein has application with respect to wind turbine blades, storage tanks and aircraft fuselages being inspected by cable-suspended crawler vehicles having wheels for rolling over and suction devices for adhering to a surface of the blade, tank or fuselage. As used herein, the term "plane of wheel contact" means a hypothetical plane that is tangent to all of the wheels of the crawler vehicle when those wheels are all in contact with a level surface.

When a cable-suspended crawler vehicle with suction devices is adhered to a non-level surface of a target object, it is possible for the crawler vehicle to detach from the surface and be left hanging from the end of the cable in a state. While hanging from the end of the cable in a misaligned state and not in contact with the target object, the crawler vehicle is unable to carry out a planned maintenance operation. Before the maintenance operation is resumed, the crawler vehicle is realigned with the surface of the target object using a turret, a rotating arm or a cam-shaped roll bar provided as equipment on the crawler vehicle and then re-adhered to the surface by activation of the suction devices.

The realignment procedure is distinct from the re-adherence procedure, but both procedures viewed in conjunction may be parts of a so-called "relocation" procedure. Relocation is used in the sense that in a detached and hanging state, the crawler vehicle has a first position and a first orientation (collectively referred to herein as a "first location") relative to the frame of reference of a target object, whereas following realignment and re-adherence, the crawler vehicle has a second position and a second orientation (collectively referred to herein as a "second location") relative to the frame of reference of the target object. In accordance with some embodiments, none of the wheels of the crawler vehicle are in contact with the target object when the crawler is at the first location, whereas all of the wheels of the crawler vehicle are in contact with the target object when the crawler is at the second location. The movements of the crawler vehicle from the first location to the second location are one example of "relocation" of the crawler vehicle.

Although various embodiments of apparatus and methods for realigning and re-adhering a hanging maintenance tool-equipped crawler vehicle with respect to a non-level surface of a target object are described in some detail later herein, one or more of those embodiments may be characterized by one or more of the following aspects.

One aspect of the subject matter disclosed in detail below is a method for realigning a hanging crawler vehicle on a surface of a structure, the method comprising: (a) suspending the crawler vehicle from an end of a cable, the crawler vehicle being suspended at an elevation at which the crawler vehicle is not in contact with the surface of the structure; (b) rotating the crawler vehicle relative to the end of the cable to cause first and second wheels of the crawler vehicle to move in tandem closer to the surface of the structure until the first wheel and a third wheel of the crawler vehicle are nearly equidistant from the surface of the structure; and (c) raising the end of the cable until at least the first and third wheels are in contact with the surface of the structure. The crawler vehicle may then be adhered to the surface of the structure using suction while the first and third wheels are in contact with the surface of the structure.

Another aspect of the subject matter disclosed in detail below is a method for realigning a hanging crawler vehicle on a surface of a structure, the method comprising: (a) suspending the crawler vehicle from an end of a cable, the crawler vehicle being suspended at an elevation at which the crawler vehicle is not in contact with the surface of the structure; (b) rotating an alignment arm that is rotatably mounted to the crawler vehicle in a first direction about an axis of rotation that is fixed in a frame of reference of the crawler vehicle until a tip of the alignment arm contacts the surface of the structure; (c) while the tip of the alignment arm contacts the surface of the structure, further rotating the alignment arm in the first direction to cause first and second wheels of the crawler vehicle to move in tandem closer to the surface of the structure; and (d) raising the end of the cable until at least the first wheel and a third wheel are in contact with the surface of the structure.

In accordance with some embodiments, the method described in the preceding paragraph further comprises ceasing rotation of the alignment arm in the first direction before raising the end of the cable and then rotating the alignment arm in a second direction opposite to the first direction while the end of the cable is being raised. Also, the method further comprises adhering the crawler vehicle to the surface of the structure using suction while the first and third wheels are in contact with the surface of the structure.

A further aspect of the subject matter disclosed in detail below is a crawler vehicle comprising: a crawler vehicle frame and a multiplicity of wheels rotatably coupled to the crawler vehicle frame; a maintenance tool coupled to the crawler vehicle frame of the crawler vehicle; a revolute joint having an axis of rotation and an alignment arm having a first end coupled to the revolute joint and having a second end that is rotatable about the axis of rotation between a first angular position where the distal end of the alignment arm is disposed above a plane of wheel contact tangent to the multiplicity of wheels and a second angular position where the distal end of the alignment arm is disposed below the plane of wheel contact. A further feature of the alignment arm-equipped crawler vehicle is that the distal end of the alignment arm is disposed below the plane of wheel contact at a first distance from the axis of rotation of the revolute joint which is greater than a second distance of any other part of the crawler vehicle from the axis of rotation of the revolute joint for all angular positions of the alignment arm relative to the crawler vehicle frame within a range of angular positions.

In accordance with some embodiments, the wheels of the crawler vehicle are configured to be capable of holonomic motion, in which case the crawler vehicle further comprises: a set of motors configured to respectively drive rotation of the wheels; and a multiplicity of motor controllers configured to respectively control the motors to cause the set of wheels to produce holonomic motion of the crawler vehicle.

Yet another aspect of the subject matter disclosed in detail below is a method for realigning a hanging crawler vehicle on a surface of a structure, the method comprising: (a) attaching a crawler vehicle equipped with a roll bar to an end of a cable; (b) suspending the crawler vehicle from the end of the cable at an elevation at which the crawler vehicle is hanging freely and not in contact with the surface of the structure; (c) raising the end of the cable and the crawler vehicle until the roll bar comes into contact with the surface of the structure; and (d) continuing to raise the end of the crawler vehicle while the roll bar remains in contact with and is dragged along the surface of the structure, wherein an outer periphery of the roll bar has an eccentric shape configured to induce the crawler vehicle to reorient relative to the surface of the structure during step (d) until at least two wheels of the crawler vehicle come into contact with the surface of the structure. Then the crawler vehicle may be adhered to the surface of the structure using suction while the at least two wheels of the crawler vehicle are in contact with the surface of the structure. To assure vacuum adherence, preferably the at least two wheels in contact with the surface are diagonally opposed to each other on the crawler vehicle. In other situations, vacuum adherence may be attained provided that the at least two wheels are adjacent to each other and the vacuum skirt (or vacuum skirts) of the crawler vehicle is in close proximity to the surface, A further aspect is a crawler vehicle comprising: a crawler vehicle frame and a multiplicity of wheels rotatably coupled to the crawler vehicle frame; a maintenance tool coupled to the crawler vehicle frame of the crawler vehicle; a roll bar fixedly coupled to the frame, wherein the roll bar is disposed in a plane that is perpendicular to the plane of wheel contact and entirely on one side of the plane of wheel contact, and has an outer periphery with an eccentric shape, and wherein spaced points on the outer periphery of the roll bar are located at different distances from a center-of-mass of the crawler vehicle.

Other aspects of an automated apparatus and methods for realigning and re-adhering a hanging maintenance tool-equipped crawler vehicle with respect to a non-level surface of a target object are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 12A is a diagram representing a plan view of a cable-suspended crawler vehicle having a turret-mounted cable hook in accordance with another embodiment.

FIGS. 12B and 12C are end and bottom views respectively of the cable-suspended crawler vehicle depicted in FIG. 12A.

FIG. 13A is a diagram representing a plan view of a cable-suspended crawler vehicle having a rotatable alignment arm in accordance with a further embodiment.

FIGS. 13B and 13C are top and end views respectively of the cable-suspended crawler vehicle depicted in FIG. 13A while in contact and aligned with a surface of a wind turbine blade (only a portion of which is shown) disposed with its leading edge (not shown in FIGS. 13B and 13C) generally horizontal. The horizontal axis is parallel to the plane of the page in FIG. 14B and perpendicular to the plane of the page in FIG. 14C.

FIGS. 15A through 15F are diagrams showing respective views of the cable-suspended crawler vehicle depicted in FIGS. 13B and 13C at respective instants of time during the execution of a realignment and re-adherence maneuver in accordance with one embodiment. Again the leading edge (not shown) of the wind turbine blade is generally parallel to a horizontal axis, which horizontal axis is perpendicular to the plane of the page in FIGS. 15A-15F.

FIGS. 16A through 16F are diagrams showing respective views of the cable-suspended crawler vehicle depicted in FIGS. 15A-15F at the same respective instants of time during the execution of a realignment and re-adherence maneuver in accordance with one embodiment. Again the leading edge (not shown) of the wind turbine blade is generally parallel to a horizontal axis, which horizontal axis is parallel to the plane of the page in FIGS. 16A-16F. Thus the line of sight of the observer in FIGS. 15A-15F and the line of sight of the observer in FIGS. 16A-16F are perpendicular to each other.

FIGS. 17A-17C are diagrams respectively representing plan, side and end views of a cable-suspended crawler vehicle having a cam-shaped roll bar in accordance with yet another embodiment.

FIGS. 18A through 18E are diagrams showing respective views of the cable-suspended crawler vehicle depicted in FIGS. 17A-17C at respective instants of time during the execution of a realignment and re-adherence maneuver in accordance with one embodiment. Again the leading edge (not shown) of the wind turbine blade is generally parallel to a horizontal axis, which horizontal axis is perpendicular to the plane of the page in FIGS. 18A-18E.

FIGS. 19A through 19E are diagrams showing respective views of the cable-suspended crawler vehicle depicted in FIGS. 18A-18E at the same respective instants of time during the execution of a realignment and re-adherence maneuver in accordance with one embodiment. Again the leading edge (not shown) of the wind turbine blade is generally parallel to a horizontal axis, which horizontal axis is parallel to the plane of the page in FIGS. 19A-19E. Thus the line of sight of the observer in FIGS. 18A-18E and the line of sight of the observer in FIGS. 19A-19E are perpendicular to each other.

Reference will hereinafter be made to the drawings in which similar elements in different drawings bear the same reference numerals.

DETAILED DESCRIPTION

Figure 1:
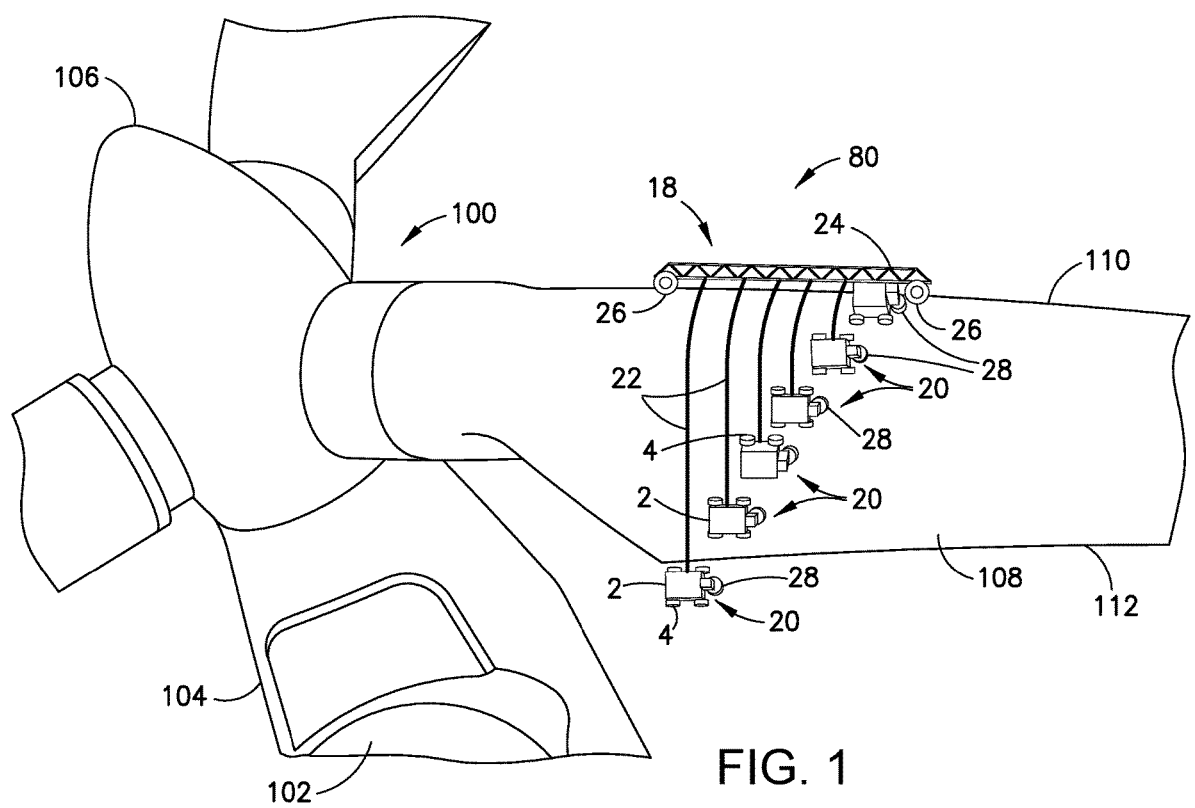
FIG. 1 is a diagram representing a view of a portion of a wind turbine having an automated apparatus mounted on a wind turbine blade 108 for performing a maintenance operation in accordance with one embodiment.

The improvements disclosed herein may be incorporated in or utilized with an automated apparatus for performing maintenance functions on wind turbine blades or other structures (such as aircraft fuselages and wings). As used herein, the term "maintenance" includes, but is not limited to, operations such as non-destructive inspection, drilling, scarfing, grinding (e.g., to remove bonded or bolted components), fastening, applique application, ply mapping, cleaning, marking and painting.

For the purpose of illustration, systems and methods for performing automated maintenance operations on a wind turbine blade will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A typical wind turbine has a multiplicity of blades extending radially outward from a central hub, to which the roots of the blades are attached. The hub is rotatably coupled to a nacelle that is supported at a height above ground by a tower. The blades are configured to generate aerodynamic forces that cause the wind turbine to rotate in response to wind impinging on the blade surfaces. The nacelle houses an electric generator which is operatively coupled to the hub. The electric generator is configured to generate electrical power as the hub rotates.

As used herein, the term "wind turbine blade" refers to an airfoil-shaped body having a leading edge and a trailing edge connected by upper and lower surfaces that extend from a root to a tip of the blade. The cross-sectional profile of the blade may change in size and shape from the root to the tip.

A blade maintenance tool is a device that performs a maintenance operation, such as non-destructive inspection of a wind turbine blade, or cleaning of an external surface of the wind turbine blade, while travelling along the blade. When the maintenance operation is performed, the blade is maintained in an angular position such that its leading edge is approximately horizontal, and a pitch of the blade is adjusted so that the leading edge faces upward, and then, the blade maintenance tool is positioned on the leading edge of the blade. In the alternative, the blade may be maintained in an angular position such that its trailing edge is approximately horizontally, and a pitch of the blade is adjusted so that the trailing edge faces upward, and then, the blade maintenance tool is positioned on the trailing edge In accordance with various embodiments, the automated apparatus comprises a wheeled cart having a multiplicity of maintenance tool-carrying wheeled crawler vehicles suspended therefrom by respective cables. In the case of a generally horizontally extending wind turbine blade, the cart travels along the leading edge of the wind turbine blade while the crawler vehicles hang on both sides of the wind turbine blade with their wheels in contact with the respective side surfaces. In the case where the maintenance operation is non-destructive inspection, one set of crawler vehicles scans one side surface of the wind turbine blade, while another set of crawler vehicles scans the other side surface of the wind turbine blade. The cable lengths may be adjusted to change the elevations of the crawler vehicles to ensure full coverage of the wind turbine blade surfaces during scanning.

In accordance with some embodiments, the crawler vehicles are configured to be capable of holonomic motion. A holonomic-motion system is one that is not subject to motion constraints. As used in this disclosure, a vehicle is considered to be holonomic if the controllable degrees of freedom are equal to the total degrees of freedom. This type of system can translate in any direction while simultaneously rotating. This is different than most types of ground vehicles, such as car-like vehicles, tracked vehicles, or wheeled differential-steer (skid-steer) vehicles, which cannot translate in any direction while rotating at the same time.

The maintenance tool carried by the crawler vehicle may be selected from a group of interchangeable maintenance tools, including NDI sensors of different types (e.g., an ultrasonic transducer array, an infrared thermography unit, a video camera, an optical three-dimensional coordinate measuring machine or a laser line scanner), a cleaning unit, and so forth. In accordance with one implementation, the automated apparatus comprises a multiplicity of crawler vehicles capable of supporting any one of a plurality of maintenance tools for performing a set of maintenance functions on a wind turbine blade. As a whole, the automated apparatus disclosed herein reduces maintenance time, labor hours and human errors and increases safety when robotic maintenance functions are performed on wind turbine blades.

FIG. 1 is a diagram representing a view of a portion of a wind turbine 100 having an automated apparatus 80 mounted on a wind turbine blade 108 for performing a maintenance operation in accordance with one embodiment. As partly illustrated in FIG. 1, the wind turbine 100 includes a tower 102, a nacelle 104 installed at a top end of the tower 102, a hub 106 that is rotatably mounted inside the nacelle 104, and a plurality of blades 108 extending radially from the hub 106. The blades 108 are caused to rotate by the forces exerted by wind, thereby rotating the hub 106 which is coupled to an electricity generator (not shown).

Figure 2:
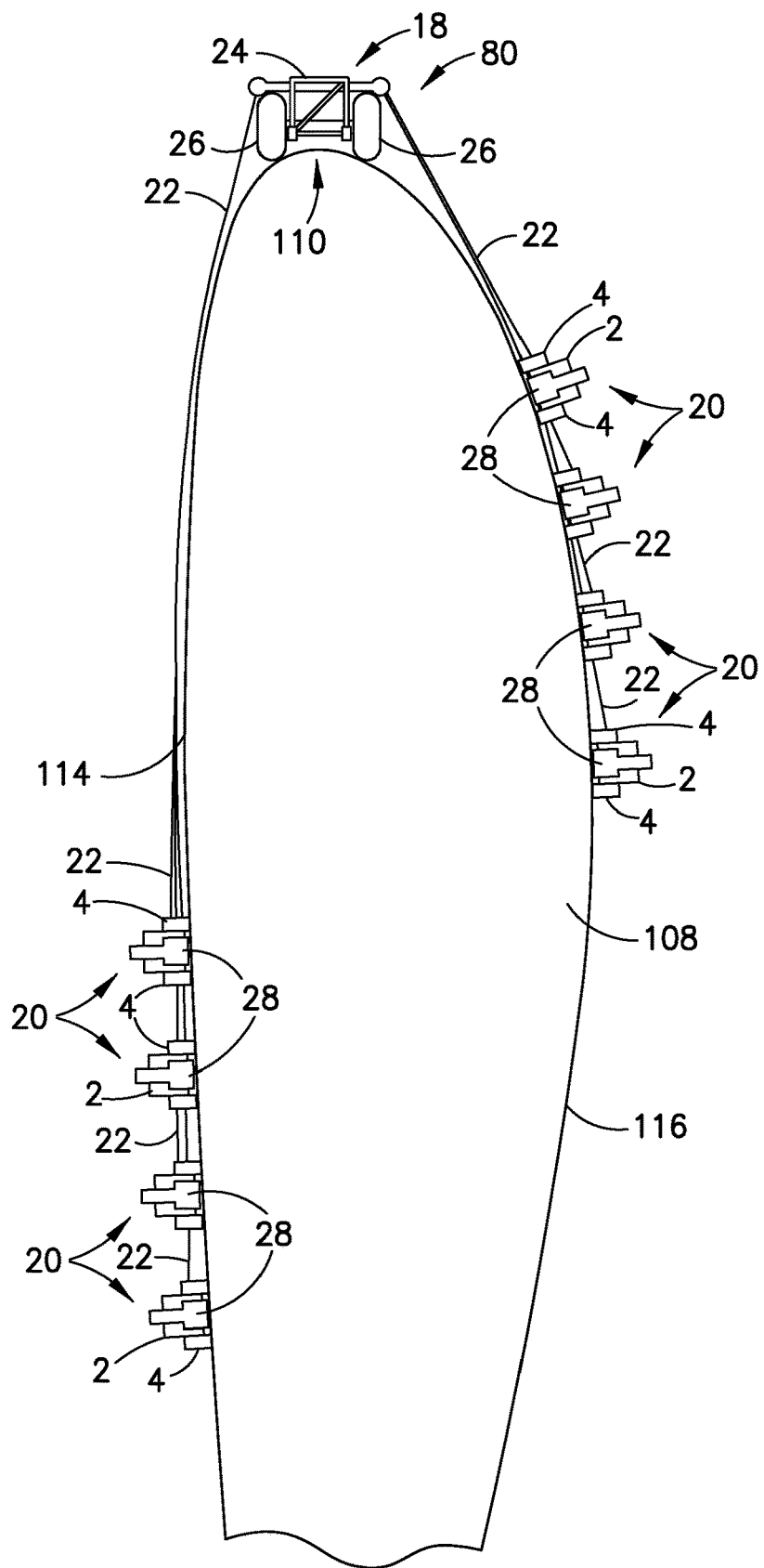
FIG. 2 is a diagram representing an end view of the wind turbine blade with automated apparatus placed thereon depicted in FIG. 1.

FIG. 2 is a diagram representing an end (i.e. chordwise) view of the wind turbine blade 108 with automated apparatus 80 placed thereon as depicted in FIG. 1. The wind turbine blade 108 includes a leading edge 110 and a trailing edge 112. As seen in FIG. 2, the automated apparatus 80 includes a cart 18 that is seated on and may travel along the leading edge 110 of the wind turbine blade 108. In accordance with the particular embodiment depicted in FIGS. 1 and 2, the cart comprises a cart frame 24, a multiplicity of wheels 26 rotatably coupled to the cart frame 24, and a cart wheel motor 62 (see FIG. 4) for driving rotation of a wheel of the multiplicity of wheels 26. The axes of rotation of the wheels 26 may be perpendicular to the leading edge 110 to facilitate cart travel along the leading edge 110. The wheels 26 of the cart 18 may be made of a material having a high frictional force, such as rubber, so that wheels 26 are disinclined to slide off of the surface of the leading edge 110.

Still referring to FIG. 2, the wind turbine blade 108 further includes two side surfaces 114 and 116 which are connected by the leading edge 110. When the wind turbine 100 operates, foreign matter or debris may become attached to the surfaces 114 and 116 of the wind turbine blades 108. Also cracks or scratches may occur in the wind turbine blades 108 during usage. Foreign matter on the surface of the wind turbine blades 108 may degrade the efficiency of the wind turbine 100; cracks may propagate if not attended to. Periodic maintenance may be performed for removing foreign matter from the surfaces of the wind turbine blades 108 or for detecting anomalies (e.g., cracks) in the wind turbine blades 108.

The automated apparatus 80 further includes a multiplicity of cables 22 depending from the cart 18 and a multiplicity of crawler vehicles 20 (e.g., holonomic-motion crawler vehicles) respectively attached to the multiplicity of cables 22. Each crawler vehicle 20 comprises a crawler vehicle frame 2, a set of wheels 4a-4d rotatably coupled to the crawler vehicle frame 2, and a maintenance tool 28 coupled to the crawler vehicle frame 2. One subset of the multiplicity of crawler vehicles 20 are connected to cables 22 in positions whereat maintenance operations may be performed on the side surface 114 of the wind turbine blade 108; another subset of the multiplicity of crawler vehicles 20 are connected to cables 22 in positions whereat maintenance operations may be performed on the side surface 116 of the wind turbine blade. In addition, each crawler vehicle 20 is adhered to a surface of the wind turbine blade 108 by one or more suction devices (described in detail below).

As best seen in FIG. 1, the crawler vehicles 20 may be positioned at different elevations. In accordance with the embodiment depicted in FIGS. 1 and 2, each crawler vehicle 20 is connected to the cart 18 by a single cable 22 which acts as a tether that prevents the crawler vehicle 20 from falling in the event that the suction devices cease to operate or produce insufficient suction force. In accordance with an alternative embodiment partly depicted in FIG. 3 (only one of a multiplicity of crawler vehicles is shown), each crawler vehicle 20 is connected to the cart 18 by a pair of cables 22a and 22b.

At the start of a maintenance operation, the crawler vehicles 20 may be lowered to respective positions having different elevations, as depicted in FIG. 1. As will be described in more detail later with reference to FIGS. 7 and 8, each crawler vehicle 20 further comprises one or more suction zones that enable the crawler vehicles 20 to adhere to the side surfaces 114 and 116 of the wind turbine blades 108. Maintenance operations may be performed while the crawler vehicles 20 are adhered to the side surfaces 114 and 116 of the wind turbine blades 108. During such maintenance operations, the cart 18 may be either stationary (for example, if the crawler vehicles are holonomic-motion crawler vehicles) or moving (for example, if the crawler vehicles are non-holonomic-motion crawler vehicles).

For one example, in accordance with one possible scanning pattern: (a) while the cart 18 is stopped, a multiplicity of crawler vehicles 20 may be respectively suspended at a first set of elevations (i.e., distances from the cart 18); (b) while the crawler vehicles 20 are so suspended, the cart 18 is moved from a first spanwise position along the leading edge 110 of the wind turbine blade 108 to a second spanwise position; (c) while the cart 18 is moving from the first spanwise position to the second spanwise position, the crawler vehicles 20 suspended at the first set of elevations perform respective maintenance operations along respective scan paths; (d) then the cart 18 is stopped and the multiplicity of crawler vehicles are respectively raised or lowered (e.g., by unwinding or winding of the cables 22 in the case of non-holonomic-motion crawler vehicles or by holonomic motion in the case of holonomic-motion crawler vehicles) to a second set of elevations different than the first set of elevations; and (e) while the cart 18 is moving from the second spanwise position to the first spanwise position, the crawler vehicles 20 suspended at the second set of elevations perform respective maintenance operations along respective scan paths.

For another example, in accordance with another possible scanning pattern: (a) while the cart 18 is stopped at a first spanwise position, a multiplicity of crawler vehicles 20 may be respectively lowered (e.g., by unwinding of the cables 22 in the case of non-holonomic-motion crawler vehicles or by holonomic motion in the case of holonomic-motion crawler vehicles) from a first elevation to a second elevation; (b) while the crawler vehicles are moving from the first elevation to the second elevation, the crawler vehicles 20 perform respective maintenance operations along respective scan paths; (c) while the crawler vehicles are stopped, the cart 18 is moved incrementally to a second spanwise position and then stopped; (d) while the cart 18 is stopped at the second spanwise position, the crawler vehicles 20 may be respectively raised (e.g., by winding of the cables 22 in the case of non-holonomic-motion crawler vehicles or by holonomic motion in the case of holonomic-motion crawler vehicles) from the second elevation to the first elevation; and (e) while the crawler vehicles are moving from the second elevation to the first elevation, the crawler vehicles 20 perform respective maintenance operations along respective scan paths.

In accordance with alternative scanning patterns, the cart 18 and the crawler vehicles 20 may move concurrently. For example, while the cart 18 moves in a spanwise direction along the leading edge 110 of the wind turbine blade 108, the crawler vehicles 20 may alternatingly move up and down in the elevation direction (e.g., by winding and unwinding of the cables 22 in the case of non-holonomic-motion crawler vehicles or by holonomic motion in the case of holonomic-motion crawler vehicles).

Figure 3:
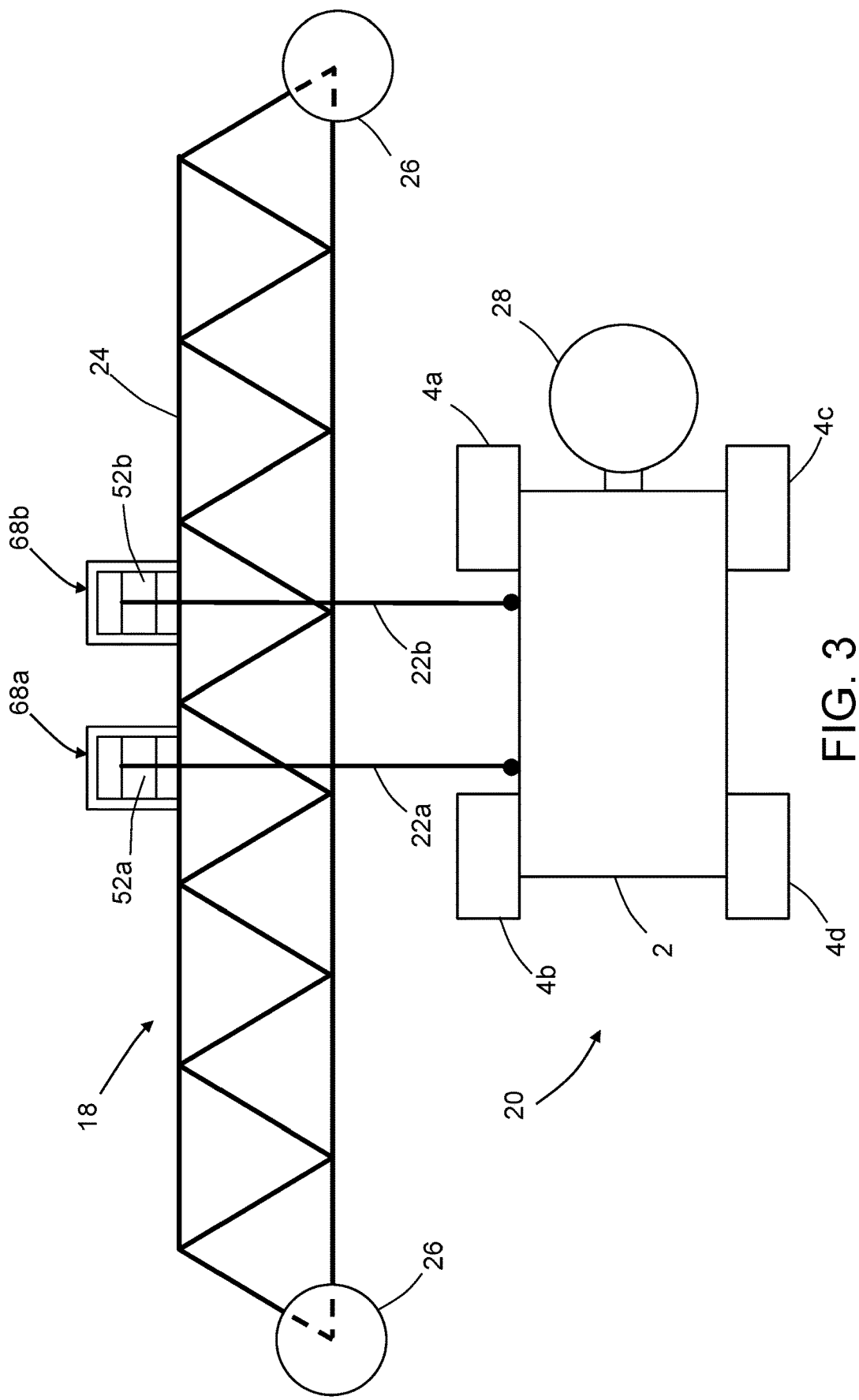
FIG. 3 is a diagram representing a view of an automated apparatus comprising a cart and a multiplicity of crawler vehicles (only one of which is depicted in FIG. 3) connected to the cart by respective pairs of cables in accordance with one embodiment.

In accordance with further alternative embodiments, each crawler vehicle 20 may be connected to the cart 18 by means of a pair of cables. FIG. 3 is a diagram representing a view of an automated apparatus including a cart 18 and a crawler vehicle 20 connected to the cart 18 by a pair of cables 22*a* and 22*b*. The uppermost portion of cable 22*a* is wound around a cable spool 52*a* that is rotatably coupled to a spool support 68*a*, which in turn is fixedly coupled to the cart frame 24. Similarly, the uppermost portion of cable 22*b* is wound around a cable spool 52*b* that is rotatably coupled to a spool support 68*b*, which is also fixedly coupled to the cart frame 24. The distal ends of the cables 22*a* and 22*b* are respectively attached to one side of the crawler vehicle frame 2 at respective attachment points (indicated by solid dots in FIG. 3). Thus the orientation of the crawler vehicle 20 can be controlled by adjusting the respective lengths of the paid-out portions of cables 22*a* and 22*b*. This feature is especially useful in cases wherein the crawler vehicles 20 are of a non-holonomic motion type. If the cable lengths are equal, then the crawler vehicle 20 will travel along a scan path that is parallel to the path traveled by the cart 18.

Referring again to FIG. 1, during travel of the cart 18 from a first spanwise position to a second spanwise position along the leading edge 110 of the wind turbine blade 108 (hereinafter "first pass"), the crawler vehicles 20 disposed at the respective elevations seen in FIG. 1 may travel along mutually parallel paths. In cases where the maintenance tools are NDI probes, the NDI probes on one side of the wind turbine blade 108 may acquire respective sets of NDI sensor data from respective stripe-shaped areas on the surface of wind turbine blade 108, which interrogated areas may be separated by areas not interrogated during the first pass of the cart 18. At the end of the first pass, the elevations of the crawler vehicles 20 may be adjusted so that, during a second pass of the cart 18 from the second spanwise position to the first spanwise position, the NDI probes may acquire respective sets of NDI sensor data from respective stripe-shaped areas on the surface of wind turbine blade 108 which were not interrogated during the first pass. The NDI sensor data acquired during the first and second passes may be stitched together for the purpose of displaying an image of the entire area scanned by the NDI probes.

Figure 4:
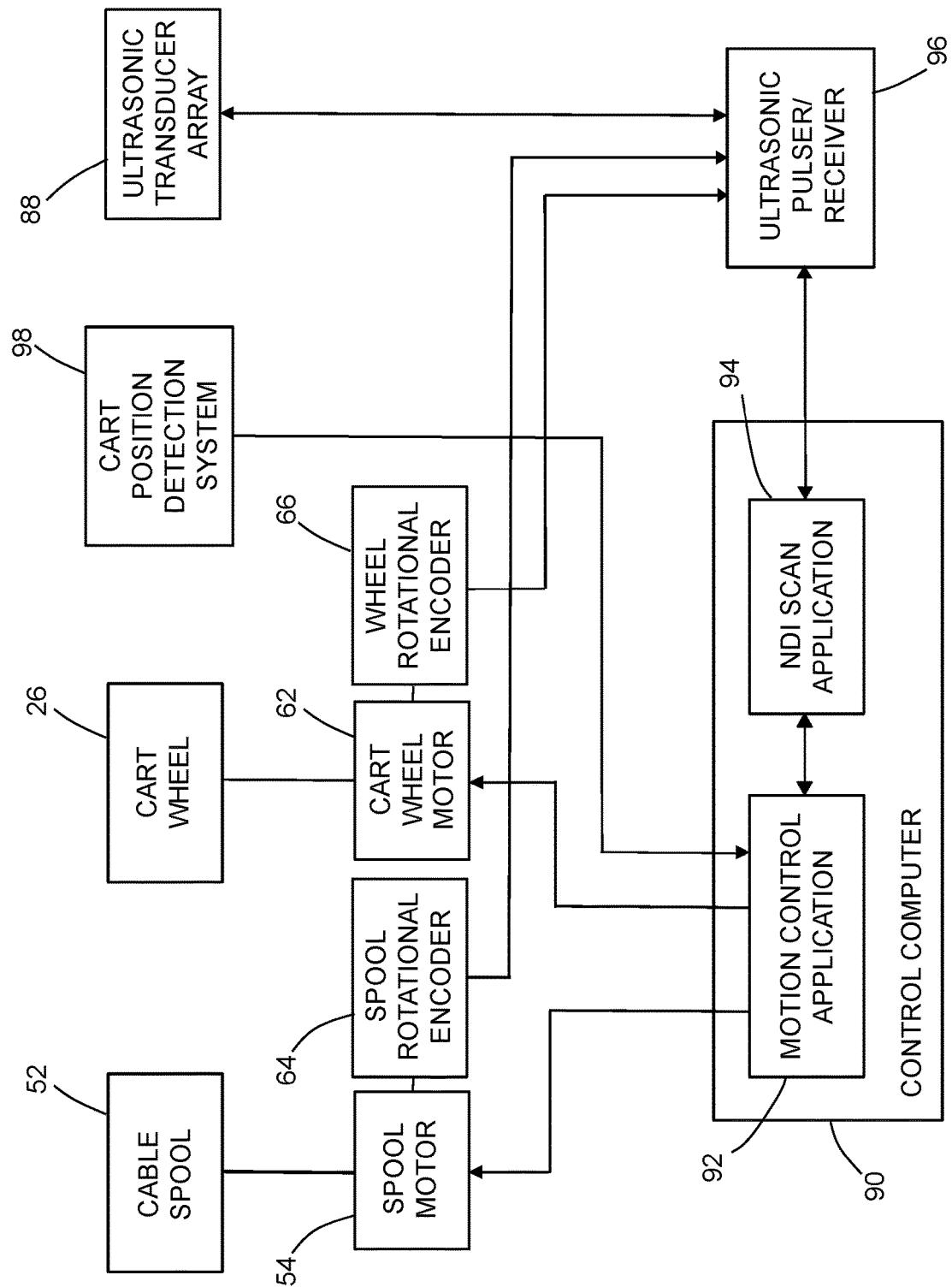
FIG. 4 is a block diagram identifying some components of a computer-controlled apparatus for performing a maintenance operation on a wind turbine blade in accordance with one embodiment.

In accordance with some embodiments, and as described above, the maintenance tools 28 may be embodied as NDI probes having ultrasonic transducer arrays, such as the ultrasonic transducer array 88 shown in FIG. 4. FIG. 4 is a block diagram identifying some components of a system designed for ultrasonic inspection of a wind turbine blade. The system includes a control subsystem that uses rotation encoders to track the relative location (e.g., relative to an initial location acquired using a local positioning system) of each ultrasonic transducer array 88. More specifically, the control system includes a ground-based control computer 90 programmed with motion control application software 92 and NDI scan application software 94. The control computer 90 communicates with a respective motor controller (onboard the cart 18 and not shown in FIG. 4) that controls operation of a respective spool motor 54. Each spool motor 54 in turn may be operated to drive rotation of a respective cable spool 52 during winding or unwinding of a respective cable 22. The control computer 90 also communicates with a motor controller (onboard the cart 18 and not shown in FIG. 4) that controls operation of a cart wheel motor 62. The cart wheel motor 62 in turn may be operated to drive rotation of a cart wheel 26. Rotation of the cart wheel 26 drives displacement of the cart 18 along the leading edge 110 of the wind turbine blade 108. More specifically, the cart wheel motor 62 may be coupled to the cart wheel 26 in a manner that allows the cart 18 to be selectively driven to displace either away from or toward the hub 106 of the wind turbine 100.

In accordance with one proposed implementation, each spool motor 54 and the cart wheel motor 62 are stepper motors. The control computer 90 may comprise a general-purpose computer programmed with motion control application software 92 comprising respective software modules for communicating with the respective motor controllers onboard the cart 18 that control each spool motor 54 and the cart wheel motor 62. The motion control application 92 sends commands based on rotation feedback from respective rotational encoders, namely, a spool rotational encoder 64 and a cart wheel rotational encoder 66. The rotational counts from the encoders are converted into linear measurements. More specifically, a count from the spool rotational encoder 64 represents a distance traveled by the crawler vehicle 20 in a chordwise direction, whereas a count from the cart wheel rotational encoder 66 represents a distance traveled by the cart 18 in a spanwise direction. In one embodiment, the control computer 90 is connected to the motors and encoders via an electronics box (not shown in FIG. 4) and a power/signal cord (not shown) that connects the ground control workstation with the cart 18 on the wind turbine blade 108. The electronics box contains the system power supplies and integrates all the scanner control connections and provides an interface between the control computer 90 and the motor controllers onboard the cart 18.

In another embodiment, the control computer 90 communicates wirelessly with the cart 18 via a wireless system such as a radio frequency (RF) system. Inspection information can then be transmitted wirelessly from the cart 18 to the control computer 90 in real-time to enable the remote operator to visually observe the inspection of the wind turbine blade 108 in real-time. In other embodiments, the crawler vehicles 20 may communicate wirelessly and directly with the control computer 90, receiving motor control signals and transmitting inspection information individually.

In accordance with one variation of a wireless embodiment, the cart 18 includes power supplies, e.g., batteries, to drive the various motors to position the cart 18 and the crawler vehicles 20 to perform an inspection of the wind turbine blade 108. In this case the crawler vehicles 20 receive power from the cart 18 by way of respective power cords.

In accordance with other variations of a wireless embodiment, a small internal combustion engine or set of solar panels on each crawler vehicle 20 would power the vacuum motors, Mecanum wheels, controller logic, and wireless communications. In addition, the cart 18 and crawler vehicles 20 may be provided with transceivers for enabling control signals to be sent wirelessly from the cart 18 to each crawler vehicle 20 and inspection information to be sent wirelessly from each crawler vehicle 20 to the cart 18, thus eliminating power/signal cords 60 (i.e., each crawler vehicle 20 would be tethered to the cart 18 by a respective fall protection cable 22, as shown in FIG. 1).

The encoded data from the spool rotational encoder 64 and cart wheel rotational encoder 66 onboard the cart 18 is provided to an ultrasonic pulser/receiver 96, which may be mounted on the cart 18 or at the control workstation. In the former case, the inspection information from the crawler vehicles 20 may be sent to the ultrasonic pulser/receiver 96 onboard the cart 18 via respective power/signal cords 60 or wirelessly. In the latter case, the encoded data from the spool rotational encoder 64 and cart wheel rotational encoder 66 onboard the cart 18 may be sent to the ultrasonic pulser/receiver 96 on the ground via a cable or a wireless communication channel.

Referring again to FIG. 4, the pulser/receiver 96 sends the encoder pulses to the NDI scan application 94. The NDI scan application 94 uses the encoder values to position the scan data in the proper location. The control computer 90 hosts ultrasonic data acquisition and display software that controls the ultrasonic pulser/receiver 96. The ultrasonic pulser/receiver 96 in turn sends pulses to and receives return signals from the ultrasonic transducer array 88 via a power/signal cord 60, which may run from the control computer 90 on the ground to the cart 18 on the leading edge of the wind turbine blade 108 and then to the crawler vehicle 20. The NDI scan application software 94 controls all details of the scan data and the display of data, including the stitching of data acquired during adjacent sweeps of the ultrasonic transducer arrays 88.

The system depicted in FIG. 4 further includes a cart position detection system 98 that is configured to acquire cart position data representing the initial coordinate position of the cart 18 relative to a coordinate system (i.e., frame of reference) of the wind turbine blade 108. Once the initial coordinate position of the cart 18 has been determined, the data acquired by the cart wheel rotational encoder 66 can be used to track each incremental movement away or toward the initial coordinate position. This enables the control computer 90 to track the spanwise position of the cart 18 during the performance of a maintenance operation on the wind turbine blade 108.

The cart position detection system 98 may take many different forms. For example, the cart position detection system 98 may include a string encoder mounted on the cart 18. The string encoder includes a string having one end which may be attached to a string encoder attachment device fixedly coupled to the root of the wind turbine blade 108. The string encoder can be used to measure the distance of the cart 18 from the hub 106, which in turn enables determination of the spanwise position of the cart 18 on the wind turbine blade. In scanning scenarios in which the NDI probes sweep along adjacent chordwise scan paths, the control computer 90 can be configured to determine and map the spanwise position along the wind turbine blade 108 of each NDI probe, based in part on the spanwise position of the cart 18, and then use that position mapping for each NDI probe to stitch acquired NDI sensor data together for the purpose of imaging a scanned region.

In accordance with an alternative embodiment, the cart position detection system 98 may include a laser range meter mounted on the hub 106 of the wind turbine 100 and an optical target (e.g., a retroreflector) mounted on the cart 18 (or vice versa). The control computer 90 may be programmed to control operation of the laser range meter and receive range data therefrom for wireless transmission to a control station. Measurement data from the laser range meter can be used to obtain estimates of the distance from the laser range meter to the optical target, which distance can be used to compute the spanwise position of the cart 18 in the frame of reference of the wind turbine blade 108. A typical laser range meter comprises a laser diode which transmits a bundled, usually visible, laser beam toward the optical target. The light which is backscattered and/or reflected by the optical target is imaged on the active surface of a photoreceiver by receiving optics. The photoreceiver has a position and an orientation which are fixed relative to the position and orientation of the laser diode. The time-of-flight between transmission and reception of the light can be used to calculate the distance between the laser range meter and the optical target. Alternatively, a distance meter which directionally projects wave energy other than a laser beam could be utilized.

In accordance with a further embodiment, the cart position detection system 98 may include closed-loop feedback control using a motion capture system of the type disclosed in detail in U.S. Pat. No. 7,643,893. In accordance with one embodiment, the motion capture system is configured to measure the spanwise position of the cart 18 as the cart 18 operates within a control volume. A processor receives the measured motion characteristics from the motion capture system and determines a control signal based on the measured motion characteristics. A position control system receives the control signal and continuously adjusts the cart motion to maintain or achieve a desired motion state. The cart 18 may be equipped with optical targets in the form of passive retro-reflective markers. The motion capture system, the processor, and the position control system comprise a complete closed-loop feedback control system.

In addition, the structure and operation of a system that uses optical motion capture hardware for position and orientation tracking of end effectors (e.g., NDI sensors) are disclosed in detail in U.S. Pat. No. 8,892,252. In accordance with a basic system configuration for a motion capture-based tracking method, multiple motion capture cameras (at least two) are set up around a wind turbine blade 108 to create a three-dimensional capture volume that captures motion for all six degrees-of-freedom (6-DoF) of the cart 18. Preferably the cart 18 has a group of passive retro-reflective markers (at least three) attached thereto and arranged in a unique pattern. Each motion capture camera can be a video camera of the type comprising a ring of light-emitting diodes (LEDs) surrounding a camera lens. In conjunction with such cameras, each retro-reflective marker may comprise a hemispherical or ball-shaped body coated with retro-reflective paint that reflects impinging light from the LEDs of each camera back toward the associated lens of the respective camera. The motion capture system utilizes data captured from image sensors inside the cameras to triangulate the three-dimensional position of the target object between multiple cameras configured to provide overlapping projections. The motion capture processor collects real-time image information from all of the motion capture cameras, processes the image data, and sends the information along a dedicated connection to a motion tracking and applications computer. At each frame update, the positions of all of the passive markers in the capture volume can be captured by each camera and converted by the motion capture processor into three-dimensional coordinates, resulting in a full 6-DoF position and orientation representation for the cart 18.

In the specific application described in this disclosure, the motion capture cameras can be placed at any one of the following locations: (a) on a self-supporting structure; (b) on the nacelle 104 of the wind turbine 100; (c) on wind turbine blades other than the wind turbine blade undergoing the maintenance procedure; (d) on the tower 102; and (e) on the cart 18 pointed back at passive markers attached near the hub 106 of the wind turbine 100.

Figure 6A:
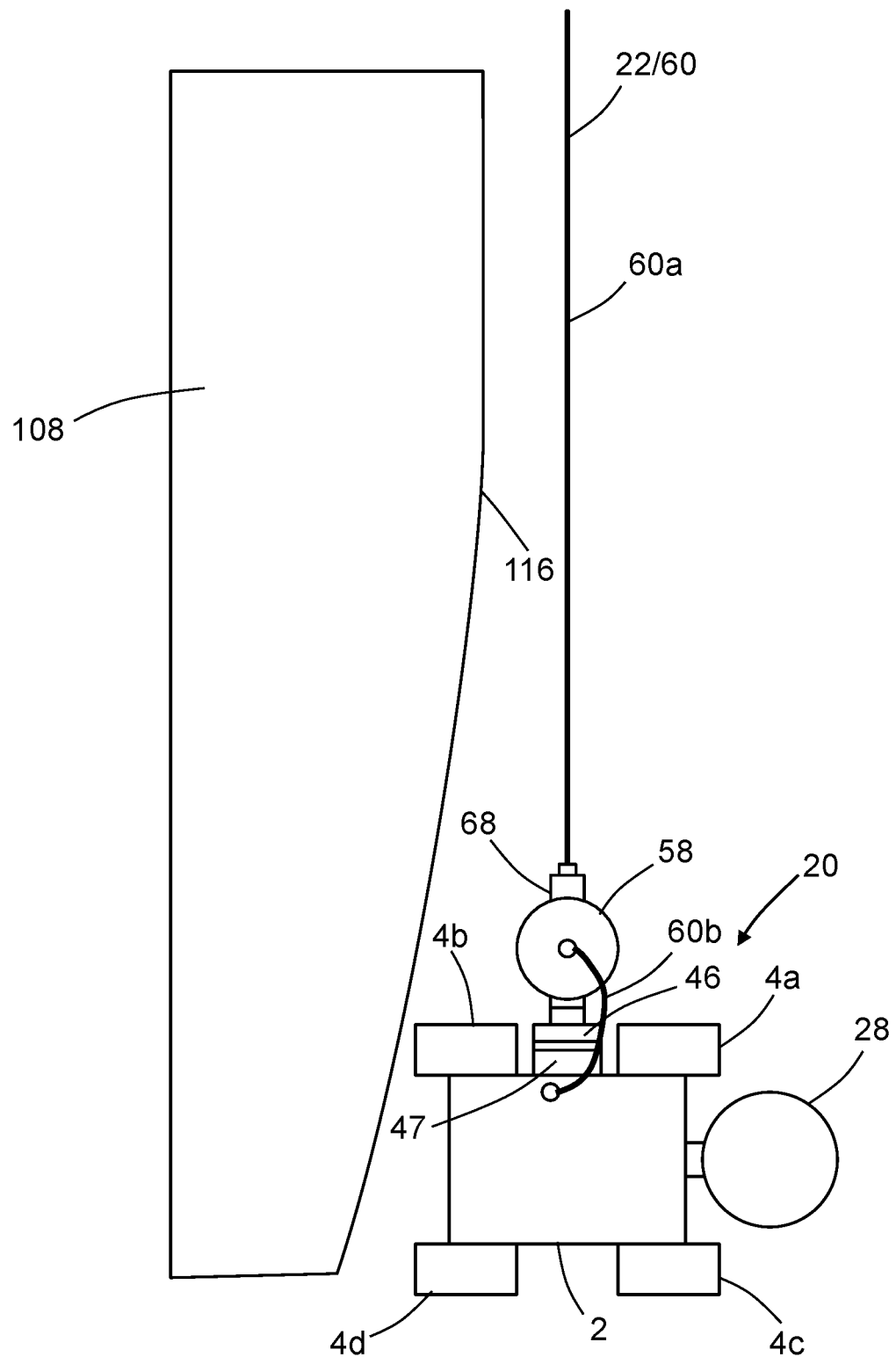
FIGS. 6A through 6D are diagrams representing views of a cable-suspended crawler vehicle during four stages of a procedure for realigning the crawler vehicle with a surface of a wind turbine blade.
Figure 6B:
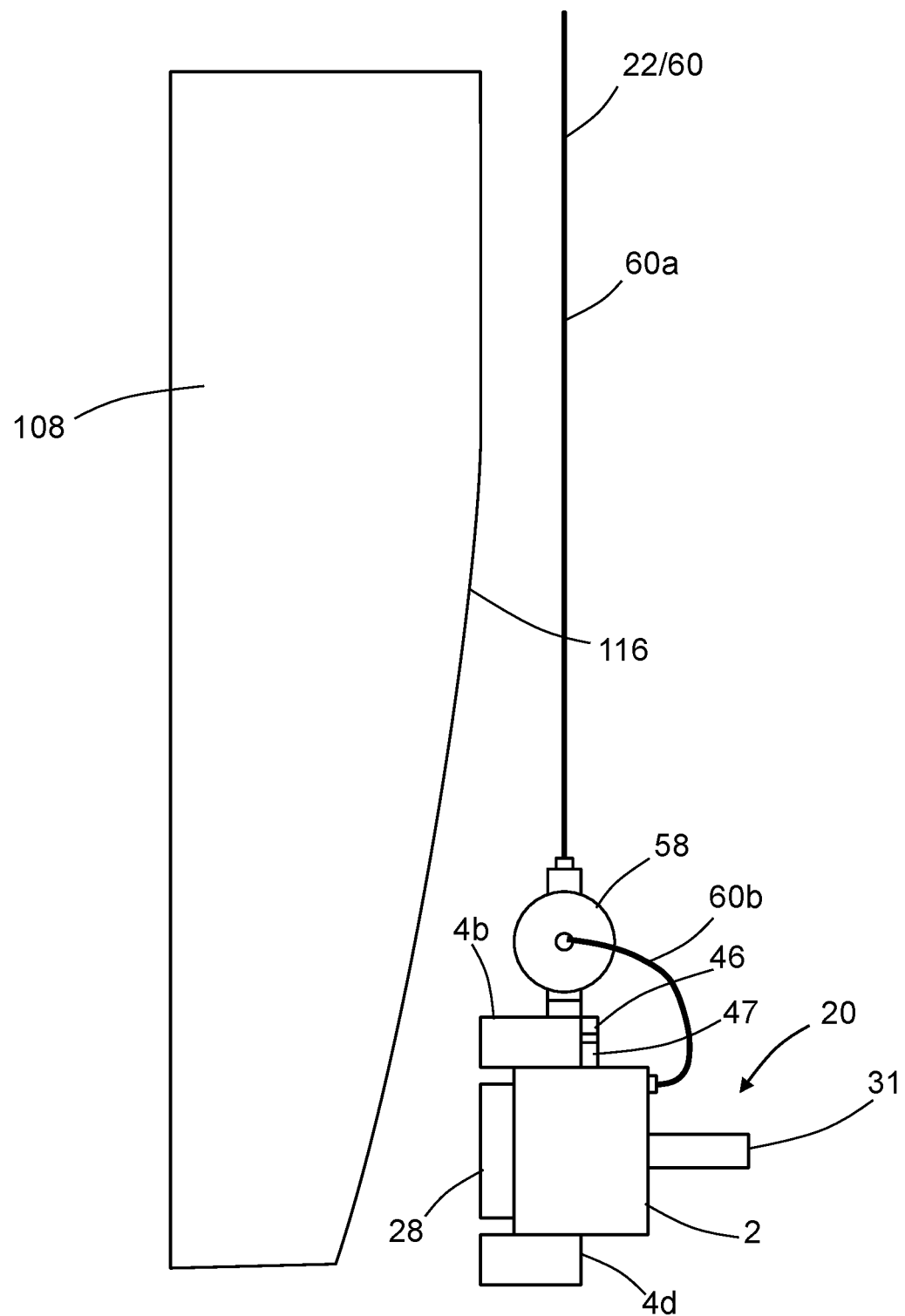

In accordance with some embodiments, the maintenance tool 28 carried by each crawler vehicle 20 may be translatable in a normal direction away from the side surface 114 or 116 of the wind turbine blade 108 to allow the maintenance tool 28 to be lifted over obstacles. In accordance with other embodiments, each crawler vehicle 20 has the ability to realign with and re-adhere to the side surface 114 or 116 of the wind turbine blade 108 when the crawler vehicle 20 is out of alignment and hanging freely from a cable 22, the wheels 4a-4d of the crawler vehicle 20 not in contact with the side surface, as depicted in FIG. 6A (to be described in detail later).

Figure 5A:
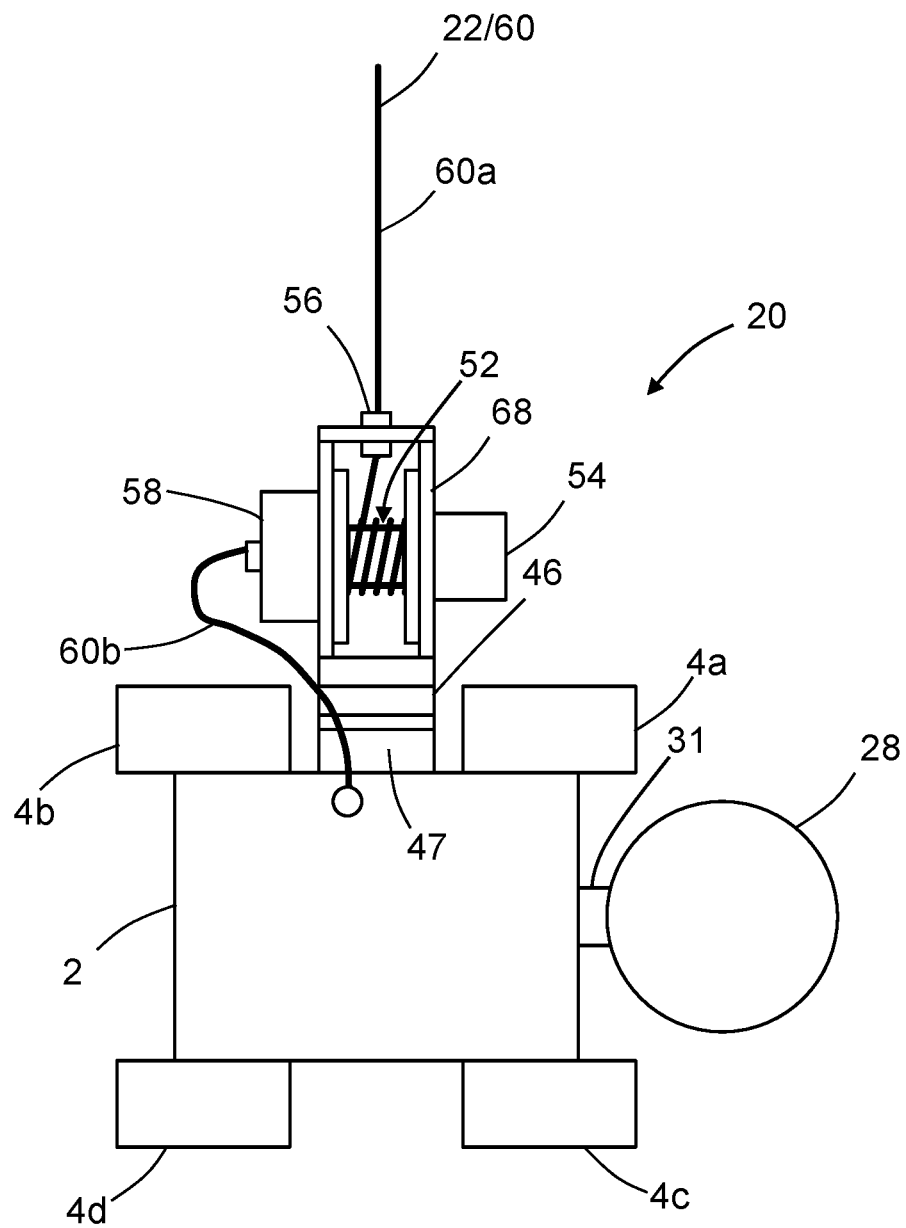
FIG. 5A is a diagram representing a plan view of a cable-suspended crawler vehicle having a turret-mounted cable spool in accordance with one embodiment.
Figure 5B:
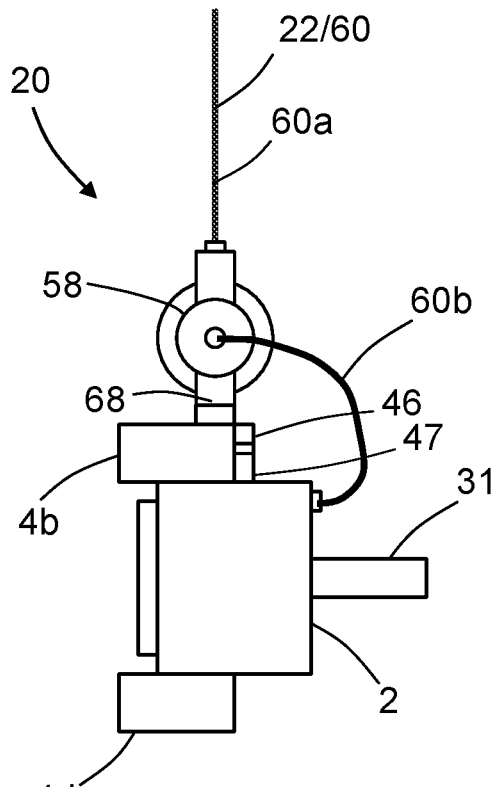
FIGS. 5B and 5C are end and top views respectively of the cable-suspended crawler vehicle depicted in FIG. 5A.

Both of these features (i.e., lifting of the maintenance tool 28 over obstructions and realignment/re-adherence of the crawler vehicle 20 with the blade surface) are combined in the embodiment depicted in FIG. 5, which is a plan view of a crawler vehicle 20 connected to a cable 22 having a power/signal cord 60 incorporated therein or attached thereto (hereinafter "cable/cord 22/60"). The crawler vehicle 20 has four wheels with respective axes of rotation that lie in a plane. This plane will be referred to herein as the "crawler vehicle plane". FIGS. 5A and 5B are end and top views respectively of the crawler vehicle 20 depicted in FIG. 5.

Figure 5C:
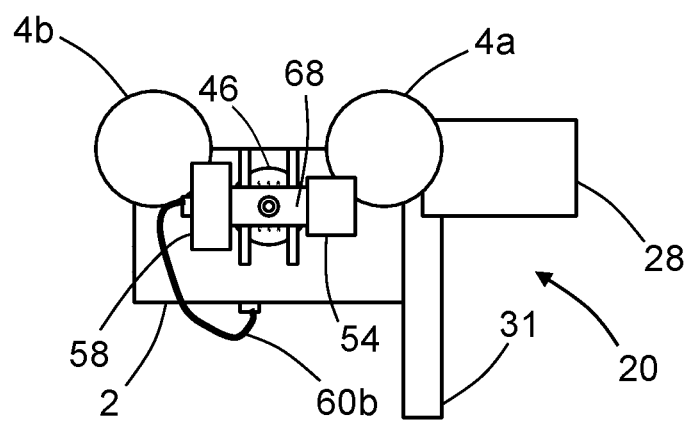

The crawler vehicle 20 depicted in FIG. 5 includes a maintenance tool 28 that is translatable along an axis that may be perpendicular to the crawler vehicle plane. This capability enables the maintenance tool 28 to be lifted over obstacles in the path of the crawler vehicle 20. In accordance with one embodiment, the means for translating the maintenance tool 28 away from the surface on which the maintenance operation is being performed may take the form of a motorized linear slide 31. In the alternative, there are many different types of actuators that may be used with a linear motion bearing. For example, the maintenance tool 28 may be affixed to a carriage that is driven to slide by a linear actuator (e.g., a motorized lead screw, a motorized rack-and-pinion arrangement, a hydraulic actuator or a pneumatic actuator). In response to detection of an obstacle in the path of the crawler vehicle 20, a controller 44 (shown in FIG. 11) onboard the crawler vehicle 20 activates the linear actuator to cause the maintenance tool 28 to translate to a retracted position whereat contact with the obstacle may be avoided.

The crawler vehicle 20 further includes a cable spool 52 which is rotatably coupled to a spool support 68. The spool support 68 has an opening at the top where the cable/cord 22/60 passes through a cable holder 56 that is inserted in the opening. During uptake or payout (i.e., winding or unwinding) of the cable/cord 22/60, the cable spool 52 is driven to rotate by a spool motor 54 that is mounted to the spool support 68. The axis of rotation of the cable spool 52 is collinear with a spool axle (not shown in FIG. 5, but see spool axle 50 in FIG. 11) of the cable spool 52.

The spool support 68 in turn is fixedly coupled to an alignment turret 46 which is rotatable on a turret base 47 to facilitate alignment of a crawler vehicle 20 with a surface. The turret base 47 is fixedly coupled to the crawler vehicle frame 2. The alignment turret 46 is rotatable about an axis of rotation which is perpendicular to the spool axle 50 of the cable spool 52 and parallel to the crawler vehicle plane. The alignment turret 46 is driven to rotate by a turret motor (not shown in FIG. 5, but see turret motor 48 in FIG. 11). Thus the spool support 68 is rotatable about an axis of rotation of the alignment turret 46. The utility of this alignment feature will be explained more fully below with reference to FIGS. 6A through 6D.

Still referring to FIG. 5, each crawler vehicle 20 further includes a multiplicity of motors (not shown in FIG. 5, but see FIG. 11) that receive electrical power via the power/signal cord 60 that extends from the cart 18 to the crawler vehicle 20. The power/signal cord 60 also provides control signals from a controller (e.g., a computer system) which controls the operation of the motors on the crawler vehicle 20. In cases where the maintenance tool 28 is an NDI probe, the power/signal cord 60 also provides a pathway for sending NDI sensor data acquired by the NDI probe to a transceiver onboard the cart 18, which transceiver relays the NDI sensor data to a ground station (e.g., control computer 90 in FIG. 4).

As seen in FIG. 5, the power/signal cord 60 includes: (a) a first section 60a that extends from the cart 18 in parallel with the cable 22, separates from the cable 22 at the cable spool 52 and then enters a cord counter-reel 58; and (b) a second section 60b that exits the cord counter-reel 58 and connects to an electronics box (not shown in FIG. 5) mounted to the crawler vehicle frame 2. The cord counter-reel 58 compensates for cord twisting due to spool rotation, which allows the power/signal cord 60 to be unbrokenly routed to the electrical components mounted to the crawler vehicle frame 2. Within the cord counter-reel 58, a portion of the power/signal cord 60 is pre-twisted in a direction opposite to the direction of spool rotation. When the cable spool 52 rotates during uptake, the portion of the power/signal cord 60 within the cord counter-reel 58 counter-rotates to untwist the power/signal cord 60, thus avoiding cord kinking.

In accordance with an alternative embodiment, instead of an unbroken power/signal cord, electrically conductive brushes that contact concentric electrically conductive rings on one spool face may be employed. Each wire from the source section of the cord is connected to an individual ring, and a corresponding wire from the crawler vehicle section of the cord is connected to a corresponding brush. As the cable spool 52 rotates, the brushes maintain contact with their rings, thereby enabling continuous supply of power and continuous communication of signals regardless of spool rotation. In accordance with further alternative embodiments, the crawler vehicles may communicate wirelessly with a ground-based control station while receiving electrical power from batteries mounted on the cart 18. This would avoid the use of a multiplicity of power/signal cords running from the crawler vehicles 20 to the ground-based control station via the cart 18. The wireless communications would include: (a) the sending of control signals from a transceiver at the ground-based control station to transceivers on the cart 18 and on the crawler vehicles 20, which control signals are then forwarded to the motor controllers onboard cart 18 and crawler vehicles 20 for controlling movements of the crawler vehicles 20; and (b) the sending of data acquired by the NDI sensor units onboard the crawler vehicles 20 from the transceivers onboard the crawler vehicles 20 to the transceiver at the ground-based control station.

Figure 6C:
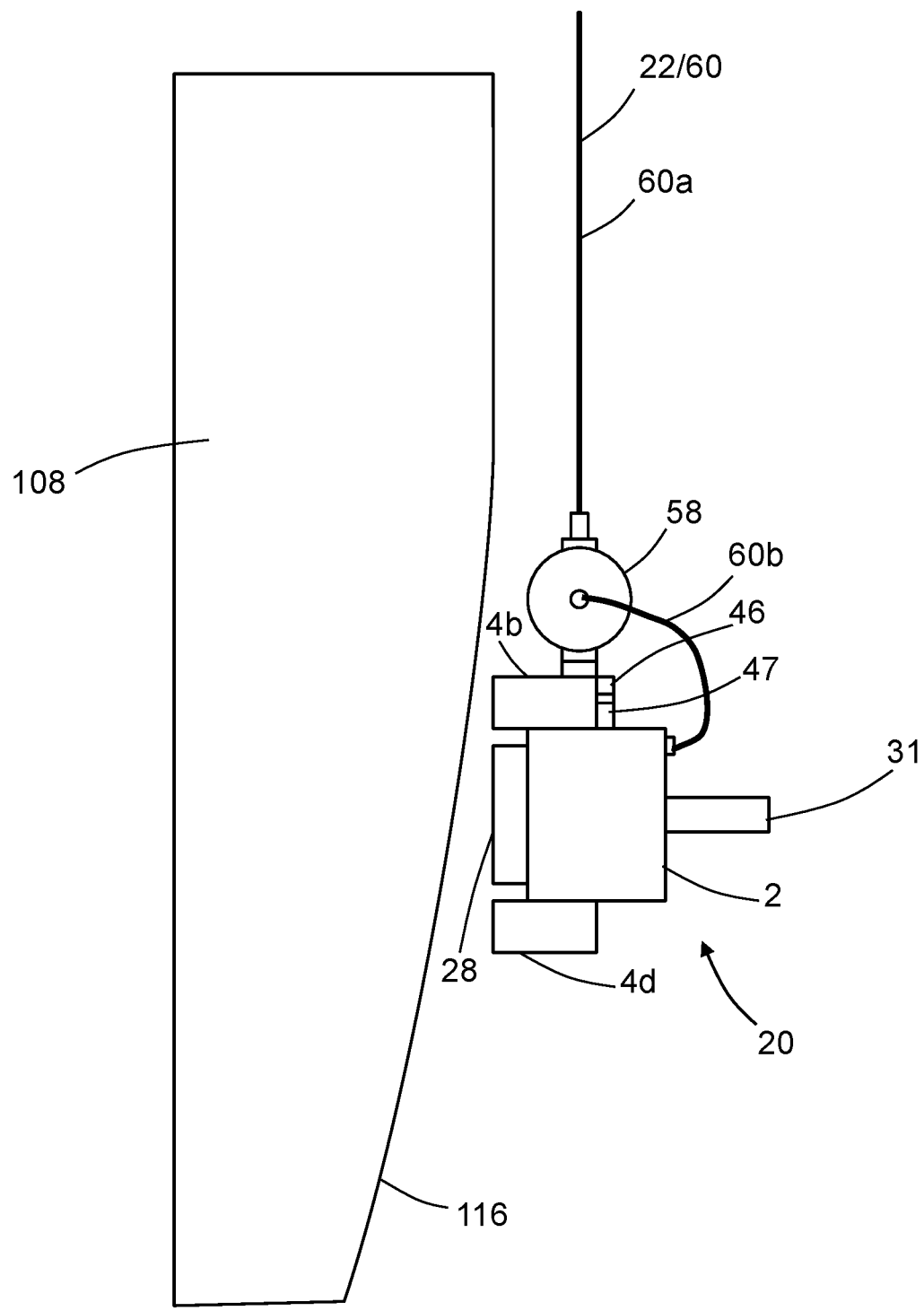
Figure 6D:
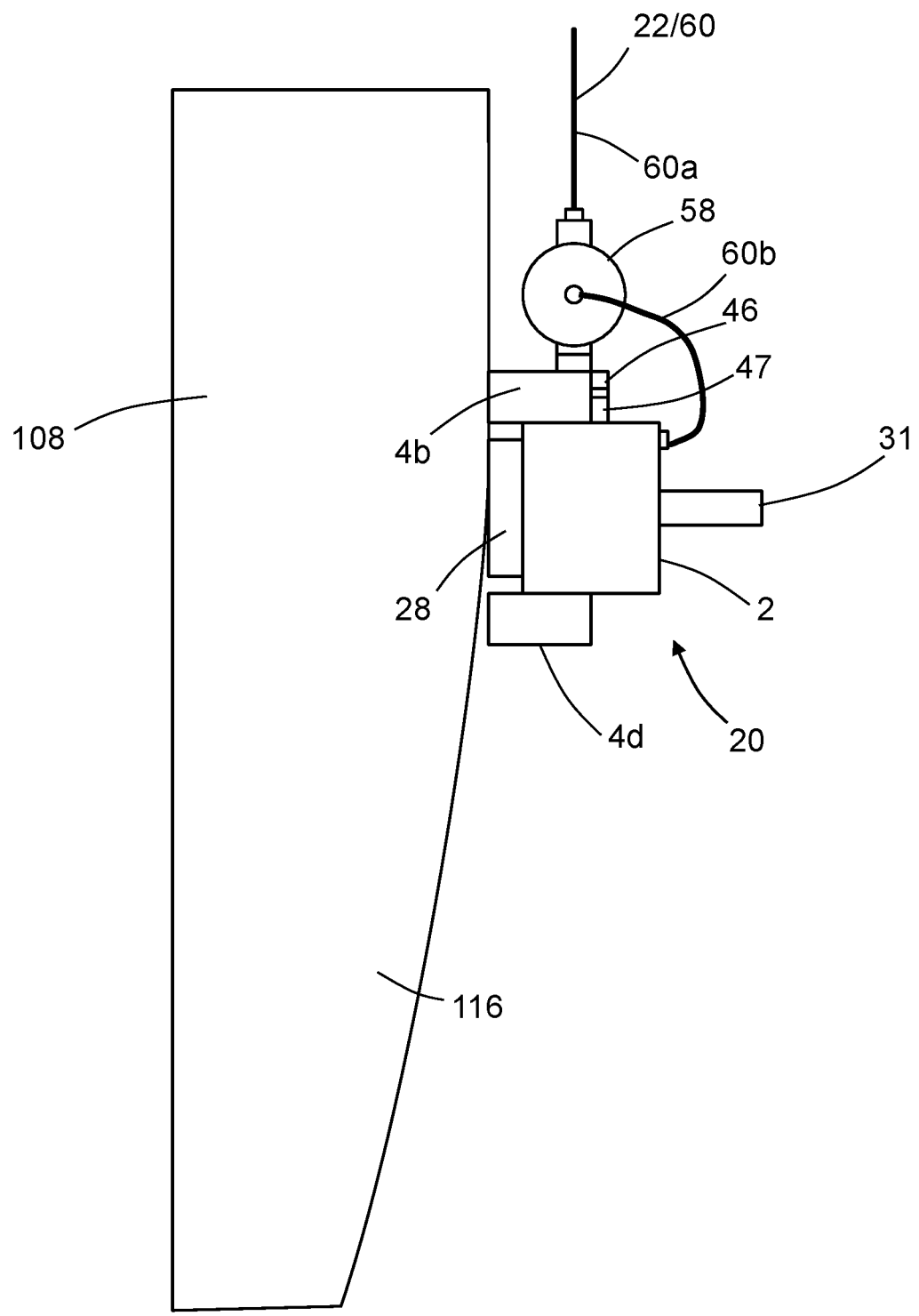

In accordance with a further beneficial aspect, the ability of the crawler vehicle 20 to rotate about an axis of the cable 22 when none of wheels 4a-4d are in contact with the wind turbine blade 108 can be used in a procedure for realigning the crawler vehicle 20 with a surface of the wind turbine blade 108. FIGS. 6A through 6D are diagrams representing views of a cable-suspended crawler vehicle 20 during a procedure for realigning the crawler vehicle with a surface of a wind turbine blade. Initially (as seen in FIG. 6A) the crawler vehicle 20 is supported by the cable 22 only and not in contact with the wind turbine blade 108. In addition, the crawler vehicle 20 is not aligned with the wind turbine blade 108. In accordance with an alignment procedure, the turret 46 is rotated by a number of degrees relative to the turret base 47 of the turret 46, which rotation causes the crawler vehicle 20 to rotate about an axis of the cable 22 the same number of degrees in an opposite direction relative to cable spool (not visible in FIGS. 6A-6D), which does not rotate relative to the cable 22. In the example depicted in FIGS. 6A and 6B, the crawler vehicle 20 is rotated by about 90 degrees. At the end of this rotation, the four wheels 4a-4d all face toward the wind turbine blade with the orientation depicted in FIG. 6B. In the next stage of the alignment procedure, the cable spool is rotated to take-up a length of cable 22 sufficient to lift the crawler vehicle 20 to an elevation whereat at least a first wheel 4a and a third wheel 4b are in contact with the side surface 116 of the wind turbine blade, as partly seen in FIG. 6D. FIG. 6C shows the crawler vehicle 20 at an intermediate elevation during lifting from the elevation seen in FIG. 6B to the elevation seen in FIG. 6D.

FIGS. 6A-6D show one embodiment of a method for realigning a hanging crawler vehicle on a surface of a structure. Generalizing the method for re-aligning so that it is not limited to use in conjunction with the maintenance of wind turbine blades, the method in accordance with one embodiment includes the following steps: (a) suspending the crawler vehicle 20 from an end of a cable 22, the crawler vehicle 20 being suspended at an elevation at which the crawler vehicle 20 is not in contact with the surface of the structure; (b) rotating the crawler vehicle 20 relative to the end of the cable 22 to cause two adjacent wheels of the crawler vehicle 20 (e.g., the rear wheels 4b and 4d or the front wheels 4a and 4c) to move in tandem closer to the surface of the structure until the wheels 4a and 4b of the crawler vehicle 20 are equidistant or nearly equidistant from the surface of the structure; and (c) raising the end of the cable 22 until wheels 4a and 4b are in contact with the surface of the structure.

In accordance with some embodiments of the system proposed herein, holonomic-motion crawler vehicles are employed. One embodiment of a crawler vehicle 20 capable of moving holonomically on a non-level surface will now be disclosed for the purpose of illustration. While the disclosed embodiment carries a non-destructive inspection sensor for inspecting the surface on which the crawler vehicle travels, the holonomic-motion crawler vehicle 20 disclosed herein can alternatively carry other types of tools, such as tools needed in maintenance or painting operations.

Figure 7:
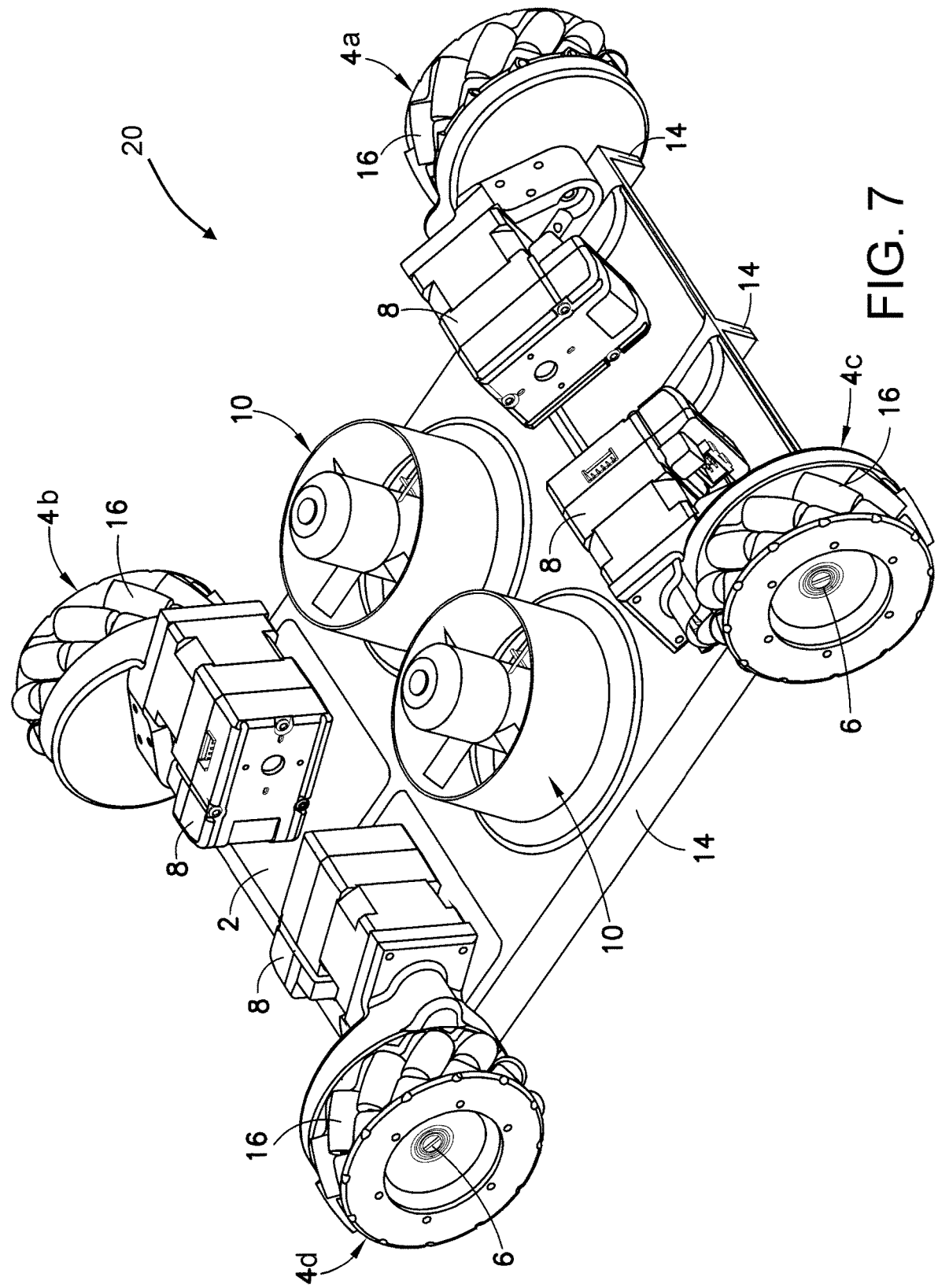
FIG. 7 is a diagram representing a three-dimensional view of parts of a holonomic-motion crawler vehicle having two suction zones in accordance with one embodiment. The electrical connections for supplying signals for controlling operation of the depicted components and other components are not shown.

FIG. 7 shows parts of a holonomic-motion crawler vehicle 20 having four Mecanum wheels 4a-4d and two suction zones 12 (shown in FIG. 8) in accordance with one embodiment. The electrical connections for supplying signals for controlling operation of the depicted components are not shown. This holonomic-motion platform comprises a crawler vehicle frame 2 with four Mecanum wheels 4a-4d (two type "A" and two type "B") mounted to the crawler vehicle frame 2 by means of respective axles 6, and further comprises four independently controlled stepper motors 8 (one per wheel). The Mecanum wheels 4a-4d are arranged with the "A" pair on one diagonal and the "B" pair on the other, with each having its axle 6 perpendicular to a line running through the center of the vehicle. Each stepper motor 8 controls the rotation of a respective wheel 4.

Figure 8:
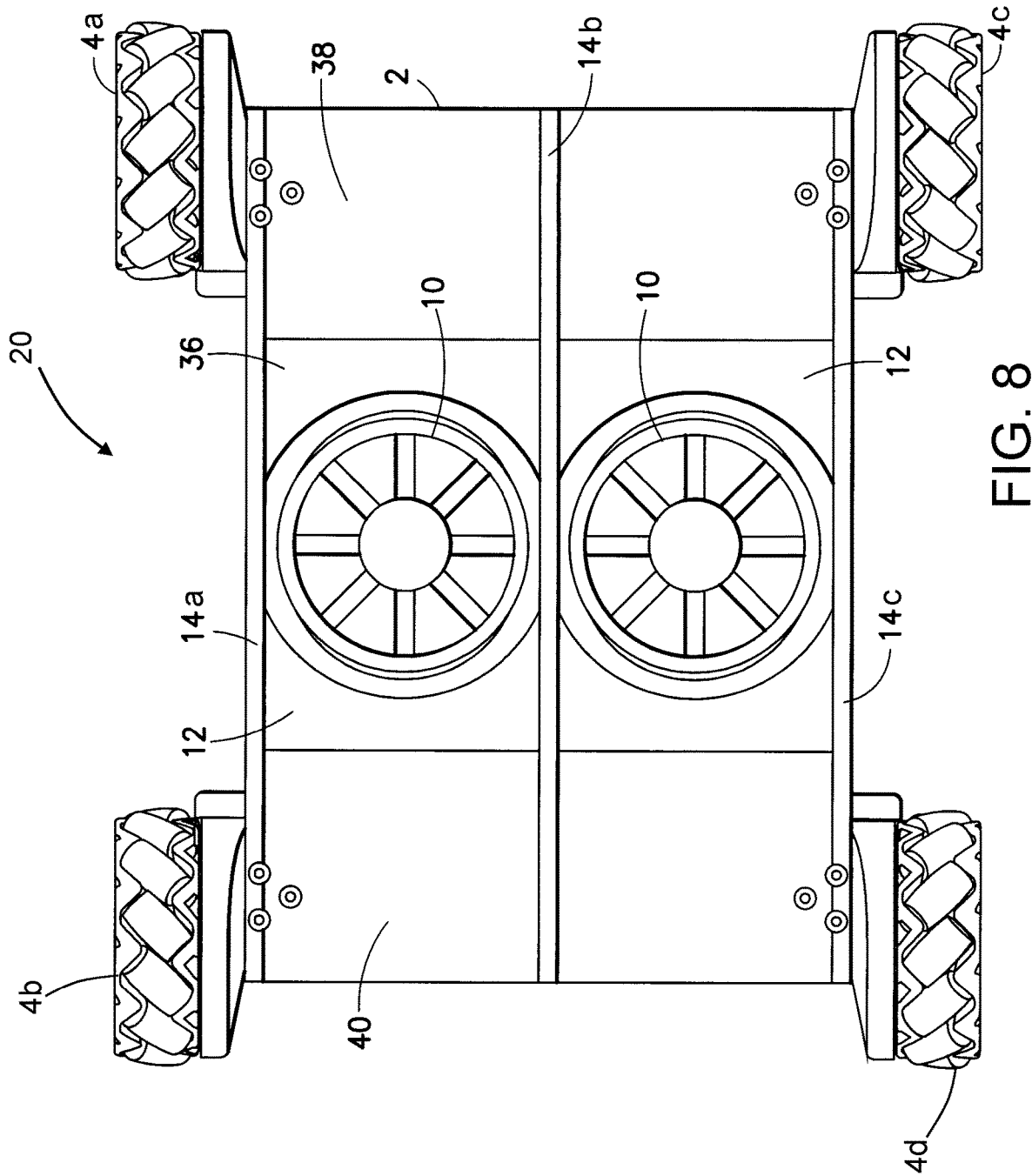
FIG. 8 is a diagram showing a top view of a prototype of a Mecanum-wheeled crawler vehicle having dual suction zones.
Figure 11:
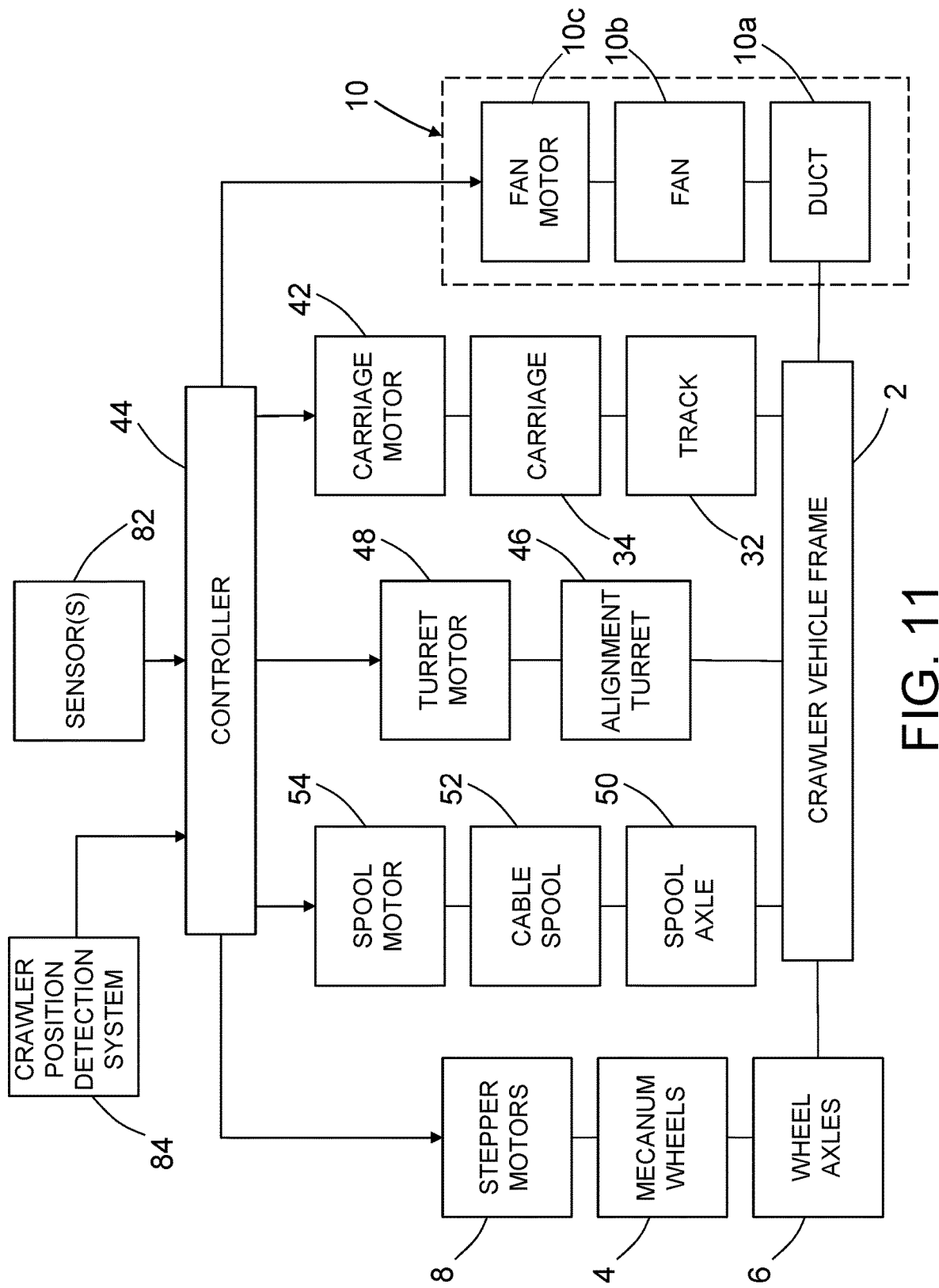
FIG. 11 is a block diagram identifying some components of a holonomic-motion crawler vehicle in accordance with another embodiment.

The embodiment depicted in FIG. 7 also has two suction devices 10 arranged side by side in the middle of the crawler vehicle frame 2, midway between the front and rear wheels. In this particular embodiment, each suction device 10 is a respective electric ducted fan which is mounted in a respective opening (not shown in FIG. 7) formed in the frame 2. As indicated in FIG. 11, each suction device 10 comprises a fan 10b which is rotatable about an axis, a duct 10a surrounding the fan, and an electric fan motor 10c which drives the fan 10b to rotate in a direction such that air is propelled from a respective channel or space underneath the crawler vehicle frame 2 (hereinafter "suction zone 12" depicted in FIG. 8) up through the fan duct 10a, thereby creating suction in the corresponding suction zone 12. Although the disclosed embodiments have a perpendicular fan axis, a perpendicular mounting is not critical to the design. Suction can still be generated if the fan were mounted in other ways, e.g., with a curved duct to channel the air input to the fan 10b from under the vehicle. As seen in FIG. 8, the two suction zones 12 are bounded on opposing sides by three longitudinal low-surface-friction flexible vacuum skirts 14a-14c which are attached to the frame 2, the middle vacuum skirt 14b forming a common boundary wall separating the two suction zones 12. The vacuum skirts 14a-14c may extend downward so that their bottom edges contact the surface on which the holonomic-motion crawler vehicle 20 is moving. It should be appreciated that non-holonomic-motion embodiments of the crawler vehicles 20 depicted in FIG. 1 may be provided with suction devices 10 and suction zones 12 similar in construction to the configuration shown in FIGS. 7 and 8.

FIG. 8 shows a bottom view of the holonomic-motion crawler vehicle 20 depicted in FIG. 7. The underside of the crawler vehicle frame 2 is shaped to provide two suction zones 12 and has low-surface-friction vacuum skirts 14a-14c that conform to non-flat surfaces. Each suction device 10 is installed in a respective opening in the crawler vehicle frame 2 and is in fluid communication with a respective suction zone 12 defined by the frame bottom surface and the vacuum skirts. In the case wherein the suction devices 10 are electric ducted fans, each electric ducted fan propels air upward, thereby sucking air from the shaped suction zones 12. The suction devices 10 can be independently controlled to apply different suction forces to the surface underneath the respective suction zones 12.

In accordance with one proposed implementation, the crawler vehicle depicted in FIG. 8 has dual suction zones 12 separated by a common vacuum skirt 14b which bisects the bottom surface of the crawler vehicle frame 2 along a longitudinal axis. In this particular construction, the upper half of the bottom surface between the uppermost and middle vacuum skirts 14a and 14b comprises a flat central surface 36 having an opening in which the suction device 10 is installed. This flat central surface 36 is flanked by forward and rearward convex surface 38 and 40. Each convex surface 38 and 40 may be an aerodynamically streamlined surface which forms a respective throat with opposing portions of the surface on which the holonomic-motion crawler vehicle 20 is moving. Thus, the contoured bottom surface of the frame crawler vehicle 2, the vacuum skirts 14a-14c and the surface on which the crawler vehicle is moving define respective channels that allow sufficient air to be sucked up through the corresponding electric ducted fan to generate a desired suction force.

Although not shown in FIGS. 7 and 8, the holonomic-motion crawler vehicle 20 may be connected to a power/signal cord 60 which supplies electrical power to the stepper motors 8 and suction devices 10 on the vehicle. A controller 44 (see FIG. 11) consists of respective motor controllers which control the operation of the stepper motors 8 and suction devices 10. For example, each motor controller may include an indexer (e.g., a microprocessor) configured to generate step pulses and direction signal for a driver which is also part of the motor controller. The driver converts the indexed command signals into the power necessary to energize the motor windings. A stepper motor is an electromagnetic device that converts digital pulses into mechanical shaft rotation. The controller 44 may further include a computer or processor for commanding and orchestrating the motor controllers. The holonomic-motion crawler vehicle 20 may further include a converter box (not shown) mounted to the frame 2. The converter box converts USB signals from the controller 44 into pulse-width-modulated (PWM) signals for controlling the fan motors 10c (see FIG. 11).

In accordance with an alternative embodiment, the holonomic-motion crawler vehicle 20 could be battery-powered, instead of receiving electrical power via a power/signal cord 60. Also the controller 44 may be configured to be commanded by a ground-based computer or by means of control signals carried by the power/signal cord 60. Alternatively, the motors onboard the holonomic-motion crawler vehicle 20 can be controlled via a wireless connection to an off-board controller.

As previously mentioned, the holonomic-motion crawler vehicle 20 shown in FIG. 7 utilizes four Mecanum wheels 4a-4d. Each Mecanum wheel 4 has a multiplicity of tapered rollers 16 rotatably mounted to its circumference, each tapered roller 16 being freely rotatable about its axis. These tapered rollers 16 have an axis of rotation which lies at a 45° angle with respect to the plane of the wheel. Type "A" Mecanum wheels have left-handed rollers, while Type "B" Mecanum wheels have right-handed rollers. The holonomic-motion crawler vehicle 20 can be made to move in any direction and turn by varying the speed and direction of rotation of each Mecanum wheel 4. For example, rotating all four wheels 4a-4d in the same direction at the same rate causes forward or backward movement; rotating the wheels on one side at the same rate but in the opposite direction of the rotation by the wheels on the other side causes the vehicle to rotate; and rotating the Type "A" wheels at the same rate but in the opposite direction of the rotation of the Type "B" wheels causes sideways movement. For example, the crawler vehicles 20 depicted in FIG. 1 may be holonomic-motion crawler vehicles 20 of the type depicted in FIG. 7, in which case the ability to move sideways would enable those holonomic-motion crawler vehicles 20 to move up and down (i.e., in a chordwise direction) without motorized winding and unwinding of the cables 22.

The holonomic-motion crawler vehicle 20 disclosed herein has multiple applications. In accordance with one application, the crawler vehicle will carry an ultrasonic sensor, but other types of sensors, such as eddy-current sensors or cameras can be carried. The sensor may be a single sensing element or an array of sensing elements. Cameras, tools, painting equipment, a laser marking system, a robotic arm manipulator, or other devices could also be carried by the platform.

Figure 9:
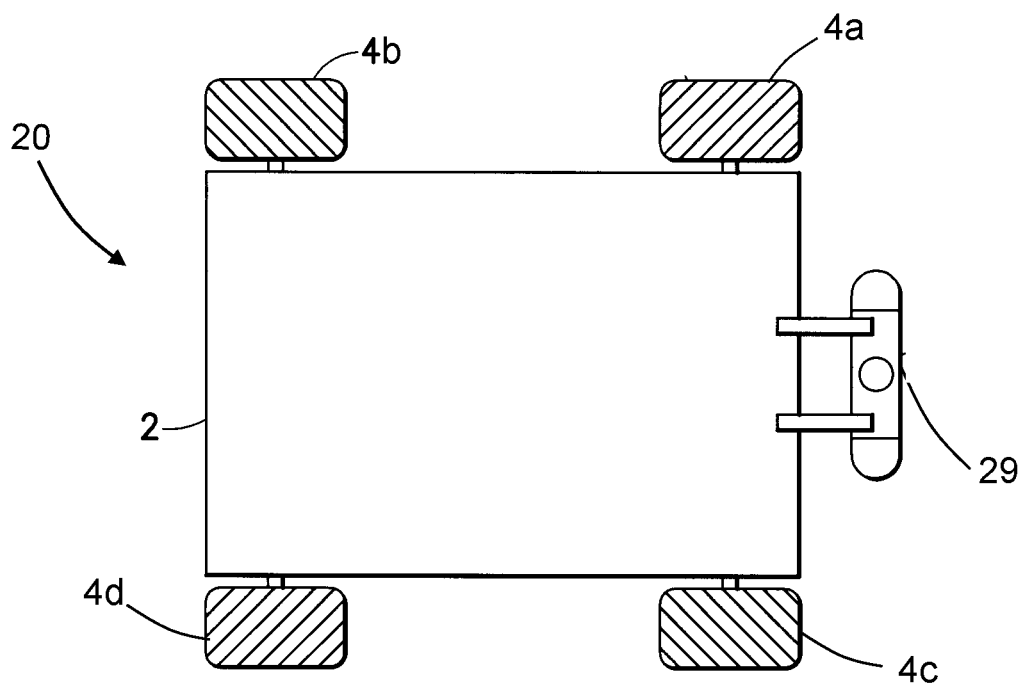
FIG. 9 is a diagram representing a top view of a Mecanum-wheeled frame of a crawler vehicle having a fixed NDI scan head attached to one end thereof.

FIG. 9 shows a version of the holonomic-motion crawler vehicle 20 with a fixed ultrasonic sensor unit 29 mounted to one end of the crawler vehicle frame 2. The ultrasonic sensor unit 29 can scan an underlying surface in the direction in which the vehicle crawls. The ultrasonic sensor unit 29 may include a single ultrasonic sensing element or an array of ultrasonic sensing elements.

Figure 10:
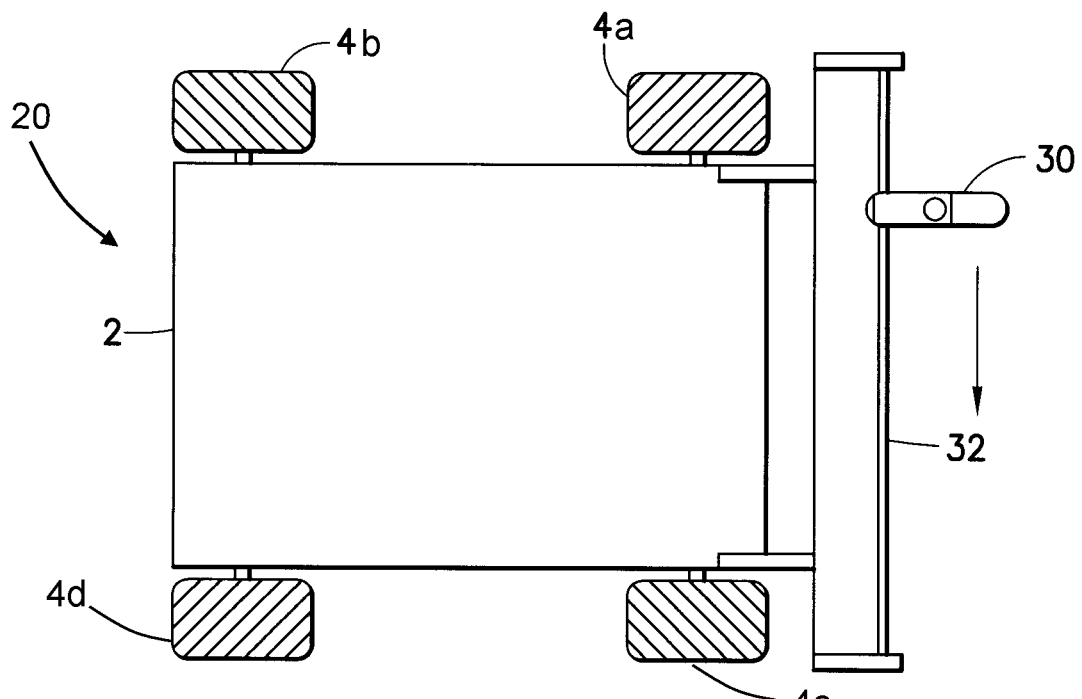
FIG. 10 is a diagram representing a top view of a Mecanum-wheeled frame of a crawler vehicle having a reciprocating NDI scan head mounted to one end thereof.

FIG. 10 shows another version of the holonomic-motion crawler vehicle 20 with a scanning ultrasonic sensor unit 30 mounted on a carriage (not visible in FIG. 10) that is translatably coupled to a track 32 fixed to one end of the crawler vehicle frame 2. The scanning ultrasonic sensor unit 30 can slide back and forth along the track 32, scanning a transverse area of underlying surface while the holonomic-motion crawler vehicle 20 is stationary and while the cart 18 is stationary. Again, the scanning ultrasonic sensor unit 30 may be a single sensing element or an array of sensing elements. The holonomic-motion crawler vehicle 20 can be moved forward in increments, pausing after each incremental move to allow the ultrasonic sensor unit 30 to scan along a transverse line. A controller (see controller 44 in FIG. 11) can be programmed to control the movements of the holonomic-motion crawler vehicle 20 and the scanning ultrasonic sensor unit 30 to produce a pre-programmed pattern for scanning all of a surface area assigned to the particular holonomic-motion crawler vehicle 20.

During the performance of a maintenance operation, the concurrent movements of a multiplicity of crawler vehicles may be tracked using any one of a variety of crawler vehicle position detection systems. Knowing where each crawler vehicle is located at any time is important. For example, in cases where the maintenance tools are NDI probes, the locations of the NDI probes are correlated with the acquired NDI sensor data to ensure full coverage and potentially create an NDI map of the surface of the wind turbine blade. Along-blade positioning (i.e., in a spanwise direction) is done using measurements already discussed. Across-blade positioning (i.e., in a chordwise direction) can be done in the following ways:

(a) String encoders extending from the cart 18 to each crawler vehicle 20 may be used.

(b) Wheel rotational encoders on each crawler vehicle 20 may be used to track vertical motion (and also horizontal motion if crawling forward and backward is done).

(c) Laser-based methods may be used. For example, a laser-based crawler vehicle position detection system may include laser range meters mounted on the cart 18 and aimed at optical targets mounted on each crawler vehicle 20. To enable lines-of-sight to be maintained, the laser devices may be mounted on the distal ends of robotic (e.g., articulated) arms that extend from each side of the cart 18, while the optical targets are mounted on the crawler vehicles 20 in a manner such that the emitted laser beams impinge on those optical targets.

(d) Camera- or video-based methods may be used, such as motion capture using optical targets mounted on each crawler vehicle 20.

(e) Rotational encoders coupled to the cable spools 52 may be used to provide the across-blade location determination.

FIG. 11 is a block diagram identifying some components of a holonomic-motion crawler vehicle in accordance with another embodiment. This holonomic-motion crawler vehicle includes a crawler vehicle frame 2 having a set of four wheel axles 6 fixedly coupled thereto. A set of four Mecanum wheels 4a-4d are rotatably coupled to respective wheel axles 6. A set of four stepper motors 8 are configured to respectively drive rotation of the Mecanum wheels 4a-4d in response to control signals received from a controller 44 (e.g., a computer system). In addition, one or more suction devices 10 are incorporated in the crawler vehicle frame 2. Each suction device 10 includes a fan 10b which is rotatable about an axis, a duct 10a surrounding the fan, and an electric fan motor 10c which drives the fan 10b to rotate in response to control signals received from the controller 44. The holonomic-motion crawler vehicle further includes a spool axle 50 fixedly coupled to the crawler vehicle frame 2, a cable spool 52 rotatably coupled to the spool axle 50, and a spool motor 54 configured to drive rotation of the cable spool 52 in response to control signals received from the controller 44. In addition, the holonomic-motion crawler vehicle further includes: an alignment turret 46 having a non-rotatable portion fixedly coupled to the crawler vehicle frame 2 and having a rotatable portion to which the cable spool 52 is fixedly coupled; and a turret motor 48 configured to drive rotation of the alignment turret 46 in response to control signals received from the controller 44. In addition, the holonomic-motion crawler vehicle partly represented in FIG. 11 may comprise a vertical track 32 mounted to the crawler vehicle frame 2. A carriage 34, to which the maintenance tool 28 (not shown in FIG. 11) is fixedly coupled, is translatably coupled to the track 32 and driven to rotate by a carriage motor 42 (by way of a gear train not shown) in response to control signals received from the controller 44. All of the motors identified in FIG. 11 are mounted to the crawler vehicle frame 2. The controller 44 is configured to control operation of the motors so that each holonomic-motion crawler vehicle performs a maintenance operation in a respective area of the surface of the wind turbine blade 108. The controller 44 receives data representing the position and orientation of the holonomic-motion crawler vehicle from a crawler position detection system 84 and additional data from sensor(s) 82. The sensor(s) 82 may, e.g., include an inclinometer that provides data representing the angle of inclination of the holonomic-motion crawler vehicle or respective sensors that provide data representing the loads on each wheel. The controller 44 processes that information to: (1) control the stepper motors 8 as a function of the position/orientation data and (2) control the suction devices 10 as a function of the sensor data as disclosed in U.S. Pat. No. 8,738,226.

The above-described ability of the crawler vehicle 20 to realign with and re-adhere to a side surface 114 or 116 of a wind turbine blade 108 when the crawler vehicle 20 is hanging freely from a cable 22 and is misaligned and not in contact with the side surface 114 or 116 of the wind turbine blade 108 is equally applicable to crawler vehicles equipped with cable spools and crawler vehicles not equipped with cable spools. A cable spool-equipped crawler vehicle was previously described with reference to FIGS. 5, 5A and 5B. A crawler vehicle 20 not equipped with a cable spool will now be briefly described.

FIG. 12A is a diagram representing a plan view of a cable-suspended crawler vehicle 20 having a turret-mounted cable hook 23 in accordance with another embodiment. FIGS. 12B and 12C are end and bottom views respectively of the cable-suspended crawler vehicle 20 depicted in FIG. 12A. As was the case for the previously described embodiments, the crawler vehicle 20 depicted in FIGS. 12A and 12C is suspended from a cable 22. The cable 22 may have a power/signal cord incorporated therein or attached thereto. For the sake of simplicity, only cable 22 is depicted in FIGS. 12A and 12C. Preferably the shaft of the hook 23 is attached to the frame 2 at a point which is vertically aligned with a center-of-mass of the crawler vehicle 20.

The crawler vehicle 20 depicted in FIGS. 12A and 12C includes a maintenance tool 28 that is translatable along an axis that is perpendicular to the crawler vehicle plane. This capability enables the maintenance tool 28 to be lifted over obstacles in the path of the crawler vehicle 20. The crawler vehicle 20 depicted in FIGS. 12A and 12C does not include a cable spool because the cable 22 is wound and unwound by a cable spool mounted on the cart 18 that travels along the leading edge 110 of the wind turbine blade 108.

The end of the cable 22 has a loop (best seen in FIG. 12A) by means of which the crawler vehicle 20 may be hooked onto the end of the cable 22. The hook 23 is fixedly coupled to the alignment turret 46. The turret base 47 is fixedly coupled to the crawler vehicle frame 2. As previously described, the alignment turret 46 is rotatable relative to the alignment turret 46 about an axis of rotation which is perpendicular to the spool axle 50 of the cable spool 52 and parallel to the crawler vehicle plane. The alignment turret 46 is driven to rotate by a turret motor (not shown in FIG. 12A, but see turret motor 48 in FIG. 11). Thus the spool support 68 is rotatable about an axis of rotation of the alignment turret 46. As previously described, the ability of the crawler vehicle 20 to rotate about an axis of the cable 22 when none of wheels 4a-4d are in contact with the wind turbine blade 108 can be used in a procedure for realigning the crawler vehicle 20 with and re-adhering the crawler vehicle 20 to a surface of the wind turbine blade 108.

In accordance with an alternative embodiment, the crawler vehicle 20 is equipped with a rotatable alignment arm 25 that is used to realign the crawler vehicle 20 with the surface of the wind turbine blade 108. FIG. 13A is a diagram representing a plan view of a cable-suspended crawler vehicle 20 having a rotatable alignment arm 25. FIGS. 13B and 13C are top and end views respectively of the cable-suspended crawler vehicle 20 depicted in FIG. 13A while in contact and aligned with a surface of a wind turbine blade 108 (only a portion of which is shown) disposed with its leading edge (not shown in FIGS. 13B and 13C) generally horizontal. The horizontal plane is parallel to the plane of the page in FIG. 13B and perpendicular to the plane of the page in FIGS. 13A and 13C.

The crawler vehicle 20 depicted in FIGS. 13A-13C includes a frame 2, a multiplicity of wheels 4a-4d rotatably coupled to the frame 2, a motorized linear slide 31 attached to the frame 2, and a maintenance tool 28 that is translatable by the motorized linear slide 31 along an axis that may be perpendicular to the crawler vehicle plane. This capability enables the maintenance tool 28 to be lifted over obstacles in the path of the crawler vehicle 20 during an inspection procedure. The crawler vehicle depicted in FIGS. 13A-13C further includes a hook 23 fixedly coupled to the frame 2. The hook 23 is hung on the looped end of cable 22 to tether the crawler vehicle 20 to the cart 18 (see FIGS. 1 and 2). Preferably the shaft of the hook 23 is attached to the frame 2 at a point which is vertically aligned with a center-of-mass of the crawler vehicle 20.

As best seen in FIG. 13A, the crawler vehicle 20 further includes a revolute joint 21 having an axis of rotation and an alignment arm 25 having a first end coupled to the revolute joint 21 and having a second end that is rotatable about the axis of rotation of the revolute joint. The revolute joint 21 is disposed between a pair of bushing axial restraint bodies 19a and 19b which are not rotatable relative to the crawler vehicle frame 2. The alignment arm 25 is rotatable between a first angular position where the distal end 25a of the alignment arm 25 is disposed above a plane of wheel contact tangent to the multiplicity of wheels 4a-4d and a second angular position where the distal end 25a of the alignment arm 25 is disposed below the plane of wheel contact. As used herein, the term "plane of wheel contact" means a plane tangent to a set of wheels 4a-4d rotatably mounted to a crawler vehicle frame 2 at points on the wheels 4a-4d where the wheels 4a-4d would contact a flat surface when the crawler vehicle 20 is disposed in a motionless state on that flat surface. The distal end 25a of the alignment arm 25 is disposed below the plane of wheel contact at a first distance from the axis of rotation of the revolute joint 21 which is greater than a second distance of any other part of the crawler vehicle 20 from the axis of rotation of the revolute joint 21 for all angular positions of the alignment arm 25 (relative to the crawler vehicle frame) within a range of angular positions (including the angular positions of the alignment arm 25 depicted in FIGS. 16C-16E discussed in more detail below).

Figure 14A:
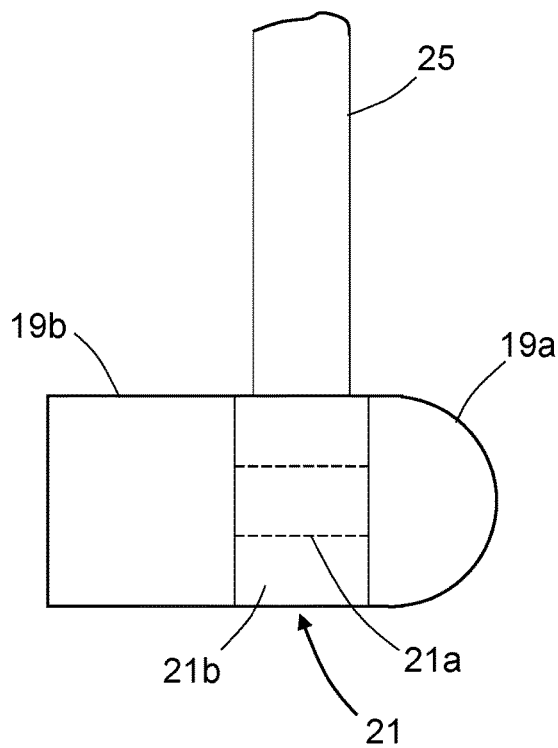
FIG. 14A is a diagram representing a revolute joint and an alignment arm incorporated in the embodiment depicted in FIGS. 13A-13C.

FIG. 14A is a diagram representing the revolute joint 21 and an alignment arm 25, which are incorporated in the embodiment depicted in FIGS. 13A-13C. In accordance with one proposed implementation, the revolute joint 21 includes a shaft 21a and a bushing 21b that is rotatable on shaft 21a. The bushing 21b has only one degree of freedom, namely, the bushing 21b revolves around the shaft 21a during rotation of the alignment arm 25. The opposing ends of the shaft 21a of the revolute joint 21 are respectively fixedly coupled to the bushing axial restraint bodies 19a and 19b.

Figure 14B:
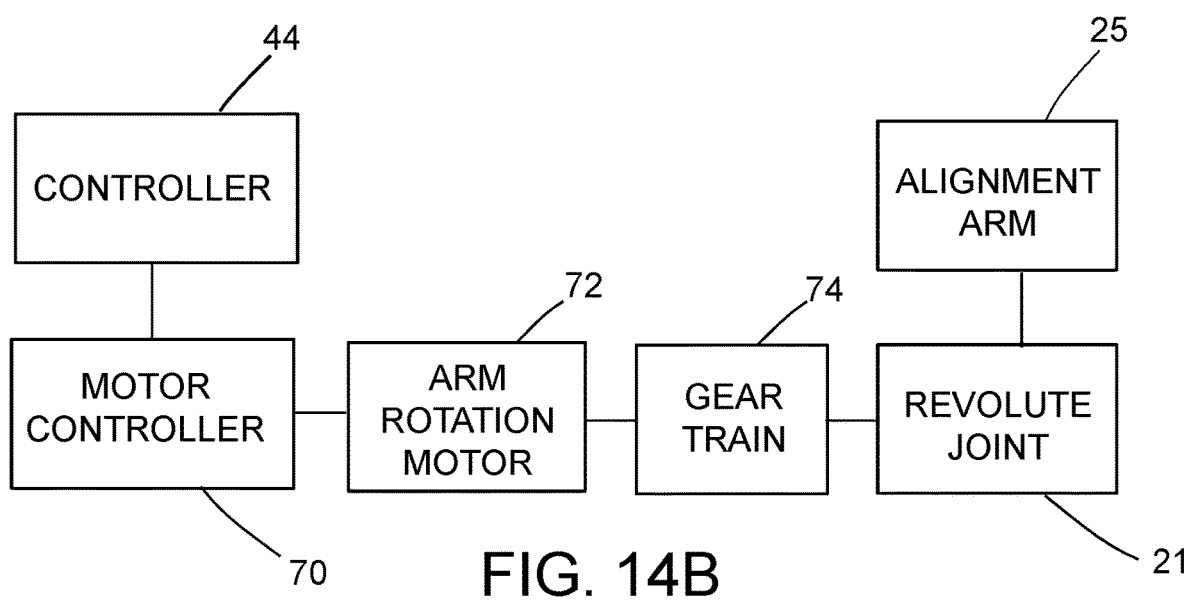
FIG. 14B is a block diagram identifying some components of the crawler vehicle depicted in FIGS. 13A-C.

FIG. 14B is a block diagram identifying some components of the crawler vehicle 20 depicted in FIGS. 13A-C. The crawler vehicle 20 includes: the revolute joint 21; the alignment arm 25; an arm rotation motor 72; a gear train 74 that operatively couples an output shaft of the arm rotation motor 72 to the revolute joint 21; a motor controller 70 configured to control the operation of the arm rotation motor 72; and a controller 44 that sends commands to the motor controller 70. In response to an "initiate realignment" command from the controller 44, the motor controller 70 sends control signals to the arm rotation motor 72 which cause the output shaft of the arm rotation motor 72 to rotate. The gear train 74 then converts rotation of the output shaft of the arm rotation motor 72 into rotation of the alignment arm 25 about an axis of rotation of the revolute joint 21. The wheels 4a-4d of the crawler vehicle 20 are configured to be capable of holonomic motion. To provide such functionality, the wheels 4a-4d may be Mecanum wheels of the type previously described with reference to FIG. 7. The crawler vehicle 20 further includes a set of motors configured to respectively drive rotation of the wheels 4a-4d and a multiplicity of motor controllers configured to respectively control the motors to cause the set of wheels to produce holonomic motion of the crawler vehicle 20.

To enable the crawler vehicle 20 to adhere to a non-level surface, the crawler vehicle frame 2 includes a multiplicity of ducts 10a having openings and a multiplicity of bottom surfaces 36, 38, 40 that partly define a multiplicity of suction zones 12, as previously described with reference to FIGS. 8 and 11. The crawler vehicle 20 further includes a multiplicity of suction devices 10 (see FIG. 8) respectively mounted in the ducts 10a for producing respective suction forces in the multiplicity of suction zones 12 when the wheels 4a-4d of the crawler vehicle 20 are in contact with a surface. Such a crawler vehicle 20 is especially useful when the maintenance tool 28 is a non-destructive inspection probe.

The embodiment depicted in FIGS. 13A-13C and 14 has the ability to realign with and re-adhere to the side surface 114 or 116 of a wind turbine blade 108 when the crawler vehicle 20 is out of alignment and hanging freely from a cable 22, and the wheels 4a-4d of the crawler vehicle 20 are not in contact with the side surface. A method for realigning and re-adhering a crawler vehicle 20 to a surface of a wind turbine blade in accordance with one embodiment will now be described with reference to FIGS. 15A-15F and 16A-16F.

FIGS. 15A through 15F are diagrams showing respective views of the cable-suspended crawler vehicle depicted in FIGS. 13B and 13C at respective instants of time during the execution of a realignment and re-adherence maneuver in accordance with one embodiment. The leading edge (not shown) of the wind turbine blade 108 is generally parallel to a horizontal axis, which horizontal axis is perpendicular to the plane of the page in FIGS. 15A-15F.

FIGS. 16A through 16F are diagrams showing respective views of the cable-suspended crawler vehicle depicted in FIGS. 15A-15F at the same respective instants of time during the execution of a realignment and re-adherence maneuver in accordance with one embodiment. Again the leading edge (not shown) of the wind turbine blade is generally parallel to a horizontal axis, which horizontal axis is parallel to the plane of the page in FIGS. 16A-16F. Thus the line of sight of the observer in FIGS. 15A-15F and the line of sight of the observer in FIGS. 16A-16F are perpendicular to each other.

Referring to FIGS. 15A and 16A, the method for realigning and re-adhering the crawler vehicle 20 is initiated when the crawler vehicle 20 is hanging from the cable 22 and not in contact with the wind turbine blade 108. As seen in FIGS. 15A and 16A, the crawler vehicle 20 is supported by the cable 22 only and not in contact with the surface of the wind turbine blade 108. In addition, the crawler vehicle 20 is not aligned with the surface of the wind turbine blade 108.

Figure 16B:
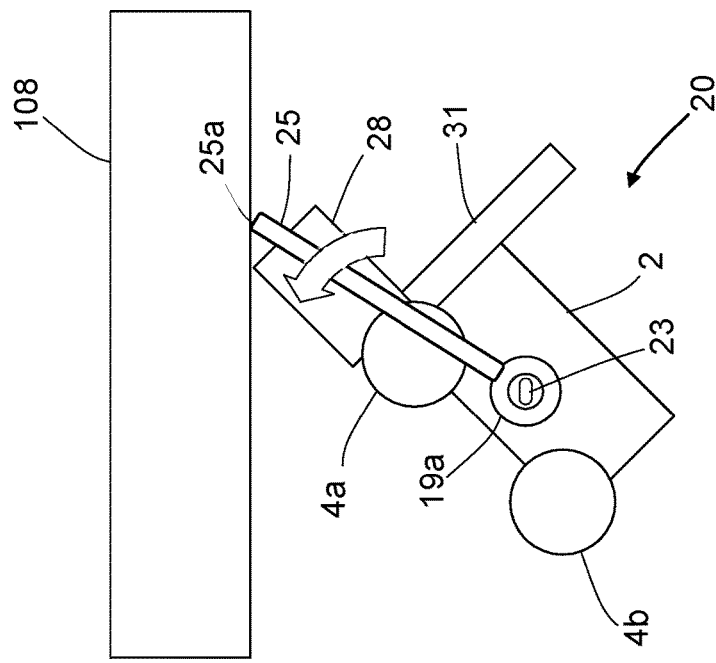
Figure 15B:
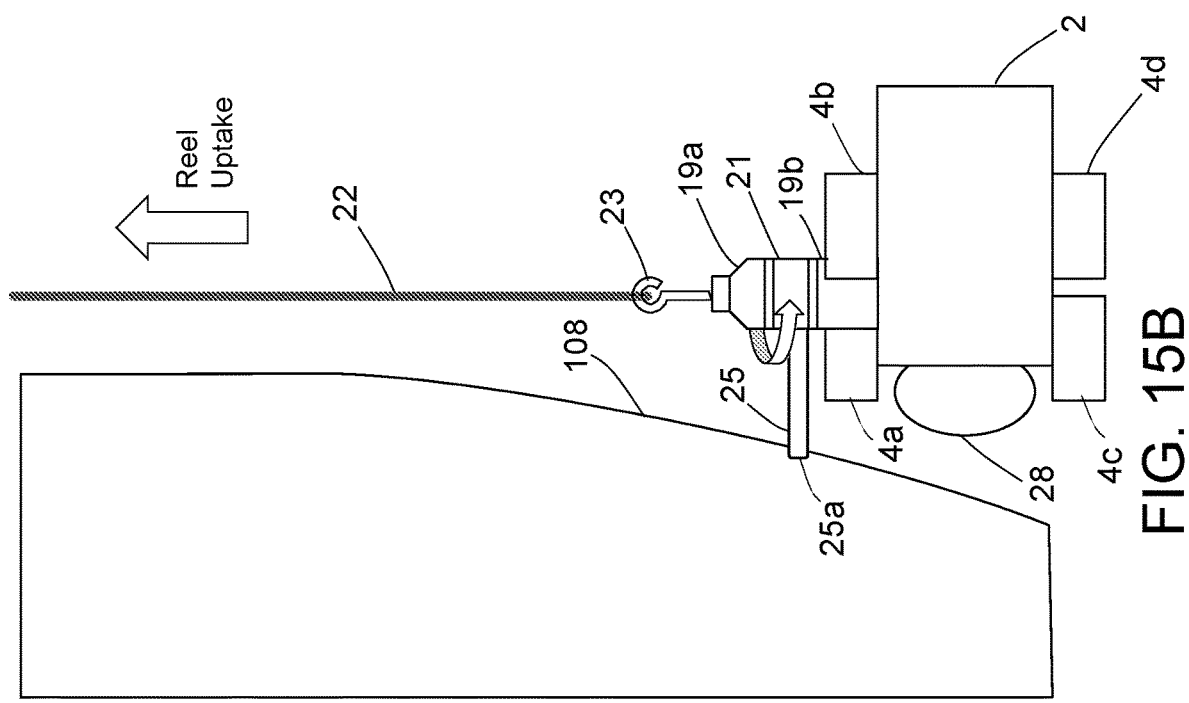
Figure 16C:
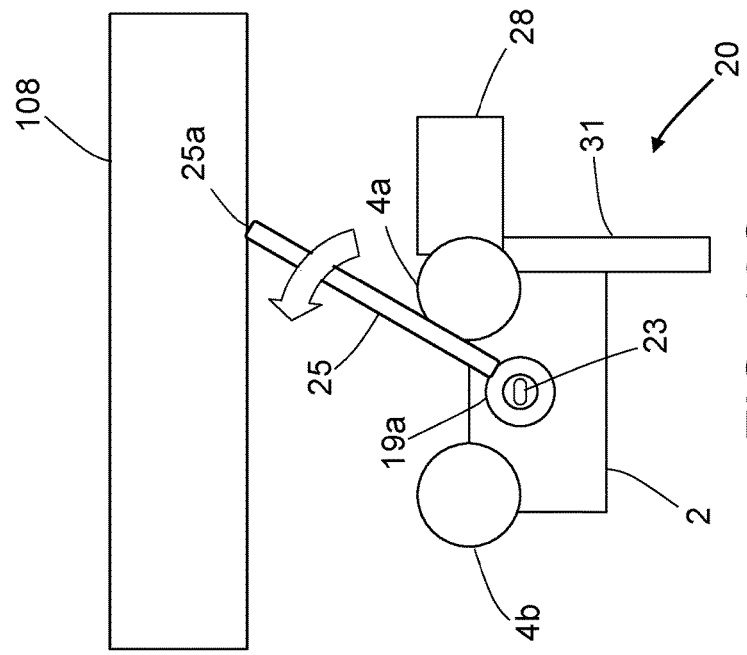
Figure 15C:
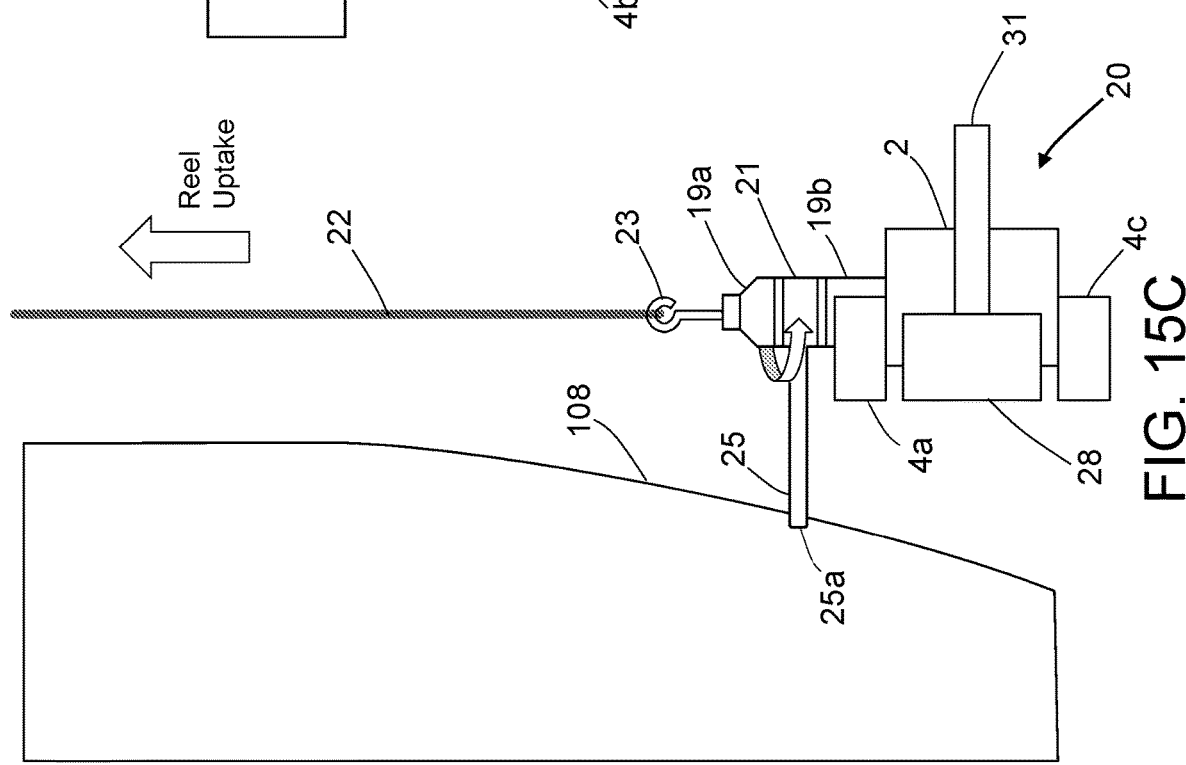
Figure 16D:
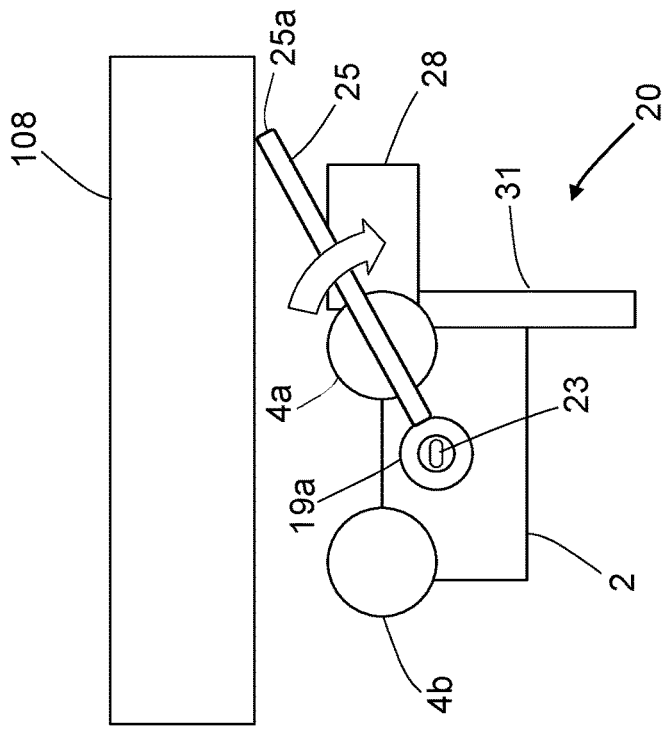
Figure 15D:
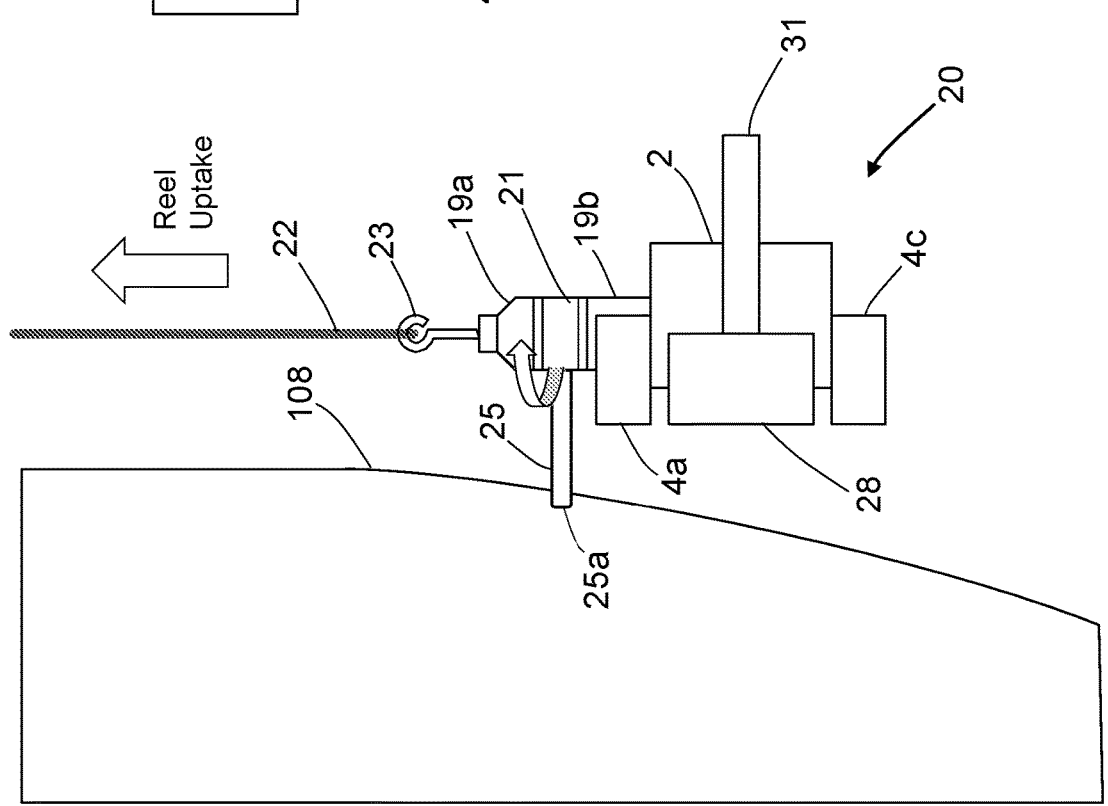
Figure 16E:
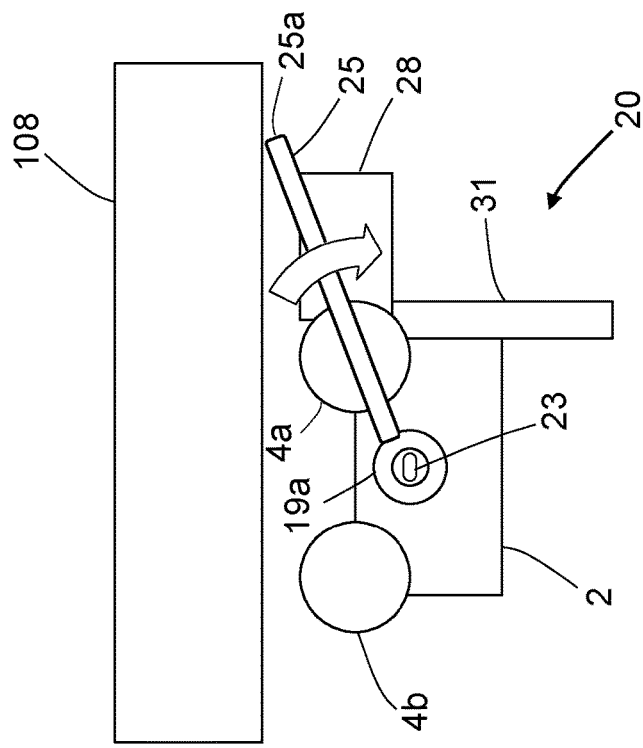
Figure 15E:
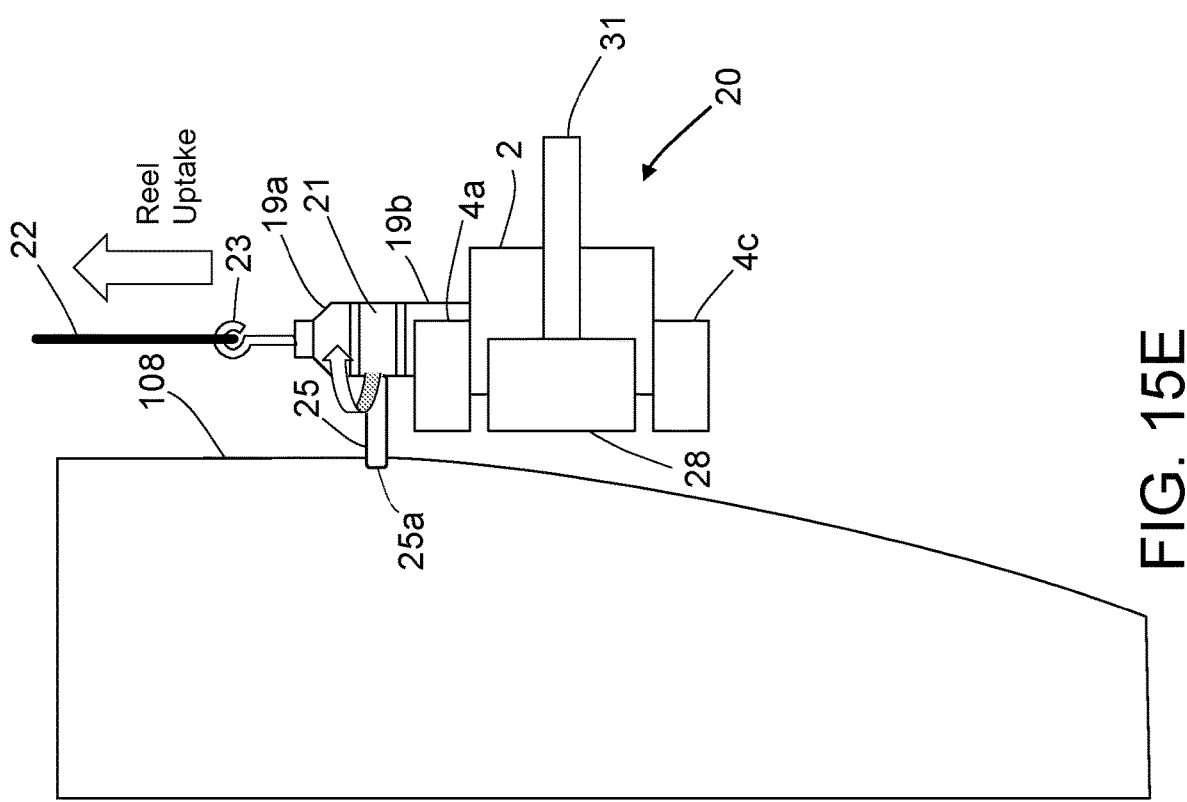

In accordance with one embodiment, the method for realigning and re-adhering the crawler vehicle 20 on the surface of the wind turbine blade 108 includes the following steps. First, the crawler vehicle 20 is suspended from an end of a cable 22, the crawler vehicle 20 being suspended at an elevation at which the crawler vehicle 20 is not in contact with the surface of the wind turbine blade 108 (as shown in FIGS. 15A and 16A). Then the alignment arm 25 is rotated in a first direction about an axis of rotation that is fixed in a frame of reference of the crawler vehicle 20 until a tip of the alignment arm 25 contacts the surface of the wind turbine blade 108 (as shown in FIGS. 15B and 16B). While the tip of the alignment arm 25 contacts the surface of the wind turbine blade 108, the alignment arm 25 is rotated further in the first direction to cause wheels 4a and 4b of the crawler vehicle 20 to move closer to the surface of the wind turbine blade 108 (as shown in FIGS. 15C and 16C). Although wheels 4a and 4b need not be equidistant from the surface of the wind turbine blade 108, the alignment arm 25 is preferably rotated in the first direction until the wheels 4a and 4b of the crawler vehicle are nearly equidistant from the surface of the wind turbine blade 108.

When the misaligned crawler vehicle 20 has been reoriented so that the crawler vehicle 20 becomes less misaligned (e.g., by causing wheels 4a and 4b of the crawler vehicle 20 to move closer to the surface of the wind turbine blade 108), rotation of the alignment arm 25 in the first direction is stopped. Thereafter, a spool motor is activated to cause the end of the cable 22 to rise. The end of the cable 22 is raised until at least two of the wheels 4b-4d of the crawler vehicle 20 are in contact with the surface of the wind turbine blade 108. While the crawler vehicle 20 is being raised, the alignment arm 25 is rotated in a second direction opposite to the first direction. To assure vacuum adherence, preferably at least two diagonally opposed wheels (e.g., wheels 4a and 4d or wheels 4b and 4c) are in contact with the surface of the wind turbine blade 108. In other situations, vacuum adherence may be attained provided that the at least two wheels are adjacent to each other (e.g., wheels 4a and 4b) and the vacuum skirts (see vacuum skirts 14a-14c in FIG. 8) of the crawler vehicle 20 are in close proximity to the surface, FIGS. 15D-15F and 16D-16F show the following aspects: (1) the crawler vehicle 20 is shown at three different elevations during rising of the cable 22, the elevation increasing from one stage to the next; and (2) the alignment arm 25 is shown at three different angular positions. As the crawler vehicle 20 rises and the alignment arm is rotated in the second direction, the distance between the wheels 4a-4d of the crawler vehicle and the surface of the wind turbine blade 108 decreases (due to the concave curvature of the surface of the wind turbine blade 108 seen in FIGS. 15A-15F) until at least some of the wheels 4a-4d are in contact with the surface of the wind turbine blade 108.

In the final stage depicted in FIGS. 15F and 16F, the four wheels 4a-4d of the crawler vehicle 20 are in contact with the surface of the wind turbine blade 108. The suction devices 10 on the crawler vehicle 20 may then be turned on to generate suction forces that cause the crawler vehicle 20 to adhere to the surface of the wind turbine blade 108. Although it is preferred to activate the suction devices 10 while all of wheels 4a-4d are in contact with the surface of the wind turbine blade 108, in some instances re-adherence may be achieved by activating the suction devices 10 when only two of the wheels 4a-4d of the crawler vehicle 20 are in contact with the surface. As previously noted, preferably at least two diagonally opposed wheels (e.g., wheels 4a and 4d or wheels 4b and 4c) are in contact with the surface of the wind turbine blade 108. In the alternative, the two wheels in contact with the surface of the wind turbine blade 108 may be adjacent to each other (e.g., wheels 4a and 4b) provided that the vacuum skirts (see vacuum skirts 14a-14c in FIG. 8) of the crawler vehicle 20 are in close proximity to the surface of the wind turbine blade 108, In accordance with an alternative embodiment, the crawler vehicle 20 is equipped with a fixed cam-shaped roll bar 3 that is used to realign the crawler vehicle 20 with the surface of the wind turbine blade 108. FIG. 17A is a diagram representing a plan view of a cable-suspended crawler vehicle 20 having a cam-shaped roll bar 3 (hereinafter "roll bar 3"). FIGS. 17B and 17C are top and end views respectively of the cable-suspended crawler vehicle 20 depicted in FIG. 17A while in contact and aligned with a surface of a wind turbine blade 108 (only a portion of which is shown) disposed with its leading edge (not shown in FIGS. 17B and 17C) generally horizontal. The horizontal plane is parallel to the plane of the page in FIG. 17B and perpendicular to the plane of the page in FIGS. 17A and 17C.

The crawler vehicle 20 depicted in FIGS. 17A-17C includes a frame 2, a multiplicity (in this example, four) of wheels 4a-4d rotatably coupled to the frame 2, a motorized linear slide 31 attached to the frame 2, and a maintenance tool 28 that is translatable by the motorized linear slide 31 along an axis that may be perpendicular to the crawler vehicle plane. This capability enables the maintenance tool 28 to be lifted over obstacles in the path of the crawler vehicle 20 during an inspection procedure.

The crawler vehicle depicted in FIGS. 17A-17C further includes a hook 23 fixedly coupled to the frame 2. The hook 23 is hung on the looped end of cable 22 to tether the crawler vehicle 20 to a cart 18 (not shown in FIGS. 17A-17C but see FIGS. 1 and 2). Preferably the shaft of the hook 23 is attached to the frame 2 at a point which is vertically aligned with a center-of-mass of the crawler vehicle 20. During a maintenance procedure, crawler vehicle 20 is adhered to the surface of a wind turbine blade 108 and while so adhered and tethered to the cart 18 by the cable 22, the crawler vehicle 20 is free to move along the surface. In cases where the crawler vehicle 20 is a holonomic-motion crawler vehicle of the type depicted in FIG. 7, the crawler vehicle 20 is free to translate in any direction and free to rotate about the center-of-mass of the crawler vehicle (except in situations when further rotation is obstructed by the cable 22). As previously described however, if the sum of the forces contributing to adherence of the crawler vehicle 20 to the surface become less than the weight of the crawler vehicle, then the wheels 4a-4d of the crawler vehicle 20 lose contact with the surface and the crawler vehicle 20 falls under the force of gravity until stopped by the cable 22. The crawler vehicle 20 is then hanging in midair, supported only by the cable 22, as depicted in FIG. 18A.

When the crawler vehicle 20 is hanging from the cable 22 as depicted in FIG. 18A, the length of cable 22 that extends from an upper point of support (e.g., a point where the cable 22 is tangent to a pulley or the surface of the blade) to the hook 23 and the crawler vehicle 20 hanging from the end of the cable 22 form a pendulum having a pivot point at the cable point of support. In addition, in the scenario depicted in FIG. 18A, the confronting surface of the wind turbine blade is inclined relative to the cable 22 and is separated from the cable 22 by a horizontal distance that increases with decreasing elevation. In the situation depicted in FIG. 18A, the hanging crawler vehicle 20 is able to swing freely so long as the magnitude of the angle of rotation is not so great that the crawler vehicle 20 comes into contact with a confronting surface of the blade of the wind turbine blade 108. In the disclosure that follows, one should appreciate the basic principle that when a freely hanging pendulum is displaced sideways from its resting, equilibrium position, it is subject to a restoring force due to gravity that will cause it to move back to its equilibrium position. This principle is used to produce a moment that causes the crawler vehicle 20 to also rotate about a vertical axis toward a position of equilibrium as the vehicle is pulled vertically upward by the cable.

As best seen in FIG. 17B, the cam-shaped roll bar 3 is fixedly connected to the frame 2 by means of a multiplicity of rigid ribs 5. The roll bar 3 and ribs 5 may be made of metal or plastic. Preferably the roll bar 3 is disposed in a plane that is perpendicular to the plane of wheel contact 1 (indicated by a dashed line in FIG. 17B) and entirely on one side of the plane of wheel contact 1, and has an outer periphery with an eccentric shape. In addition, spaced points on the outer periphery of the roll bar are located at different distances from a center-of-mass of the crawler vehicle 20. The eccentric shape of the outer periphery of the roll bar 3 is configured, when in contact with a surface, to cause the roll bar 3 (and crawler vehicle 20 to which the roll bar 3 is attached) to roll over the surface as the end of the cable 22 is lifted.

In typical mechanical applications, a cam is a rotating or sliding piece in a mechanical linkage used especially in transforming rotary motion into linear motion. The shape of the outer periphery of the cam is non-circular (hereinafter "eccentric"). As used herein, the term "cam-shaped roll bar" means a roll bar having an eccentric shape configured to transform horizontal deflection of the point of contact of the roll bar 3 into rotation of the hanging crawler vehicle 20 about the axis of cable 22. More specifically, the point of contact of the outer periphery of the roll bar 3 on the surface of the wind turbine blade 108 changes incrementally as the roll bar 3 rolls on the surface. As the roll bar 3 rolls, the crawler vehicle rotates from a first location whereat the plane of wheel contact 1 is misaligned with (e.g., not parallel to) a mid-plane (not shown in the drawings) of the wind turbine blade 108 and none of the wheels 4a-4d are in contact with the surface of the wind turbine blade 108 (as depicted in FIG. 19A) to a second location whereat the plane of wheel contact 1 is aligned with (e.g., parallel to) or nearly aligned with the mid-plane of the wind turbine blade 108 and all of the wheels 4a-4d are in contact with the surface of the wind turbine blade 108 (as depicted in FIG. 19E).

Thus the crawler vehicle 20 depicted in FIGS. 17A-17C has the ability to realign with and re-adhere to the side surface 114 or 116 of a wind turbine blade 108 after falling off and hanging freely from a cable 22. A method for realigning the crawler vehicle 20 with and re-adhering the crawler vehicle 20 to a surface of a wind turbine blade 108 in accordance with one embodiment will now be described with reference to FIGS. 18A-18E and 19A-19E.

FIGS. 18A through 18E are diagrams showing respective views of the cable-suspended crawler vehicle 20 depicted in FIGS. 17A-17C at respective instants of time during the execution of a realignment and re-adherence maneuver in accordance with one embodiment. Again the leading edge (not shown) of the wind turbine blade 108 is generally parallel to a horizontal axis, which horizontal axis is perpendicular to the plane of the page in FIGS. 18A-18E.

FIGS. 19A through 19E are diagrams showing respective views of the cable-suspended crawler vehicle 20 depicted in FIGS. 18A-18E at the same respective instants of time during the execution of a realignment and re-adherence maneuver in accordance with one embodiment. Again the leading edge (not shown) of the wind turbine blade 108 is generally parallel to a horizontal axis, which horizontal axis is parallel to the plane of the page in FIGS. 19A-19E. Thus the line of sight of the observer in FIGS. 18A-18E and the line of sight of the observer in FIGS. 19A-19E are perpendicular to each other.

Figure 19C:
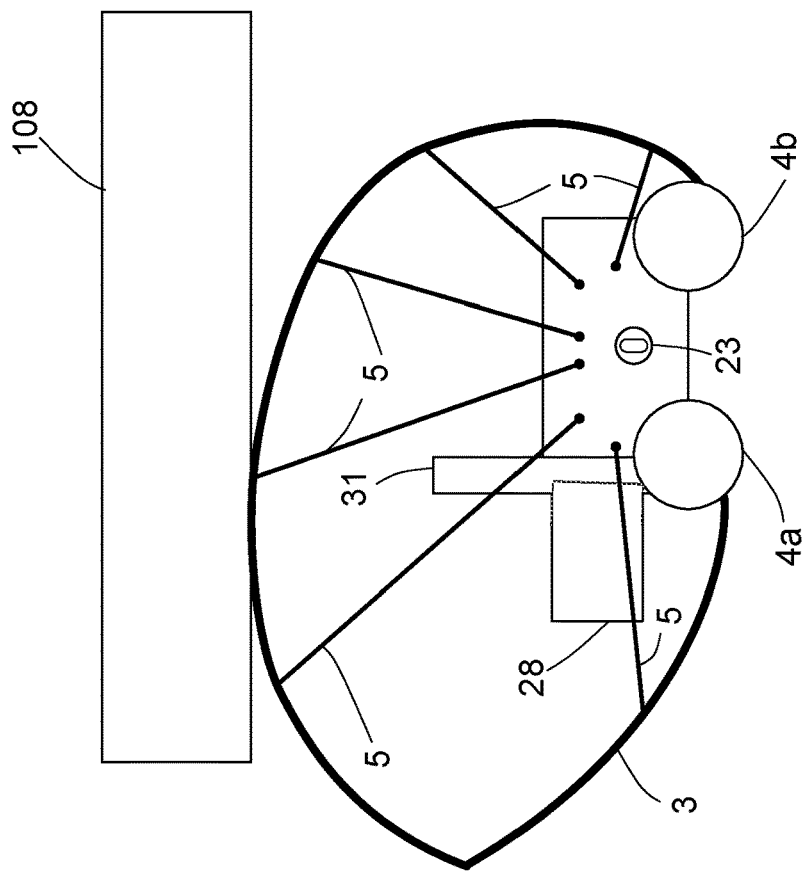
Figure 18C:
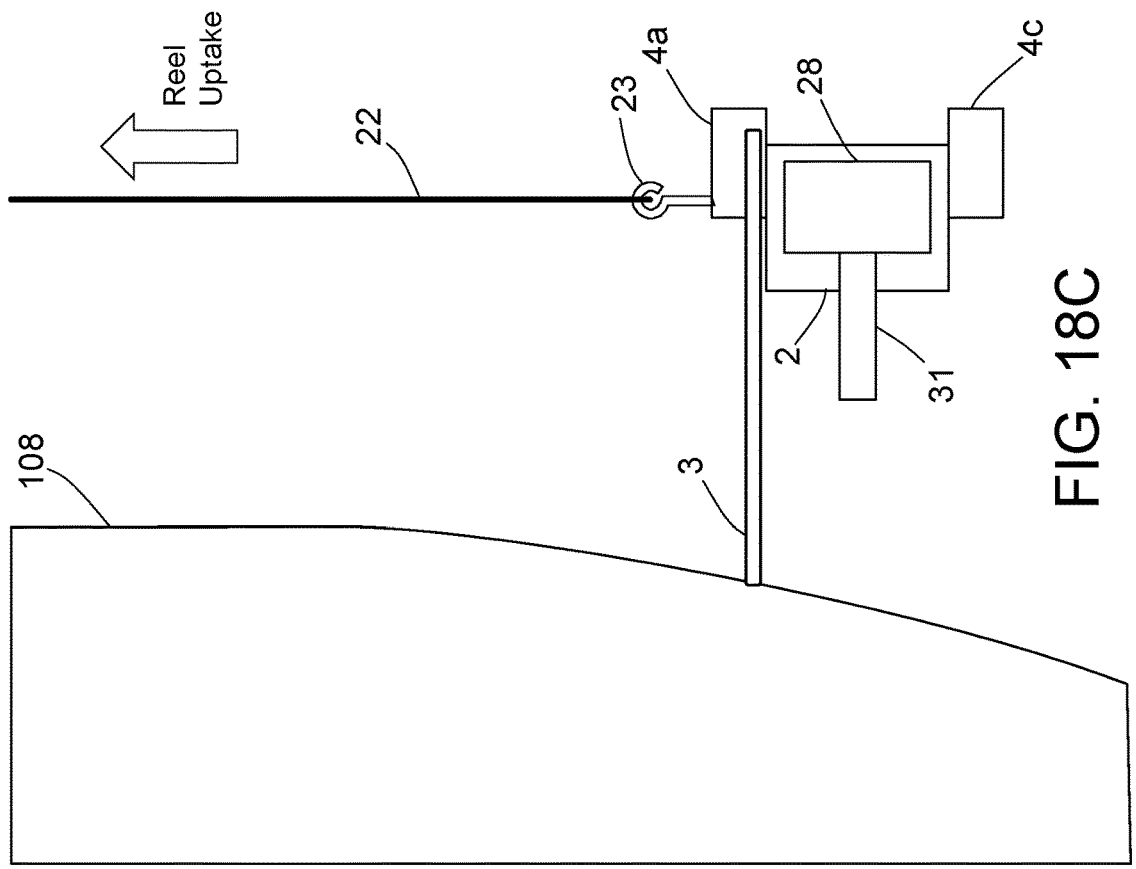
Figure 19E:
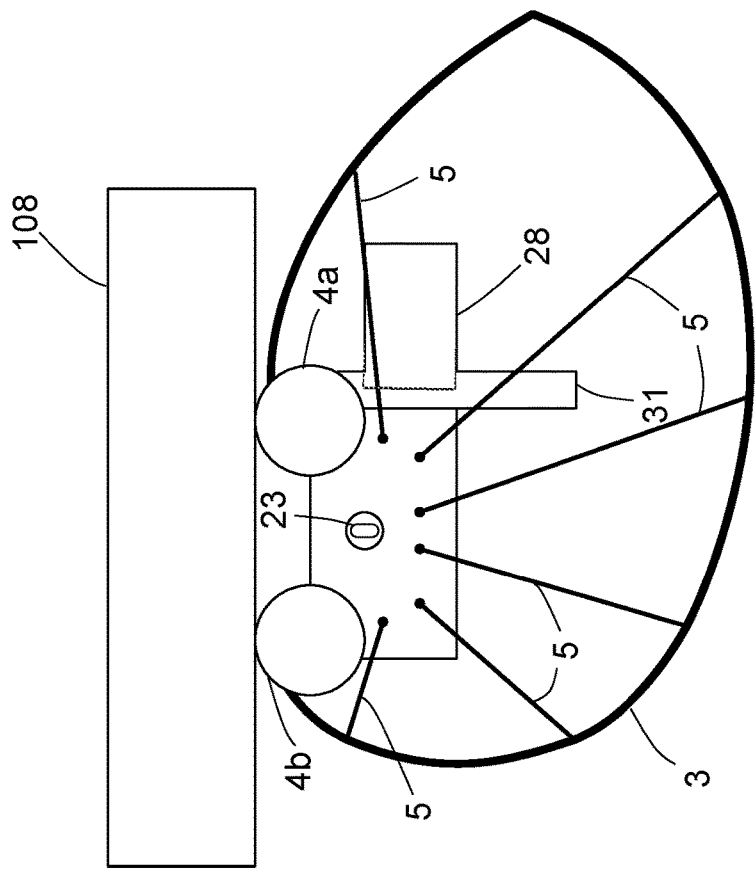

FIGS. 18A and 19A show the crawler vehicle 20 hanging from the cable 22 with none of the wheels 4a-4b in contact with the surface of the wind turbine blade 108 and with the plane of wheel contact 1 misaligned with the portion of the blade surface closest to the crawler vehicle 20 (hereinafter "initial location" in the frame of reference of the wind turbine blade). The roll bar 3 is configured with an eccentric shape that enables the crawler vehicle 20 to be relocated on the surface of the wind turbine blade 108 when the end of the cable 22 is raised. FIGS. 18A-18E shows the crawler vehicle at five different elevations, representing respective snapshots of the locations of the crawler vehicle (relative to the blade surface) at five successive instants in time as the end of the cable 22 is raised (e.g., by winding other portions of the cable on a spool). In contrast, FIGS. 19A-19E present a top view of the roll bar-equipped crawler vehicle 20 in the successive locations depicted in FIGS. 18A-18E as the crawler vehicle 20 performs a relocation maneuver using the cable 22 and the roll bar 3.

Figure 18E:
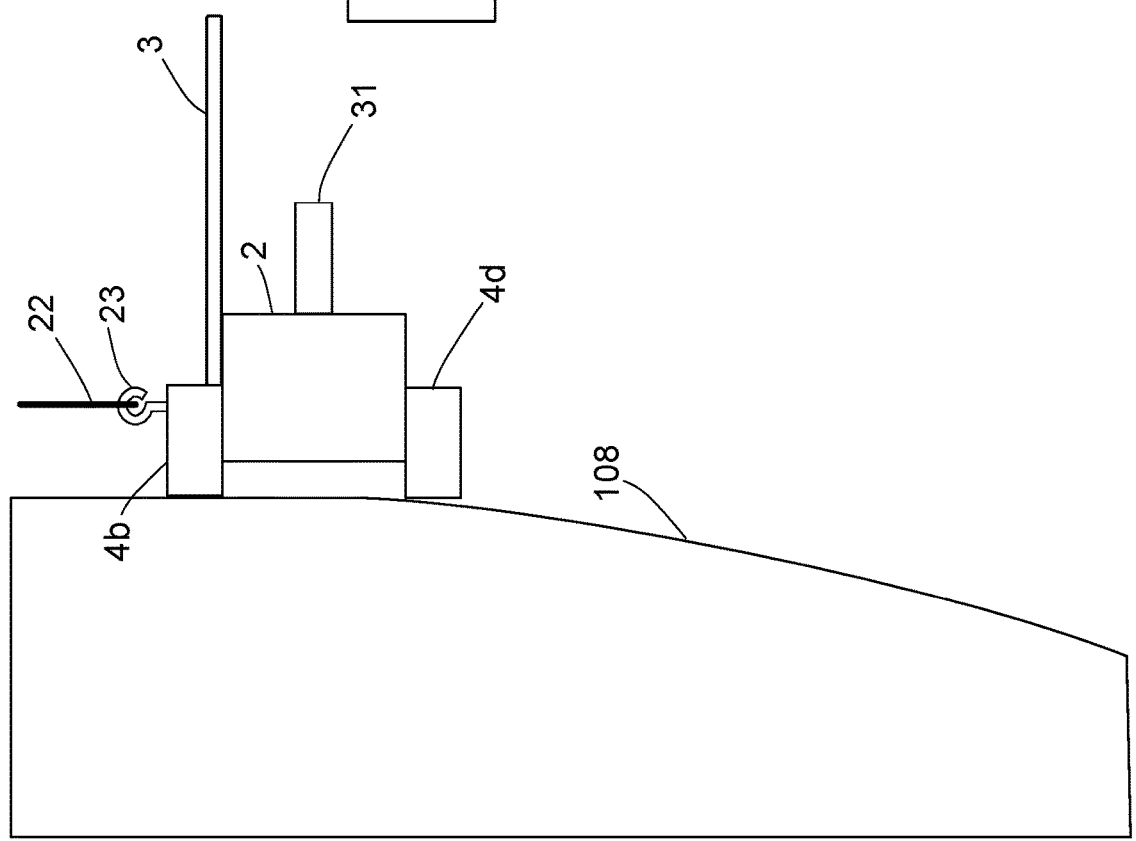

When lifting is started, the crawler vehicle 20 displaces vertically upward until the roll bar 3 comes into contact with the surface of the wind turbine blade 108, as depicted in FIGS. 18B and 19B. While the roll bar 3 is in contact with the inclined surface of the wind turbine blade 108, the end of the cable 22 continues to be raised. This causes the roll bar to be dragged upwardly along the inclined surface of the wind turbine blade 108, which inclined surface in turn deflects the center-of-mass of the crawler vehicle 20 horizontally away from the equilibrium position shown in FIG. 18A. Because the hanging crawler vehicle 20 is capable of behaving like a pendulum, that horizontal deflection produces a force (hereinafter "restorative pendulum force") that urges the crawler vehicle 20 back toward the equilibrium position of the pendulum. But because the outer periphery of the roll bar 3 has an eccentric shape and is not symmetric with respect to the center-of-mass of the crawler vehicle, the restorative pendulum force being exerted on the crawler vehicle 20 as the cable 22 lifts the crawler vehicle 20 creates a moment that causes the crawler vehicle 20 to roll on the roll bar 3 (as shown at successive instants in time in FIGS. 19B-19D) until the wheels 4a-4d are all in contact with the surface of the wind turbine blade 108 (as depicted in FIGS. 18E and 19E). When all four wheels 4a-4d are in contact, the suction devices 10 on the crawler vehicle 20 may be activated to re-adhere the crawler vehicle to the surface of the wind turbine blade 108. In some situation, contact of only wheels 4a and 4d may be sufficient to allow re-adherence by application of suction.

Any one of the automated relocation procedures described above can be initiated manually by a technician observing video image data acquired by a video camera mounted on the hub 106 of the wind turbine 100. The technician may input a relocation activation command to cause the control computer 90 to send a control signal to the controller 44 onboard the crawler vehicle 20 (via a power/signal cord or wirelessly via transceivers) that causes the controller 44 to execute one of the above-described automated relocation procedures. In cases where the crawler vehicle 20 is equipped with a rotating arm 25 or a turret 46, the controller 44 may be configured to: activate the arm rotation motor or turret motor onboard the crawler vehicle 20 to cause the crawler vehicle 20 to realign with the surface of the structure being inspected in response to the command from the control computer 90; receive sensor feedback indicating when realignment has been achieved; and then activate a spool motor onboard the crawler vehicle 20 to wind the cable 22 and thus cause the crawler vehicle 20 to be raised. In cases where the crawler vehicle 20 is equipped with a roll bar 3, the controller 44 may be configured to activate a spool motor onboard the crawler vehicle 20 to wind the cable 22 and thus cause the crawler vehicle 20 to be raised.

In alternative embodiments, in which the cable spools are mounted on the cart 18, not on the crawler vehicles 20, the control computer 90 on the ground may communicate with a controller onboard the cart 18 to activate a relocation procedure. In cases where the crawler vehicle 20 is equipped with a rotating arm 25 or a turret 46, the controller onboard the cart 18 may be configured to: send a control signal to the controller 44 onboard the crawler vehicle 20 to activate the arm rotation motor or turret motor onboard the crawler vehicle 20 to cause the crawler vehicle 20 to realign with the surface of the structure being inspected in response to the command from the control computer 90; receive sensor feedback indicating when realignment has been achieved; and then activate a spool motor onboard the cart 18 to wind the cable 22 and thus cause the crawler vehicle 20 to be raised. In cases where the crawler vehicle 20 is equipped with a roll bar 3, the controller onboard the cart 18 may be configured to activate a spool motor onboard the cart 18 to wind the cable 22 and thus cause the crawler vehicle 20 to be raised.

In other alternative embodiments, the relocation procedure may be activated automatically in response to detecting that a crawler vehicle has detached from the wind turbine blade and is hanging freely from the end of the cable 22. The change in state of the crawler vehicle 20 may be detected by a strain gauge that detects a sudden increase in tension of the cable 22 due to the full weight of the crawler vehicle 20 or by an inertial measurement unit onboard the falling crawler vehicle that detects acceleration in excess of a specified threshold. These examples of means for detecting that a crawler vehicle 20 has fallen off of the wind turbine blade 108 are intended to be illustrative, not limiting. The sudden descent of a crawler vehicle 20 may be detected in other ways.

The automated apparatus disclosed herein can be adapted for use in the automation of various maintenance functions, including but not limited to non-destructive inspection, drilling, grinding, fastening, applique application, scarfing, ply mapping, marking, cleaning and painting. In cases where the end effector is a rotary tool (such as a scarfer, drill, deburrer or reamer), when the rotary tool reaches a target position, the computer system can be programmed to activate the end effector motor (not shown in drawings) via a motor controller to drive rotation of the rotary tool.

While apparatus and methods for realigning and re-adhering a hanging tool-equipped crawler vehicle with respect to a non-level surface of a target object have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiments.

As used herein, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

As used in the claims, the term "location" comprises position in a three-dimensional coordinate system and orientation relative to that coordinate system.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A method for realigning a hanging crawler vehicle on a surface of a structure, the method comprising:
    (a) suspending the crawler vehicle from an end of a cable, the crawler vehicle being suspended at an elevation at which the crawler vehicle is not in contact with the surface of the structure;
    (b) rotating an alignment arm that is rotatably mounted to the crawler vehicle in a first direction about an axis of rotation that is fixed in a frame of reference of the crawler vehicle until a tip of the alignment arm contacts the surface of the structure;
    (c) while the tip of the alignment arm contacts the surface of the structure, further rotating the alignment arm in the first direction to cause first and second wheels of the crawler vehicle to move in tandem closer to the surface of the structure; and
    (d) raising the end of the cable until at least the first wheel and a third wheel are in contact with the surface of the structure.

2. The method as recited in claim 1, further comprising ceasing rotation of the alignment arm in the first direction before raising the end of the cable and then rotating the alignment arm in a second direction opposite to the first direction while the end of the cable is being raised.

3. The method as recited in claim 1, wherein the alignment arm is further rotated in the first direction until the first and third wheels of the crawler vehicle are nearly equidistant from the surface of the structure.

4. The method as recited in claim 1, further comprising adhering the crawler vehicle to the surface of the structure using suction while the first and third wheels are in contact with the surface of the structure.

5. The method as recited in claim 1, wherein the end of the cable is raised until the first through third wheels of the crawler vehicle are in contact with the surface of the structure, further comprising adhering the crawler vehicle to the surface of the structure using suction while the first through third wheels are in contact with the surface of the structure.

6. A crawler vehicle comprising:
a crawler vehicle frame and a multiplicity of wheels rotatably coupled to the crawler vehicle frame;
a maintenance tool coupled to the crawler vehicle frame of the crawler vehicle;
first and second bushing axial restraint bodies which are fixedly coupled to and not rotatable relative to the crawler vehicle frame;
a revolute joint comprising a shaft having an axis and a bushing that is rotatably coupled to the shaft for rotation about the axis of the shaft, wherein opposing ends of the shaft of the revolute joint are respectively fixedly coupled to the first and second bushing axial restraint bodies; and
an alignment arm having one end coupled to the bushing of the revolute joint, the alignment arm being rotatable about the axis of the shaft between a first angular position where a distal end of the alignment arm is disposed above a plane of wheel contact tangent to the multiplicity of wheels and a second angular position where the distal end of the alignment arm is disposed below the plane of wheel contact.

7. A crawler vehicle comprising:
a crawler vehicle frame and a multiplicity of wheels rotatably coupled to the crawler vehicle frame;
a maintenance tool coupled to the crawler vehicle frame of the crawler vehicle;
a revolute joint having an axis of rotation and
an alignment arm having a first end coupled to the revolute joint and having a second end that is rotatable about the axis of rotation between a first angular position where the distal end of the alignment arm is disposed above a plane of wheel contact tangent to the multiplicity of wheels and a second angular position where the distal end of the alignment arm is disposed below the plane of wheel contact,
wherein the distal end of the alignment arm is disposed below the plane of wheel contact at a first distance from the axis of rotation of the revolute joint which is greater than a second distance of any other part of the crawler vehicle from the axis of rotation of the revolute joint for all angular positions of the alignment arm relative to the crawler vehicle frame within a range of angular positions.

8. The crawler vehicle as recited in claim 6, wherein the wheels of the crawler vehicle are configured to be capable of holonomic motion and the crawler vehicle further comprises:
a set of motors configured to respectively drive rotation of the wheels; and
a multiplicity of motor controllers configured to respectively control the motors to cause the set of wheels to produce holonomic motion of the crawler vehicle.

9. The crawler vehicle as recited in claim 6, wherein the crawler vehicle frame comprises an opening and a bottom surface that partly defines a suction zone, and the crawler vehicle further comprises a suction device respectively mounted adjacent to the opening for producing a suction forces in the suction zone when the wheels of the crawler vehicle are in contact with a surface.

10. The crawler vehicle as recited in claim 6, wherein the maintenance tool is a non-destructive inspection probe.

11. A method for realigning a hanging crawler vehicle on a surface of a structure, the method comprising:
(a) attaching a crawler vehicle equipped with a roll bar to an end of a cable;
(b) suspending the crawler vehicle from the end of the cable at an elevation at which the crawler vehicle is hanging freely and not in contact with the surface of the structure;
(c) raising the end of the cable and the crawler vehicle until the roll bar comes into contact with the surface of the structure; and
(d) continuing to raise the end of the crawler vehicle while the roll bar remains in contact with and is dragged along the surface of the structure,
wherein an outer periphery of the roll bar has an eccentric shape configured to induce the crawler vehicle to reorient relative to the surface of the structure during step (d) until at least two wheels of the crawler vehicle come into contact with the surface of the structure.

12. The method as recited in claim 11, further comprising adhering the crawler vehicle to the surface of the structure using suction while at least two wheels of the crawler vehicle are in contact with the surface of the structure.

13. The method as recited in claim 11, wherein the end of the cable is raised until four wheels are in contact with the surface of the structure, further comprising adhering the crawler vehicle to the surface of the structure using suction while four wheels are in contact with the surface of the structure.

14. A crawler vehicle comprising:
a crawler vehicle frame and a multiplicity of wheels rotatably coupled to the crawler vehicle frame;
a maintenance tool coupled to the crawler vehicle frame of the crawler vehicle;
a multiplicity of rigid ribs each having one end connected to the frame;
a cam-shaped roll bar fixedly coupled to the frame by the multiplicity of rigid ribs,
wherein the cam-shaped roll bar is disposed in a plane that is perpendicular to the plane of wheel contact and entirely on one side of the plane of wheel contact, and has an outer periphery with an eccentric shape, and wherein spaced points on the outer periphery of the cam-shaped roll bar are located at different distances from a center-of-mass of the crawler vehicle.

15. The crawler vehicle as recited in claim 14, wherein the wheels of the crawler vehicle are configured to be capable of holonomic motion and the crawler vehicle further comprises:
a set of motors configured to respectively drive rotation of the wheels; and
a multiplicity of motor controllers configured to respectively control the motors to cause the set of wheels to produce holonomic motion of the crawler vehicle.

16. The crawler vehicle as recited in claim 14, wherein the crawler vehicle frame comprises an opening and a bottom surface that partly defines a suction zone, and the crawler vehicle further comprises a suction device respectively mounted adjacent to the opening for producing a suction forces in the suction zone when the wheels of the crawler vehicle are in contact with a surface.

17. The crawler vehicle as recited in claim 6, wherein the maintenance tool is a non-destructive inspection probe.

18. A method for realigning a hanging crawler vehicle on a surface of a structure, the method comprising:
   (a) suspending the crawler vehicle from an end of a cable, the crawler vehicle being suspended at an elevation at which the crawler vehicle is not in contact with the surface of the structure;
   (b) rotating the crawler vehicle relative to the end of the cable to cause first and second wheels of the crawler vehicle to move in tandem closer to the surface of the structure until the first wheel and a third wheel of the crawler vehicle are nearly equidistant from the surface of the structure; and
   (c) raising the end of the cable until at least the first and third wheels are in contact with the surface of the structure.

19. The method as recited in claim 18, further comprising adhering the crawler vehicle to the surface of the structure using suction while the first and third wheels are in contact with the surface of the structure.

20. The method as recited in claim 18, wherein the end of the cable is raised until the second wheel of the crawler vehicle is also in contact with the surface of the structure, further comprising adhering the crawler vehicle to the surface of the structure using suction while the first through third wheels are in contact with the surface of the structure.

* * * * *